United States Patent
Evans et al.

(10) Patent No.: US 9,244,286 B2
(45) Date of Patent: Jan. 26, 2016

(54) DISPLAY, INSTRUMENT PANEL, OPTICAL SYSTEM AND OPTICAL INSTRUMENT

(75) Inventors: Allan Evans, Oxfordshire (GB); Alistair Curd, Buckinghamshire (GB); Thomas Wynne-Powell, Oxfordshire (GB); Adrian Jacobs, Oxford (GB); Nathan Smith, Oxford (GB); Emma Walton, Oxford (GB); Gregory Gay, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 132 days.

(21) Appl. No.: 13/606,431

(22) Filed: Sep. 7, 2012

(65) Prior Publication Data
US 2013/0057961 A1    Mar. 7, 2013

Related U.S. Application Data

(62) Division of application No. 12/298,051, filed as application No. PCT/JP2007/059546 on Apr. 27, 2007, now abandoned.

(30) Foreign Application Priority Data

Apr. 28, 2006  (GB) .................................. 0608360.4

(51) Int. Cl.
*G02B 27/22* (2006.01)
*G02B 27/26* (2006.01)
*H04N 13/04* (2006.01)

(52) U.S. Cl.
CPC ........ *G02B 27/2278* (2013.01); *G02B 27/2221* (2013.01); *G02B 27/26* (2013.01); *H04N 13/042* (2013.01); *H04N 13/0488* (2013.01)

(58) Field of Classification Search
CPC ............... G02B 27/2221; G02B 27/26; G02B 27/2278; H04N 13/042
See application file for complete search history.

(56) References Cited

U.S. PATENT DOCUMENTS

| | | | |
|---|---|---|---|
| 4,093,354 A | 6/1978 | Leeb | |
| 4,333,715 A | 6/1982 | Brooks | |

(Continued)

FOREIGN PATENT DOCUMENTS

| | | |
|---|---|---|
| EP | 0 146 956 | 7/1985 |
| EP | 0 206 778 A2 | 12/1986 |

(Continued)

OTHER PUBLICATIONS

Supplementary Partial European Search Report for corresponding European Application No. EP 07742981.9 dated Jul. 22, 2011.

(Continued)

*Primary Examiner* — Jessica M Merlin
(74) *Attorney, Agent, or Firm* — Renner, Otto, Boisselle & Sklar, LLP

(57) ABSTRACT

A multiple depth display provided for displaying images at different depths comprises a single display device (61), for displaying all of the images. An optical system (62, 63, 64) is disposed in front of the display device (61). The optical system comprises first and second spaced-apart partial reflectors (62, 63) and polarization optics (64) for providing first and second light paths for first and second images or sequences of images displayed by the device (61). The first light path (65) comprises partial transmission through the first reflector (62), partial reflection from the second reflector (63), partial reflection from the first reflector (62), and partial transmission through the second reflector (65) towards a viewing region.

17 Claims, 62 Drawing Sheets

(56) References Cited

U.S. PATENT DOCUMENTS

| | | |
|---|---|---|
| 4,670,744 A | 6/1987 | Buzak |
| 4,736,214 A | 4/1988 | Rogers |
| 4,765,715 A | 8/1988 | Matsudaira et al. |
| 5,661,737 A | 8/1997 | Hecht et al. |
| 5,966,242 A | 10/1999 | Yamanaka |
| 6,075,651 A | 6/2000 | Hoppe |
| 6,094,242 A | 7/2000 | Yamanaka |
| 6,273,571 B1 | 8/2001 | Sharp et al. |
| 6,304,303 B1 | 10/2001 | Yamanaka |
| 6,304,382 B1 | 10/2001 | Shirasaki et al. |
| 6,417,895 B1 * | 7/2002 | Tabata et al. ............... 349/15 |
| 6,853,491 B1 * | 2/2005 | Ruhle et al. ............... 359/630 |
| 6,961,105 B2 | 11/2005 | Chang et al. |
| 2002/0105516 A1 | 8/2002 | Tracy |
| 2002/0163482 A1 | 11/2002 | Sullivan |
| 2004/0029636 A1 | 2/2004 | Wells |
| 2004/0051445 A1 | 3/2004 | Adachi |
| 2005/0156813 A1 | 7/2005 | Adachi et al. |
| 2006/0028146 A1 | 2/2006 | Adachi |
| 2006/0227256 A1 * | 10/2006 | Hamagishi et al. ........... 349/15 |
| 2008/0007155 A1 | 1/2008 | Adachi |

FOREIGN PATENT DOCUMENTS

| | | |
|---|---|---|
| EP | 0 333 333 | 9/1989 |
| EP | 0 454 423 | 10/1991 |
| EP | 0 803 756 A1 | 10/1997 |
| EP | 0 887 667 | 12/1998 |
| EP | 1 059 626 | 12/2000 |
| EP | 1 093 008 | 4/2001 |
| EP | 1 265 097 | 12/2002 |
| GB | 1 578 586 | 11/1980 |
| GB | 2 405 516 | 3/2005 |
| GB | 2 431 728 | 5/2007 |
| JP | 62-235929 | 10/1987 |
| JP | 02-262119 | 10/1990 |
| JP | 08-327940 A | 12/1996 |
| JP | 10-010465 A | 1/1998 |
| JP | 11-326818 A | 11/1999 |
| JP | 2000-275566 A | 10/2000 |
| JP | 2001-264693 A | 9/2001 |
| WO | 91/12554 | 8/1991 |
| WO | 98/10584 | 3/1998 |
| WO | 99/42889 | 8/1999 |
| WO | 03/040820 | 5/2003 |
| WO | 04/001488 | 12/2003 |
| WO | 2004/002143 | 12/2003 |
| WO | 2004/008226 | 1/2004 |

OTHER PUBLICATIONS

International Search Report for corresponding international application No. PCT/JP2007/059546 mailed Jun. 19, 2007.
Search Report for application No. GB 0608360.4 dated Jul. 31, 2006.
Search Report for application No. GB 0608360.4 dated Dec. 13, 2006.
Ernst Lueder, "Liquid Crystal Displays: Addressing Schemes and Electro-Optical Effects", Wiley-SID Series in Display Technology 2001, pp. 30-49.
M. Okada et al., "Reflective multicolor display using cholesteric liquid crystals", SID 1997 digest, pp. 1019-1022.
D. Davis et al., "Multiple color high resolution reflective cholesteric liquid crystal displays", SID 1997 digest, pp. 242-245.
E. Hecht et al., "Optics", Fourth edition, Addison Wesley 2003, pp. 366-368.
A. Funamoto et al., "Prism-sheetless High Bright Backlight System for Mobile Phone", IWD '04 paper FMC 10-4, pp. 687-690.
Office Action dated Sep. 15, 2011 for corresponding U.S. Appl. No. 12/298,051.
Office Action dated Dec. 14, 2011 for corresponding U.S. Appl. No. 12/298,051.
Final Office Action dated May 16, 2012 for corresponding U.S. Appl. No. 12/298,051.

* cited by examiner

F I G. 8 (b)
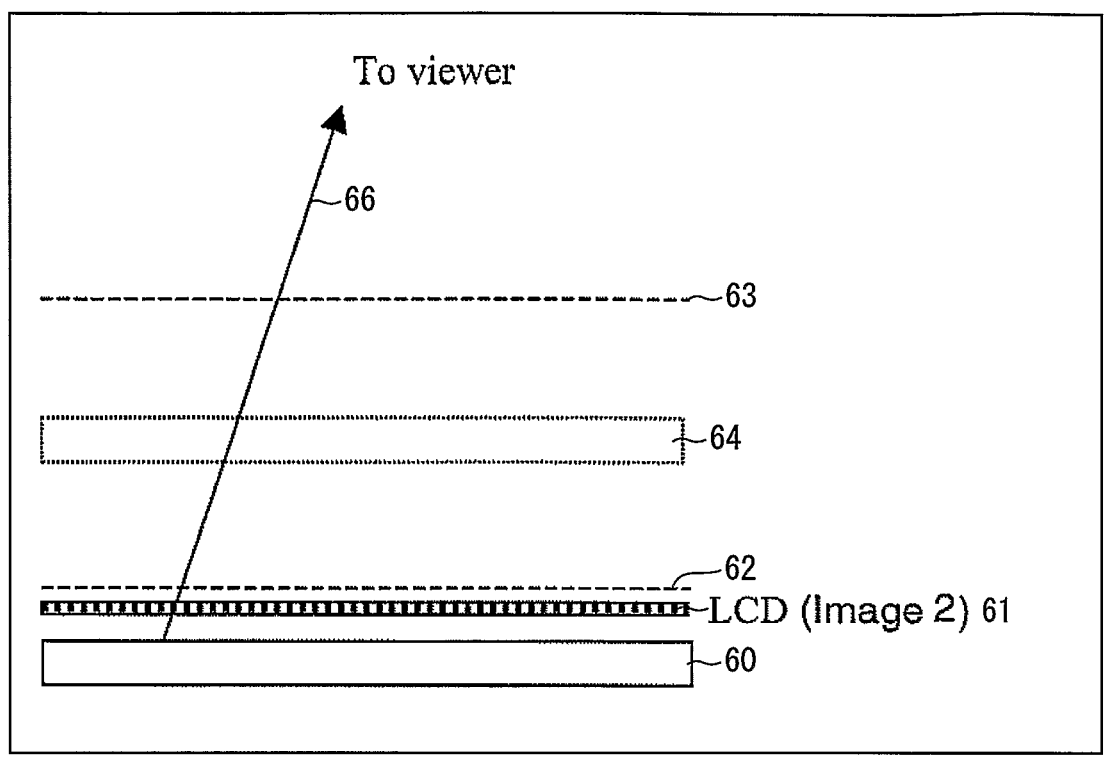

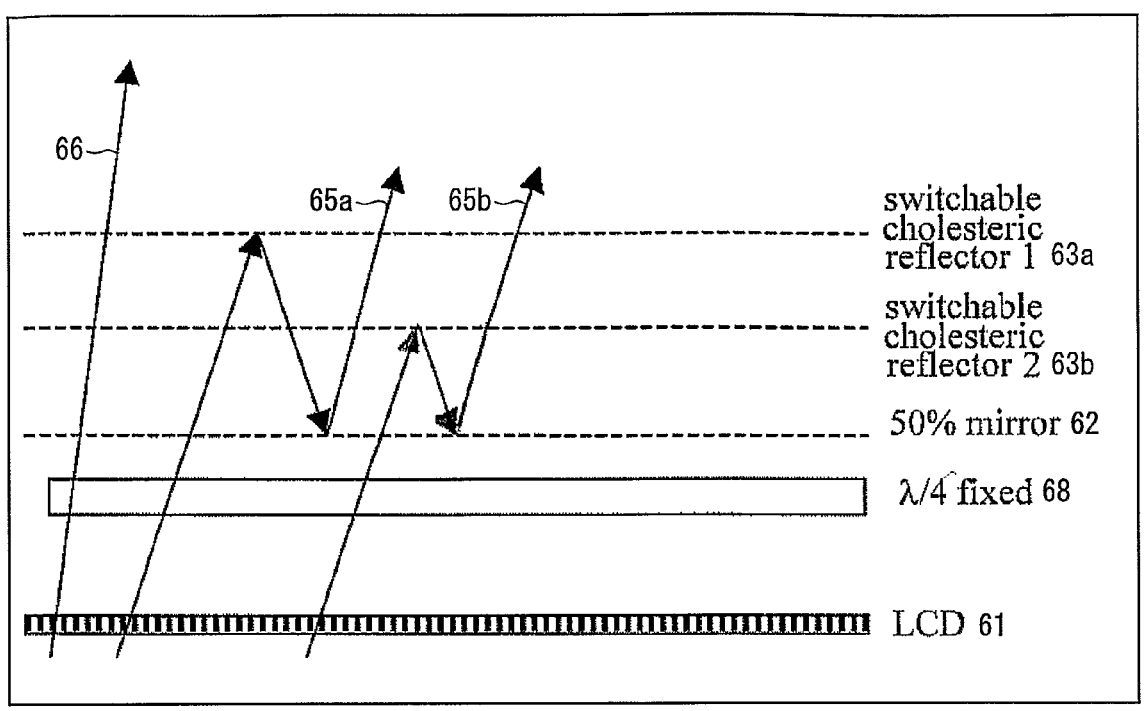
F I G. 1 3 (c)

F I G. 1 4 (b)
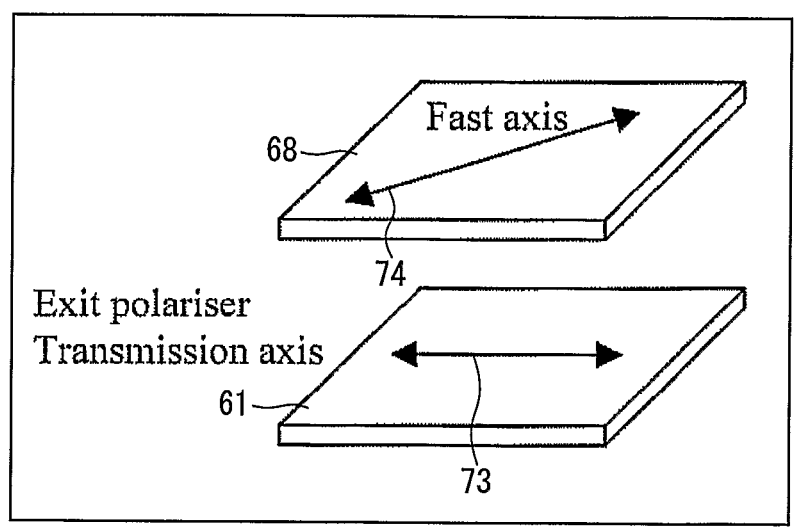

F I G. 1 5 (a)
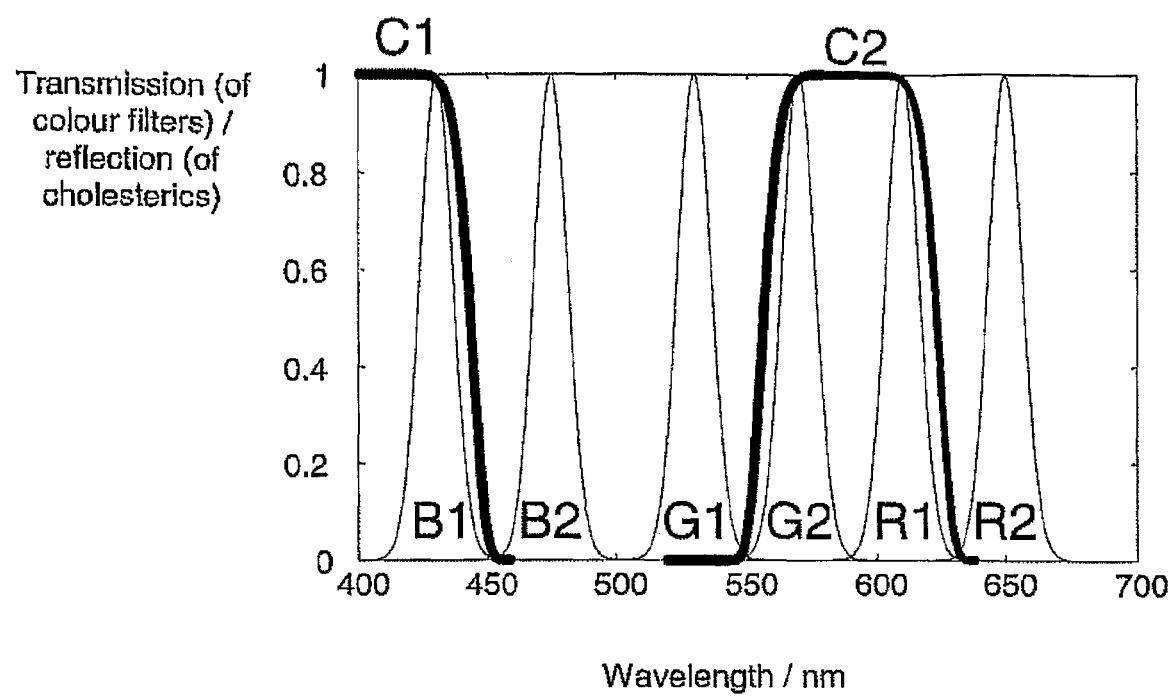

F I G. 17 (a)
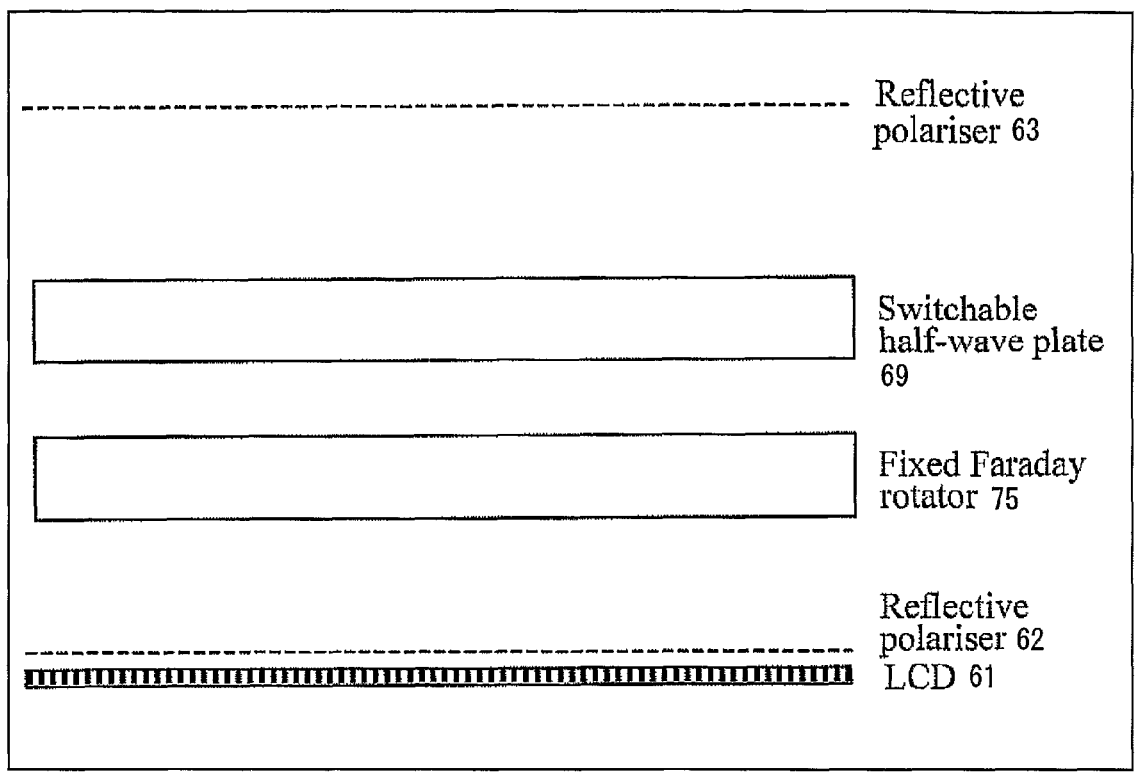

F I G. 1 8 (b)
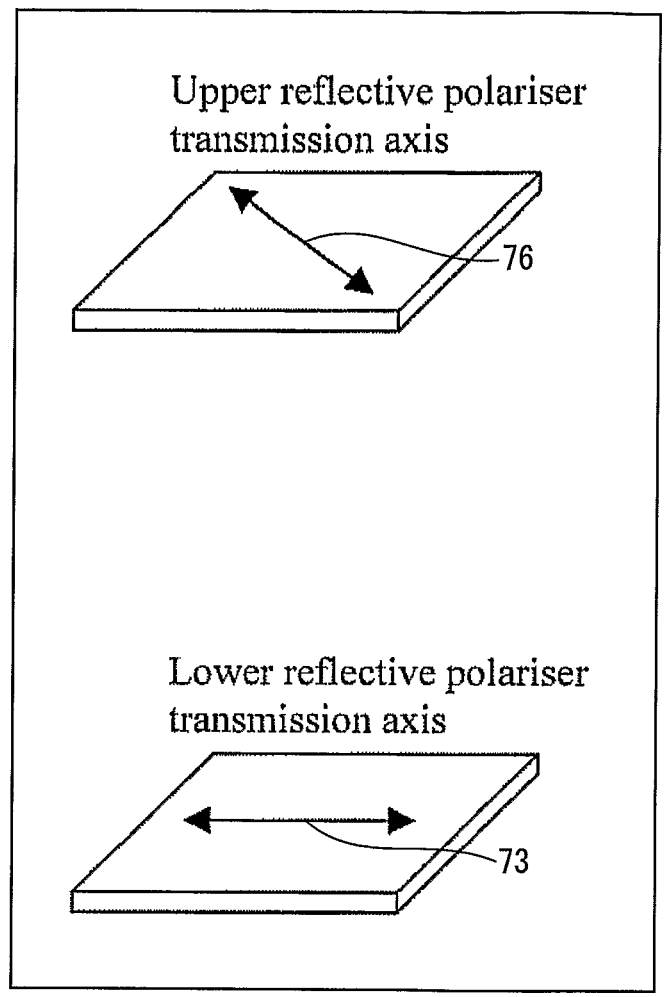

F I G. 1 9 (b)
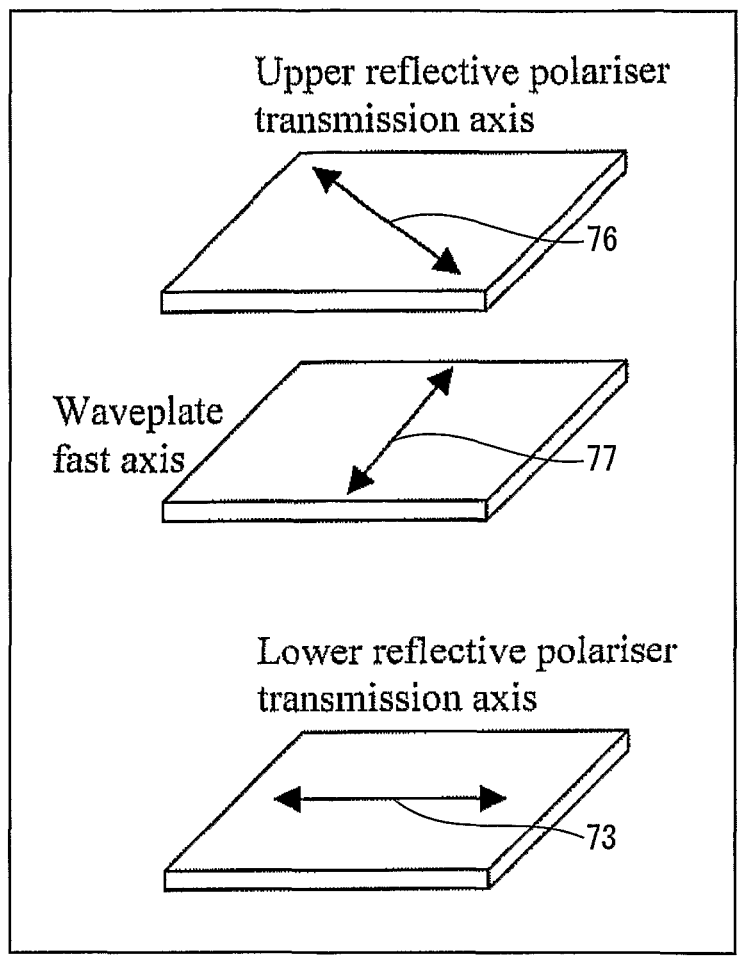

F I G. 2 0 (a)
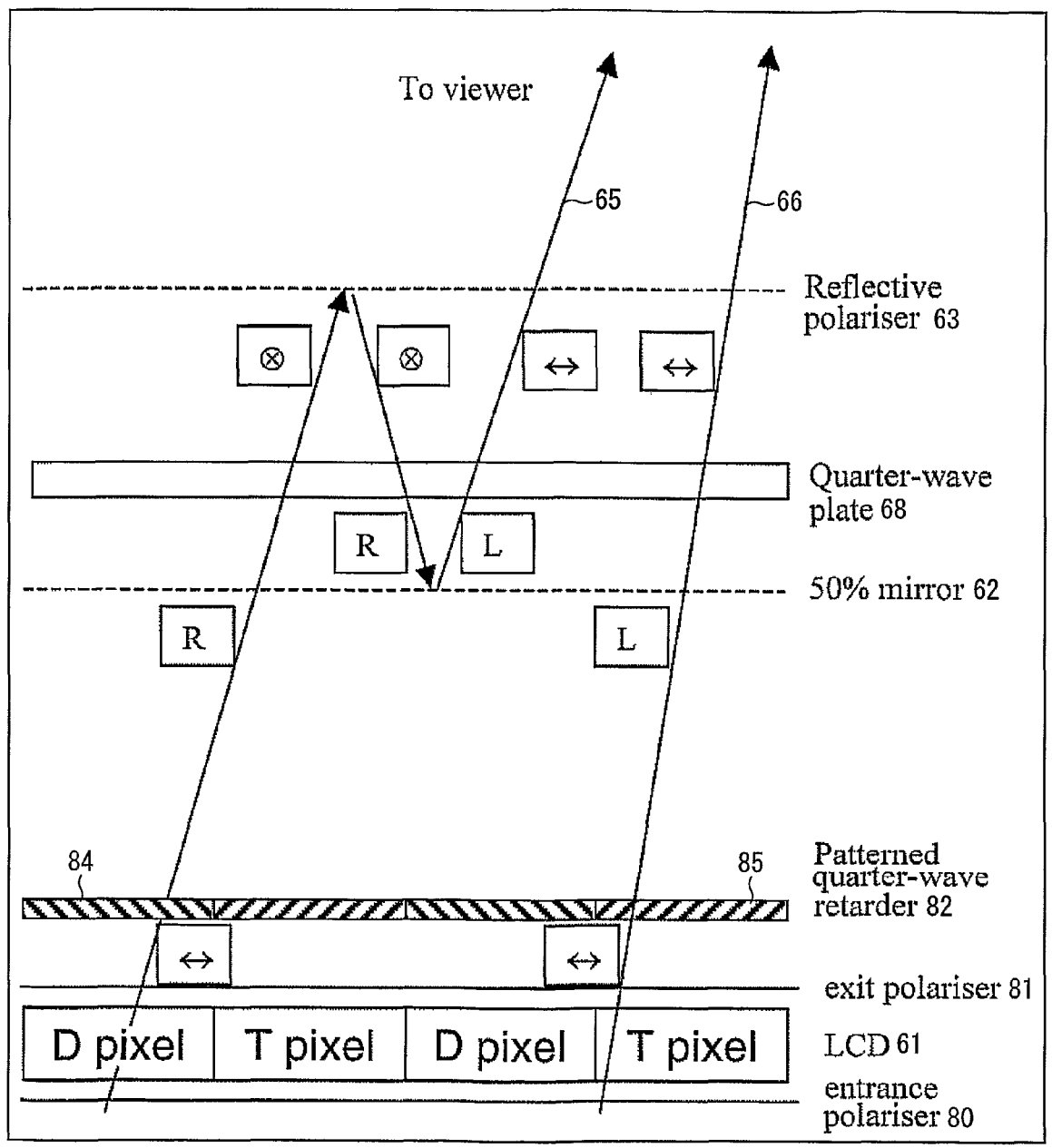

FIG. 23(a)

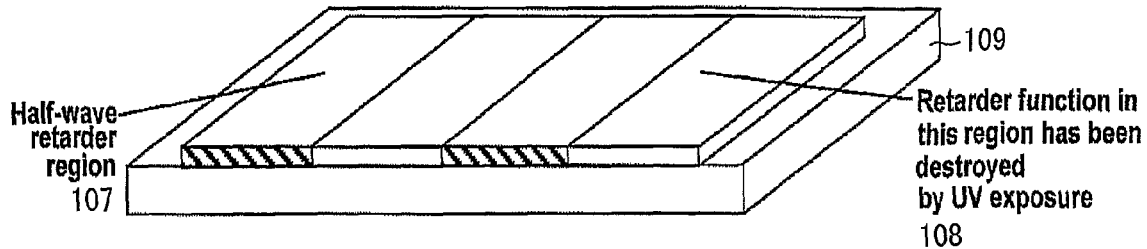

Half-wave retarder region 107 — Retarder function in this region has been destroyed by UV exposure 108 — 109

FIG. 23(b)

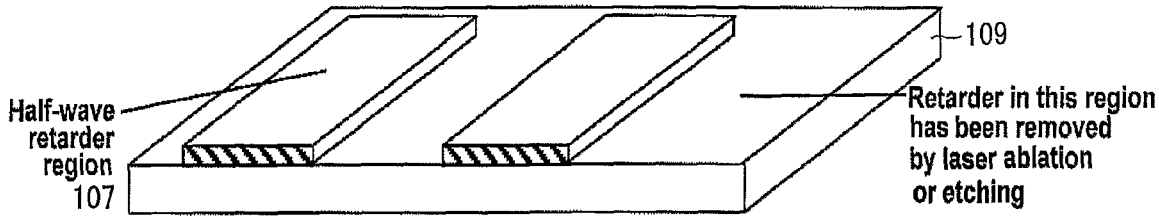

Half-wave retarder region 107 — Retarder in this region has been removed by laser ablation or etching — 109

FIG. 23(c)

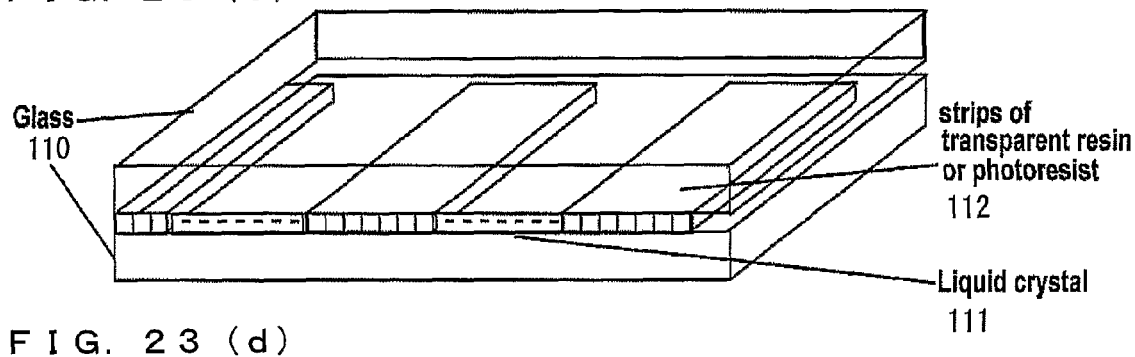

Glass 110 — strips of transparent resin or photoresist 112 — Liquid crystal 111

FIG. 23(d)

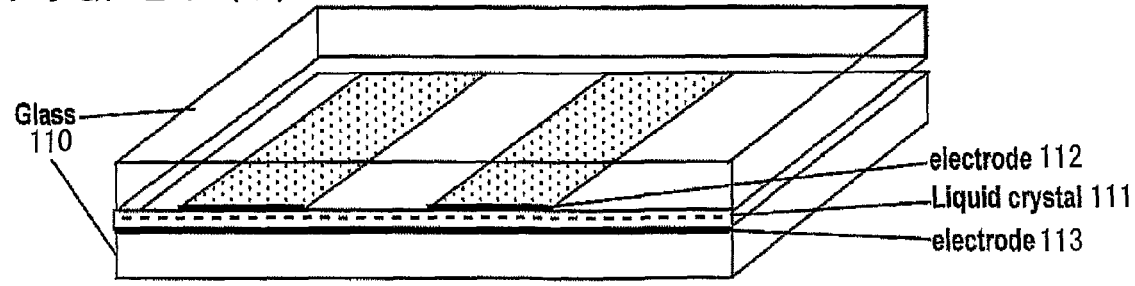

Glass 110 — electrode 112 — Liquid crystal 111 — electrode 113

FIG. 23(e)

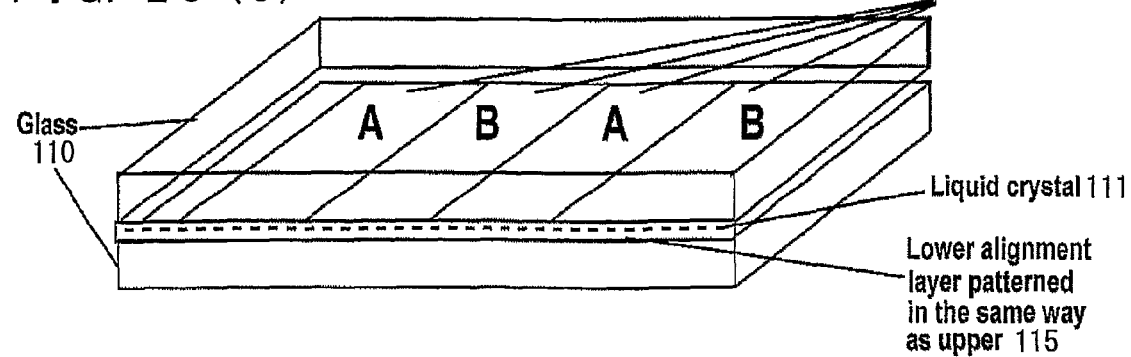

Glass 110 — Regions of upper alignment layer 114 — Liquid crystal 111 — Lower alignment layer patterned in the same way as upper 115

F I G. 3 7
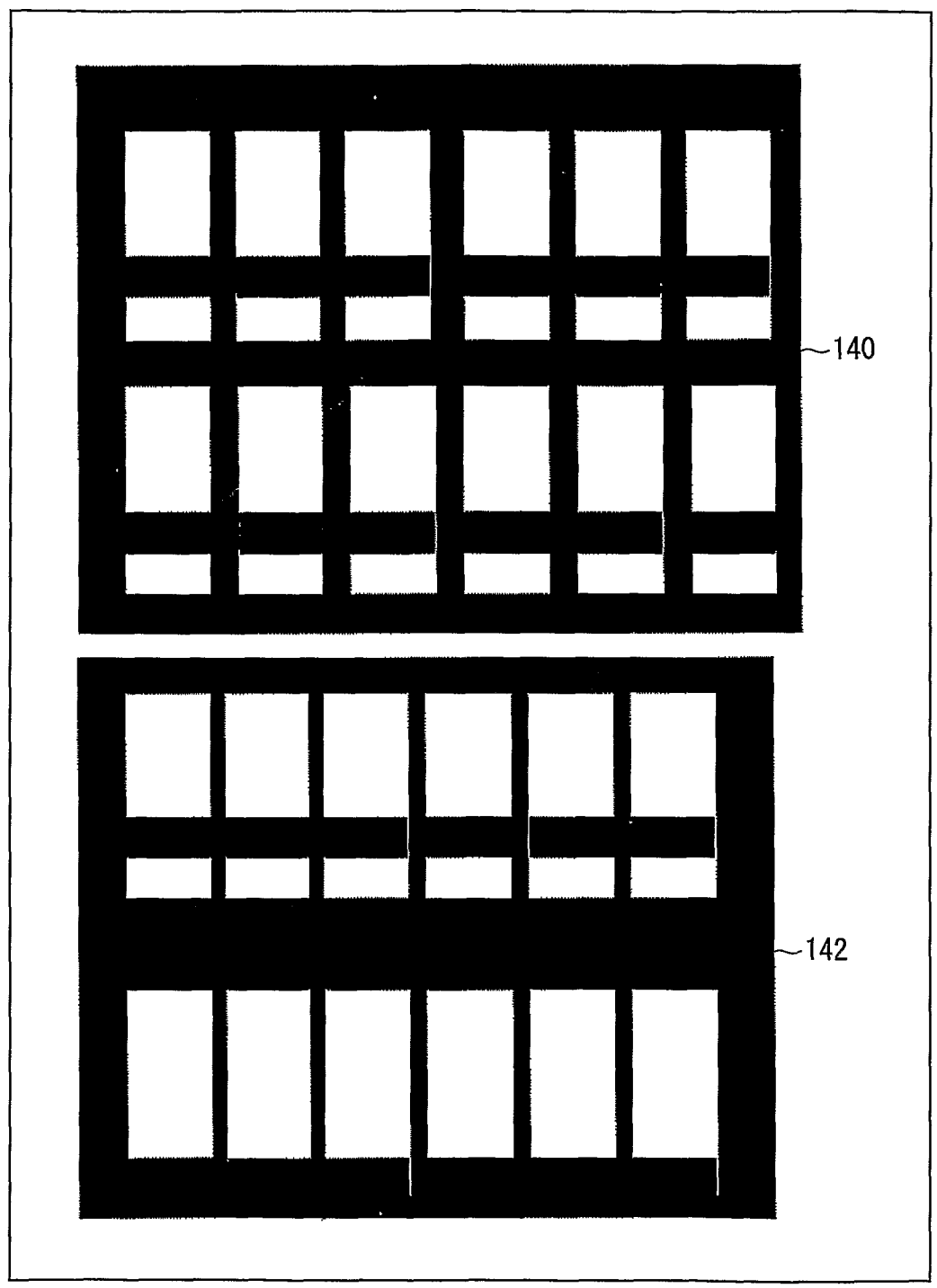

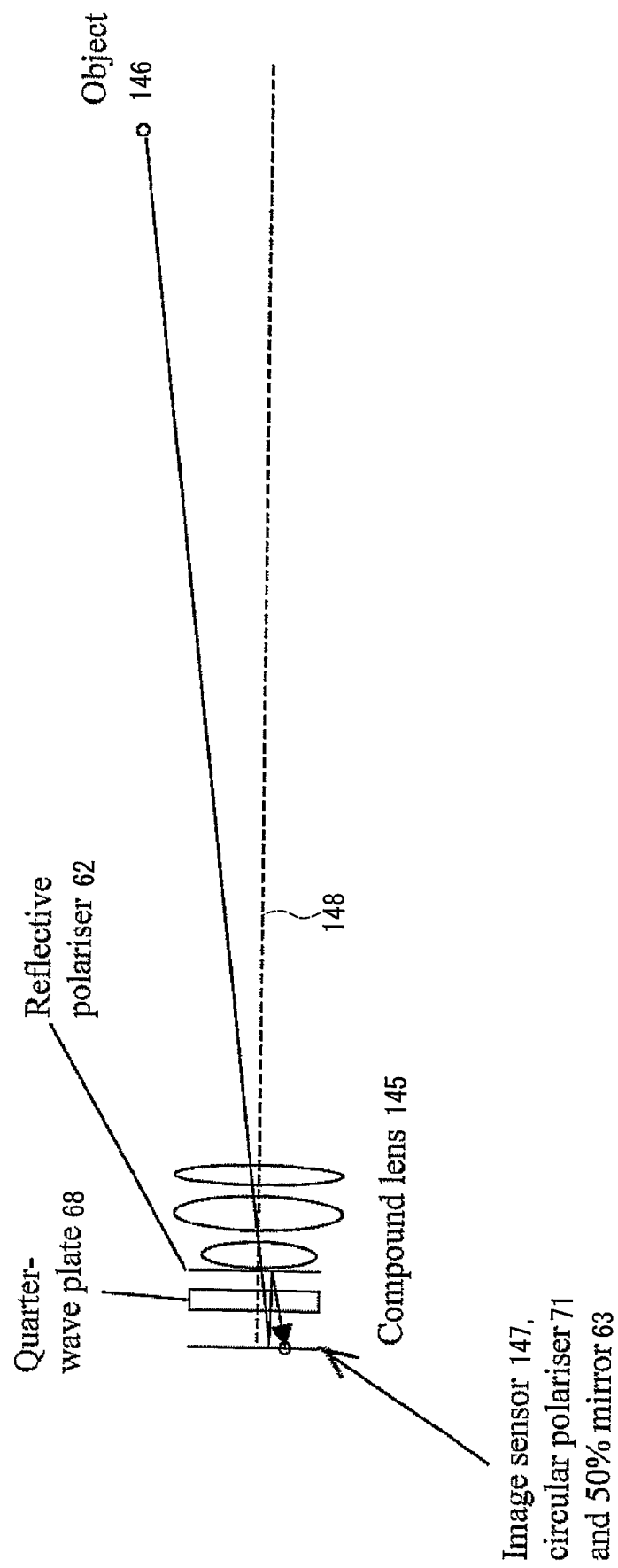

DISPLAY, INSTRUMENT PANEL, OPTICAL SYSTEM AND OPTICAL INSTRUMENT

TECHNICAL FIELD

The present invention relates to a display. Such a display may be used, for example, to provide an impression of depth or changed depth. Such a display may, for example, be used in information display applications including computer-aided design, games and television and in applications where warnings or other messages are required to stand out from a background. The present invention also relates to an instrument panel including such a display. The present invention further relates to an optical system and to an optical instrument including such a system.

BACKGROUND ART

It is known for vehicles, such as automobiles and aircraft, to include an electronic display providing an image of, for example, an instrument cluster for replacing discrete mechanical or electric dials. However, such displays generally provide limited realism because of their inability to produce images at different depths with respect to the display apparatus. In addition to limiting the realism of such displays, the inability to produce images at different depths reduces the visibility or intelligibility of the images. Although stereoscopic and autostereoscopic displays are known and can produce an impression of a three-dimensional image, such displays do not produce an impression of true depth, being unable to reproduce focusing information correctly Further, such displays may have limited freedom of viewing position and may result in user confusion and even eye strain and headaches.

FIG. 1 of the accompanying drawings illustrates a display of the type disclosed in U.S. Pat. No. 4,736,214 for displaying background and foreground images with different image depths. The display comprises a projector 1 for projecting images carried by a projection film 2 with each frame being divided to provide a background image 3 and a foreground image 4. The projector 1 projects these images simultaneously for each frame onto an optical system comprising a rear projection screen 5, mirrors 6 and 7 and a partially transmitting mirror 8. The background and foreground images are projected via different length optical paths in order to produce a motion picture with two depth planes. Although such an apparatus is capable of showing images with different depths to an audience 9, it is of limited application because of its relatively large size and its use of relatively expensive equipment.

FIG. 2 of the accompanying drawings illustrates a display of the type disclosed in WO 9942889, WO 03040820, WO 04001488, WO 04002143 and WO 04008226. This type of display is of dual-panel construction and comprises a backlight 10 overlaid by spatial light modulators 11 and 12. The spatial light modulators 11 and 12 modulate light from the backlight 10 with a pair of images or sequences of images so as to display the images or sequences at different depths. However, such an arrangement has several disadvantages. For example, the spatial light modulators 11 and 12 may have the same regular patterns of black masks which result in the appearance of Moiré fringes, requiring further optical elements 13 in order to reduce the appearance of such fringes. Also, the use of two (or more) spatial light modulators results in very low light transmission so that a very bright backlight 10 is required in order to achieve the necessary or desired image brightness for viewing.

Such an arrangement is "light-subtractive" so that, for example, pixels in the first modulator 11 must be "on" or transmissive in order for pixels in the line of sight in the second modulator 12 to be visible to a viewer. Thus, a light object cannot be shown on a dark background. Also, as light has to pass through the two spaced modulators 11 and 12, parallax effects can occur at image boundaries.

The use of multiple spatial light modulators substantially increases the cost of such a display as compared with conventional displays using single spatial light modulators. In order to increase the number of depth planes, the number of spatial light modulators must be increased and this results in a linear increase in cost, and an experiential decrease in brightness, with the number of depth planes. Further, such an arrangement requires synchronised control of multiple spatial light modulators.

U.S. Pat. No. 2,402,9626 also discloses a multiple panel display of a similar type intended for use in a wagering gaming apparatus.

EP 01059626 and EP 0454423 disclose multiple layer displays having fixed electrode patterns for use in specific applications, such as in watches or in hand-held games. EP 1265097 discloses a display for an automotive instrument cluster comprising a matrix-addressable display overlaid with a patterned display for showing specific vehicle functions. Such displays have the same disadvantages as the multiple panel displays described above and, in addition, are capable of showing only limited images as determined by the electrode patterns.

EP 1093008, JP 0226211, WO 0911255, JP 62235929 and US 22105516 disclose volumetric displays based on multiple layer scattering and polariser-free display panels. Such displays are intended to improve the brightness of the displayed images compared with light-absorbing display panels. However, displays of this type have various disadvantages. For example, a dark state is produced by a non-scattering state so that light is transmitted to the environment. This is undesirable in many applications, such as in automotive displays particularly during night-time driving. Also, such multiple displays are relatively expensive. Further, displays of this type generally have relatively slow switching times and are unsuitable for use throughout wide temperature ranges, for example as may be found in an automotive environment.

FIG. 3 of the accompanying drawings illustrates a known type of time-sequential projection volume display, for example as disclosed in U.S. Pat. No. 4,333,715, US 22163482 and U.S. Pat. No. 4,670,744. The images for the different planes are displayed sequentially by a projector 15 and projected towards a plurality of projection screens 16. The projection screens 16 are of an active type and are enabled one at a time in synchronism with projection by the projector 15 of the image intended to be viewed at the location of the screen. The projection screens 16 are of reflective or scattering type when switched on and are substantially transparent when switched off. However, such a display is of limited use because of the large volume which it requires. Also, such a display is inconvenient because of the need to synchronize activation of the projection screens with the images projected by the projector.

The DaimlerChrysler F500 Mind Car research vehicle shown at the 2003 Tokyo motor show disclosed an instrument cluster which overlaid, by means of a half-silvered mirror, a standard instrument cluster and a liquid crystal display (LCD) panel. However, such an arrangement requires substantial volume in order to accommodate two displays which must be disposed at an angle with respect to each other. Also, as described hereinbefore, the use of multiple displays makes such a system relatively expensive.

FIGS. 4 to 6 of the accompanying drawings illustrate displays of the type disclosed in WO 09810584. The display shown in FIG. 4 comprises a housing 20 containing a beam-combining element in the form of a partially reflective optical element 21. The housing 20 has a viewing aperture 22 and apertures in which are located display devices 23 and 24 for displaying foreground and background images, respectively. The optical paths from a viewer to the display devices 23 and 24 are different so that the device 23 appears at its actual location whereas the device 24 appears behind the device 23 to provide a virtual background image 25.

The display shown in FIG. 5 of the accompanying drawings comprises a single display device 30 divided into relatively large regions for displaying interlaced foreground and background images as illustrated at 31 and 32. Light from each of the foreground elements 31 passes through a partially reflecting mirror 33 and an array of optical expansion elements 34 directly to a viewing region whereas light from each of the background elements 32 is reflected by a mirror 35 and the partially reflecting mirror 33 so as to have a longer light path to the viewing region.

FIG. 6 of the accompanying drawings illustrates another display comprising a projector 40 and a rotating rod 41 on which are mounted first and second projection screens 42 and 43. The projector projects first and second images or sequences of images in synchronism with the screens 42 and 43, respectively, being in front of the projector.

The display illustrated in FIG. 4 has the disadvantages of occupying a relatively large volume and being relatively expensive because of the use of multiple display devices. The display shown in FIG. 5 has the disadvantage that the interlaced sections of the display device 30 are relatively large so that the additional expansion elements 34 are required in order for the image to fill an entire display region. The presence of such elements results in reduced freedom of movement of a viewer because of the f-number of the elements 34. The elements 34 require exact alignment with the regions of the display device 30 and this is inconvenient during manufacture and increases the cost. Two mirror elements are required for each background section of the display device and this increases the size and cost of manufacture. Any aberration in the elements 34 results in image distortion as a viewer moves relative to the display, even if perfect compensation is provided for on-axis viewing.

The display shown in FIG. 6 of the accompany drawings occupies a relatively large volume and requires a mechanical system to provide different image depths. Also, this display has the inconvenience of requiring means for providing synchronization between the rotary position of the mechanical assembly and the projected images.

US 2005/0156813 discloses a display of the type illustrated in FIG. 7 of the accompanying drawings. The display comprises an LCD panel 45 having a portion 46 for displaying a foreground image and a portion 47 for displaying a background image. The panel 45 supplies light modulated with both images having a polarization direction in the plane of FIG. 7 of the accompanying drawings. Light from the portion 46 passes through a reflective polariser 48 to a viewing region of the display.

Light from the portion 47 passes through a retarder 49, which changes the polarization direction of light by 90° so that it is perpendicular to the plane of FIG. 7 of the accompanying drawings. The resulting light is reflected by a mirror 50 towards the reflective polariser 48 such that the reflected light is again reflected by the polariser 48 towards a viewing region.

Although such a display can provide different image depths from a single LCD panel, separate portions of the panel are required to form the two images so that, in order to create a multiple depth image of a given size, a much larger display panel is required. Also, the presence of the mirror 50 greatly restricts the viewing angle of the display. This also limits the orientations of the image planes, which cannot be perpendicular to the viewing direction.

DISCLOSURE OF INVENTION

According to first aspect of the invention, there is provided an optical system for providing a first light path which is longer than a physical length of the system, the optical system comprising first and second spaced-apart partial reflectors and providing the first light path for a first light incident on the first reflector, the first light path comprising at least partial transmission through the first reflector towards the second reflector, at least partial reflection from the second reflector towards the first reflector, at least partial reflection from the first reflector towards the second reflector, and at least partial transmission through the second reflector, the optical system being arranged substantially to prevent emission from the second reflector of the first light not reflected during reflection by the first and second reflectors, wherein light incident on the second partial reflector for the first time does not leave the optical system.

It is thus possible to provide a relatively simple optical system which is relatively inexpensive to manufacture. The optical system is capable of providing a light path which is longer than the physical length of the optical system. Such an arrangement has many applications, including providing an image in a display which is more remote than an image displaying device and shortening the length of optical instruments.

The optical system may be arranged to change the polarization of the first light during passage along the first path. The optical system may be arranged to change the polarization of the first light during passage along the first path between incidence on the second reflector and reflection from the first reflector.

The optical system may be arranged to provide a second light path of length different from that of the first path. The second light path may comprise at least partial transmission through the first reflector towards the second reflector and at least partial transmission through the second reflector. The optical system may be arranged substantially to prevent emission from the second reflector of the second light not transmitted by the second reflector. The optical system may be switchable between a first mode, in which the first light propagates along the first light path, and a second mode in which light propagates along the second light path.

It is further possible to provide an optical system having two light paths of different lengths with at least one being different from the physical length of the system. Again, the system is relatively compact and inexpensive to manufacture. When used with a direct view display device, it is possible to provide a direct view display having images located at different distance from a viewer with at least one of the images being displaced in the depth direction from the physical position of the display device.

The first and second reflectors may substantially plane.

The first and second reflectors may be substantially parallel.

The first and second reflectors may comprise a reflective linear polariser and a partially transmissive mirror, respectively, and the optical system may comprise: a circular polariser with the second reflector disposed between the first reflector and the circular polariser; a quarter wave plate disposed between the first and second reflectors; and a switchable half wave plate disposed between the first reflector and the circular polariser.

The first and second reflectors may comprise a partially transmissive mirror and at least one reflective circular polariser, respectively. The optical system may comprise a quarter wave plate. The optical system may comprise a switchable half wave plate. The first and second reflectors may comprise reflective polarisers and the optical system may comprise a switchable directional half wave plate.

The first and second reflectors may comprise reflective linear polarisers and the optical system may comprise a Faraday rotator and a switchable half wave plate.

According to a second aspect of the invention, there is provided an optical instrument comprising a system according to the first aspect of the invention.

The instrument may comprise at least one refractive, reflective or diffractive element having optical power. For example, the instrument may comprise a telescope, a monocular, a pair of binoculars or a camera.

According to a third aspect of the invention, there is provided a display comprising a display device for modulating a first light with a first image or sequence of images and an optical system arranged to increase the perceived depth of location of the first image or sequence, the optical system comprising first and second spaced-apart partial reflectors and providing a first light path for the first light from the device to a viewing region, the first light path comprising at least partial transmission through the first reflector towards the second reflector, at least partial reflection from the second reflector towards the first reflector, at least partial reflection from the first reflector towards the second reflector, and at least partial transmission through the second reflector towards the viewing region.

The optical system may be arranged substantially to prevent transmission to the viewing region of the first light not reflected during reflection by the first and second reflectors.

The optical system may be arranged to change the polarization of the first light during passage along the first path. The optical system may be arranged to change the polarization of the first light during passage along the first path between incidence on the second reflector and reflection from the first reflector.

The device may be arranged to modulate a second light with a second image or sequence of images and the optical system may be arranged to provide a second light path from the device to the viewing region of length different from that of the first path to provide a perceived depth of location of the second image or sequence different from that of the first image or sequence. The second light path may comprise at least partial transmission through the first reflector towards the second reflector and at least partial transmission through the second reflector towards the viewing region. The optical system may be arranged substantial to prevent transmission to the viewing region of the second light not transmitted by the second reflector.

The display may be switchable between a first mode displaying the first image or sequence and a second mode displaying the second image or sequence to change the perceived image location depth.

The display may be arranged to display the first and second images or sequences simultaneously or time-sequentially to give the appearance of one of the first and second images or sequences overlaid above the other of the first and second images or sequences. The display may comprise an image generator for generating image data for the other image or sequence representing a scale and for the one image or sequence representing a pointer. The image data for the one image or sequence may represent a visible warning.

The first and second reflectors may be substantially plane.

The first and second reflectors may be substantially parallel. The first and second reflectors may be substantially parallel to a display surface of the device.

The device may be a light-emissive device.

The device may comprise a transmissive spatial light modulator. The modulator may comprise a liquid crystal device.

The first and second reflectors may overlie substantially the whole of an image displaying region of the device.

The first and second reflectors may comprise a reflective linear polariser and a partially transmissive mirror, respectively, disposed between the device and a circular polariser and the optical system may comprise a quarter wave plate disposed between the first and second reflectors and a switchable half wave plate disposed between the first reflector and the circular polariser.

The first and second reflectors may comprise a partially transmissive mirror and at least one reflective circular polariser, respectively. The optical system may comprise a quarter wave plate. The optical system may comprise a switchable half wave plate.

The first and second reflectors may comprise reflective polarisers and the optical system may comprise a switchable directional half wave plate.

The first and second reflectors may comprise reflective linear polarisers and the optical system may comprise a Faraday rotator and a switchable half wave plate.

The first and second reflectors may comprise a partially transmissive mirror and a reflective linear polariser, respectively, and the optical system may comprise a quarter wave plate disposed between the first and second reflectors and a patterned retarder or polarization rotator disposed between the first reflector and the device.

The display may comprise a linear exit polariser for or of the device.

The display may comprise a collimated backlight and the optical system may comprise a diffuser. The partially transmission mirror may comprise a mirror having an array of apertures and the diffuser may comprise an array of lenses aligned with the apertures. The lenses may be converging lenses.

The patterned retarder or rotator may be switchable to a uniform unpatterned state.

The patterned retarder or rotator may comprise a patterned quarter wave plate.

The patterned retarder or rotator may comprise a uniform quarter wave plate and a patterned half wave plate or patterned 90° polarization rotator.

The patterned retarder or rotator may comprise a liquid crystal cell. The liquid crystal cell may comprise a patterned electrode arrangement.

The device may be scan-refreshed and the optical system may comprise a segmented switchable polarization-affecting element, whose segments are arranged to be switched when associated portions of an image displayed by the device have been refreshed.

The modulator may be scan-refreshed and the device may comprise a backlight arranged to be illuminated between consecutive pairs of frame refreshes.

According to a fourth aspect of the invention, there is provided an instrument panel for a vehicle including a display according to the third aspect of the invention.

It is thus possible to provide a display which is relatively inexpensive. The use of multiple display panels is generally unnecessary and this contributes to the reduced cost. This also avoids the relatively low light through-put of known multiple display device arrangements. Eye-strain associated with 3D displays creating a stereoscopic illusion of depth can be avoided by producing one or more virtual images. Also, the display may be visible throughout a relatively wide viewing region, allowing considerable viewing freedom for a viewer.

When used for multiple image or multiple sequence display purposes, such an arrangement is "additive" so that a light object may appear in front of a dark background. Further, Moiré effects are generally reduced in comparison with various known multiple display panel arrangements. Light not used to display images or image sequences may be absorbed within the display instead of being transmitted into the environment.

Such an arrangement requires no moving parts and, in many embodiments, no alignment between optical elements is required during manufacture. Such an arrangement may be used with emissive or transmissive display devices.

It is also possible to provide an optical system which has a light path which is longer than the physical length of the system. Such a system may be used, for example, in optical instruments and allows such instruments to be more compact. In addition to reducing the lengths of such instruments, the system does not have to be of greater width. The light path does not have to be deviated sideways but is effectively "folded on itself" so that the length may be reduced without increasing the width and without requiring two or more light path portions which are spaced apart sideways.

BRIEF DESCRIPTION OF DRAWINGS

FIGS. 15(a) and 15(b) are diagrams illustrating colour filter performance and a modified display constituting another example of the fourth embodiment, respectively;

FIGS. 17(a) and 17(b) are diagrams illustrating a display constituting a sixth embodiment of the invention;

FIGS. 23(a) to 23(e) are diagrams illustrating examples of an optical element for use in interlaced image embodiments of the invention;

FIG. 37 is a diagram illustrating LCD pixel arrangements suitable for use in the displays;

FIG. 48 is a diagram illustrating a digital camera constituting a twelfth embodiment of the invention.

BEST MODE FOR CARRYING OUT INVENTION

Figure 1:
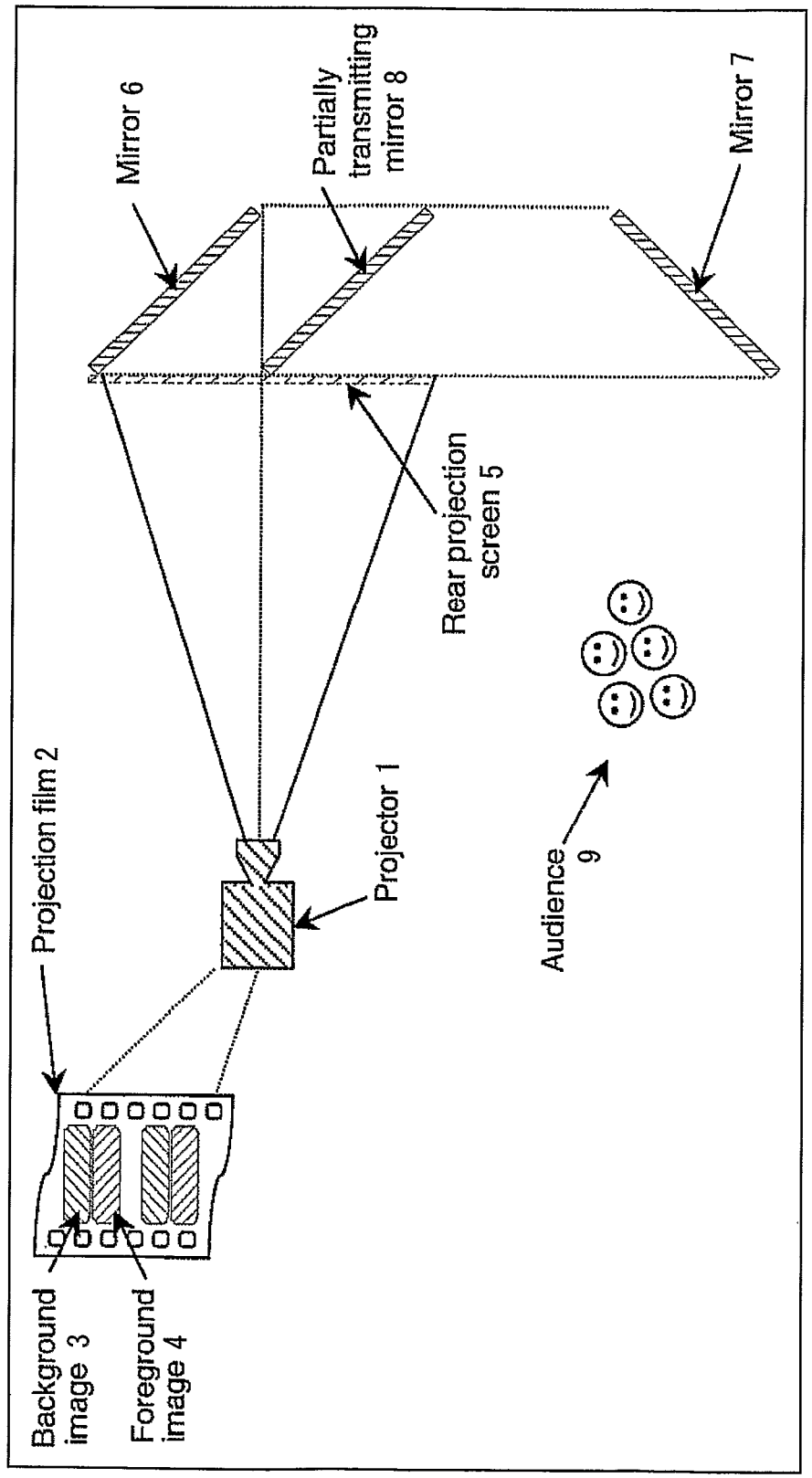
FIG. 1 is a cross-sectional diagrammatic view showing an example of conventional multiple image depth display.
Figure 2:
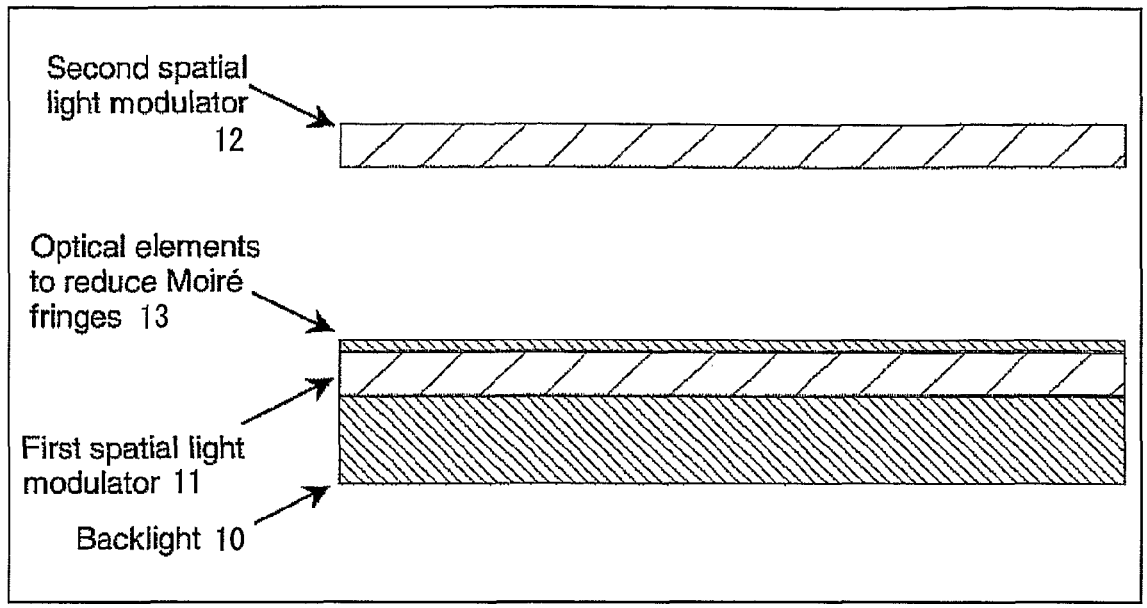
FIG. 2 is a cross-sectional diagrammatic view showing an example of conventional multiple image depth display.
Figure 3:
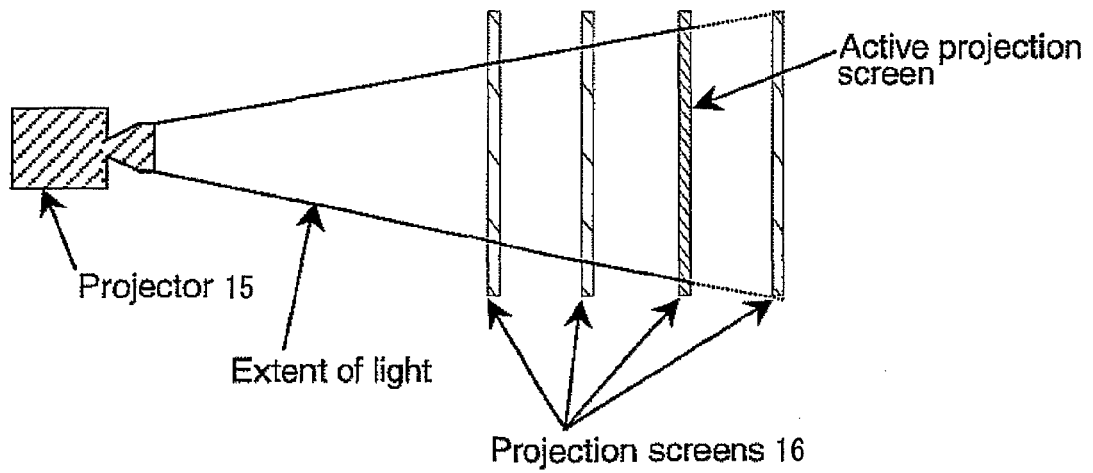
FIG. 3 is a cross-sectional diagrammatic view showing an example of conventional multiple image depth display.
Figure 4:
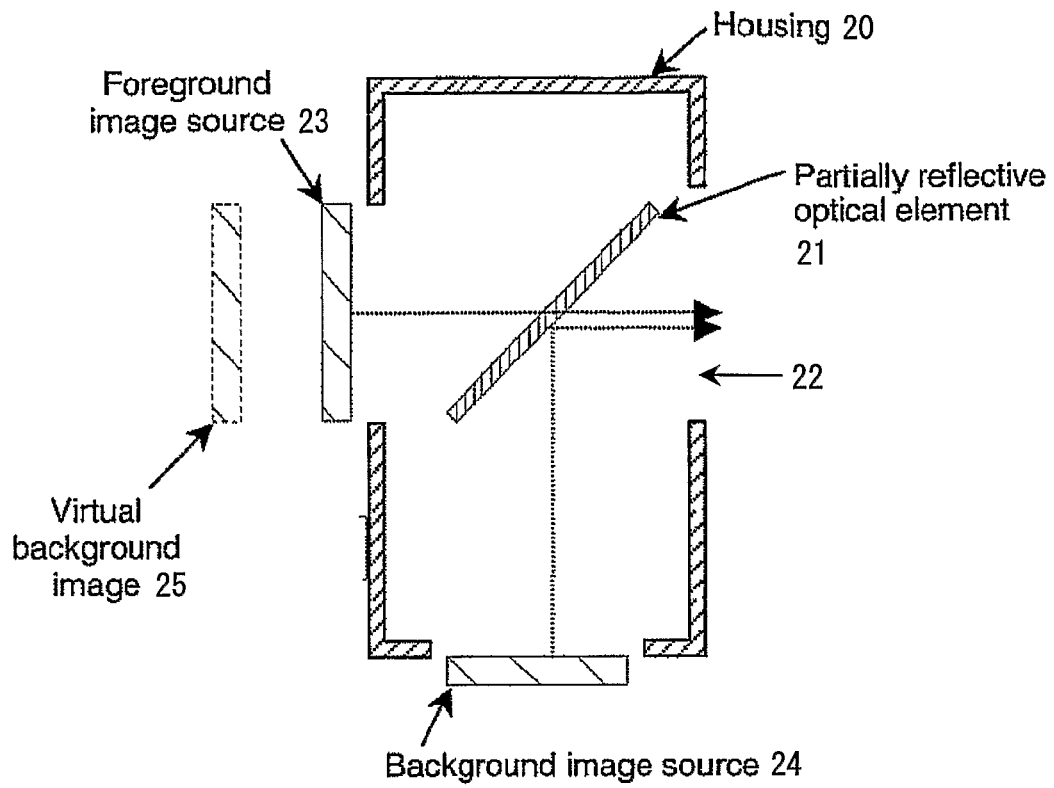
FIG. 4 is a cross-sectional diagrammatic view showing an example of conventional multiple image depth display.
Figure 5:
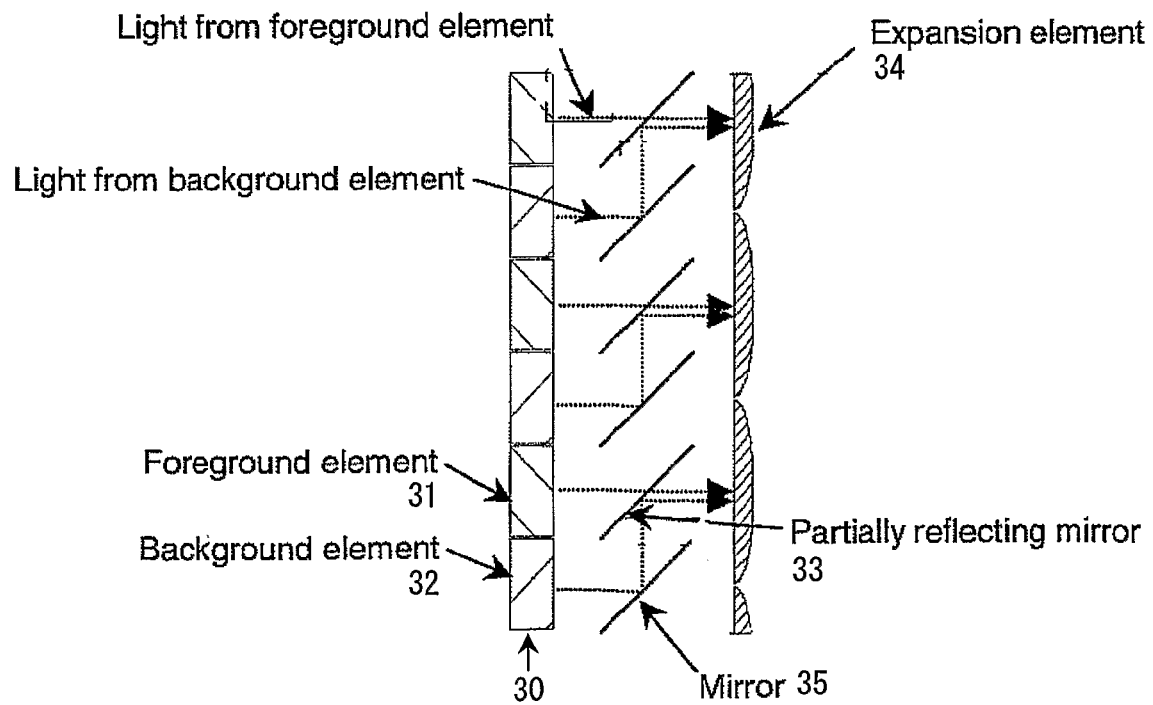
FIG. 5 is a cross-sectional diagrammatic view showing an example of conventional multiple image depth display.
Figure 6:
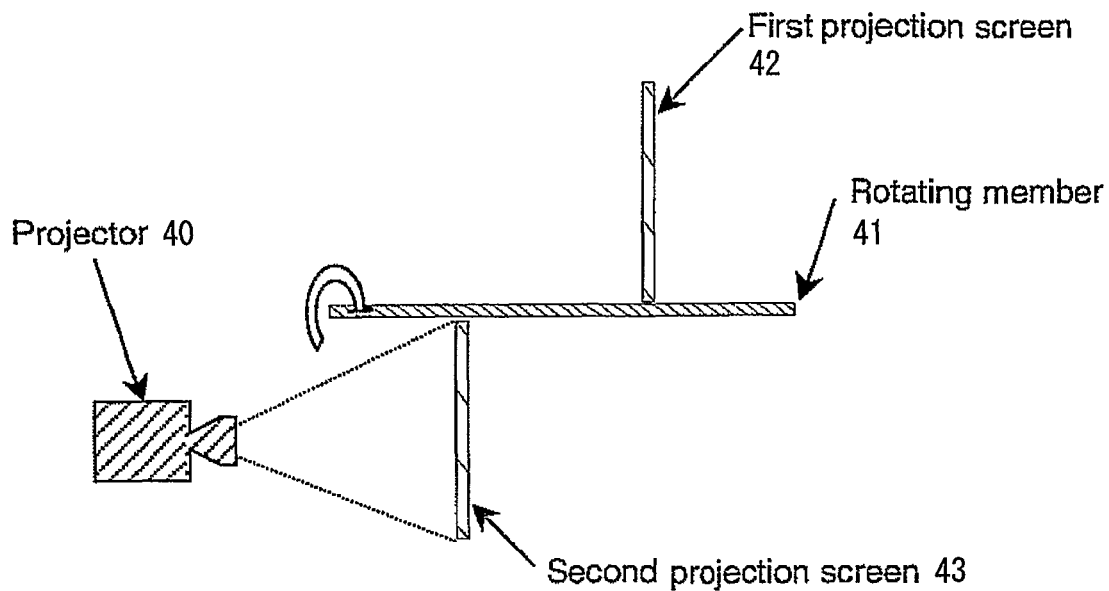
FIG. 6 is a cross-sectional diagrammatic view showing an example of conventional multiple image depth display.
Figure 7:
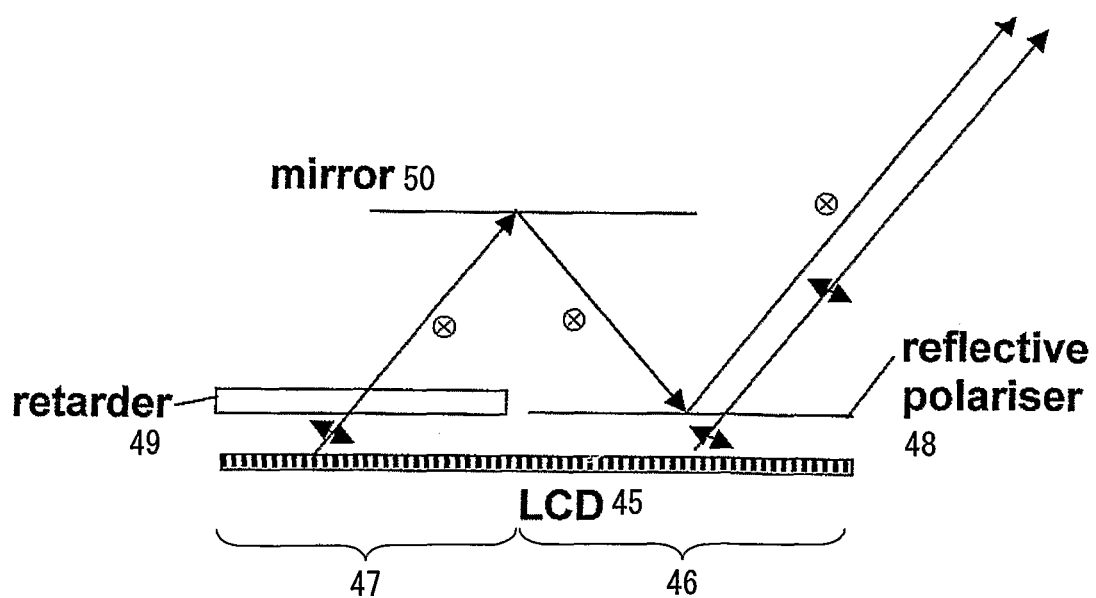
FIG. 7 is a cross-sectional diagrammatic view showing an example of conventional multiple image depth display.
Figure 8:
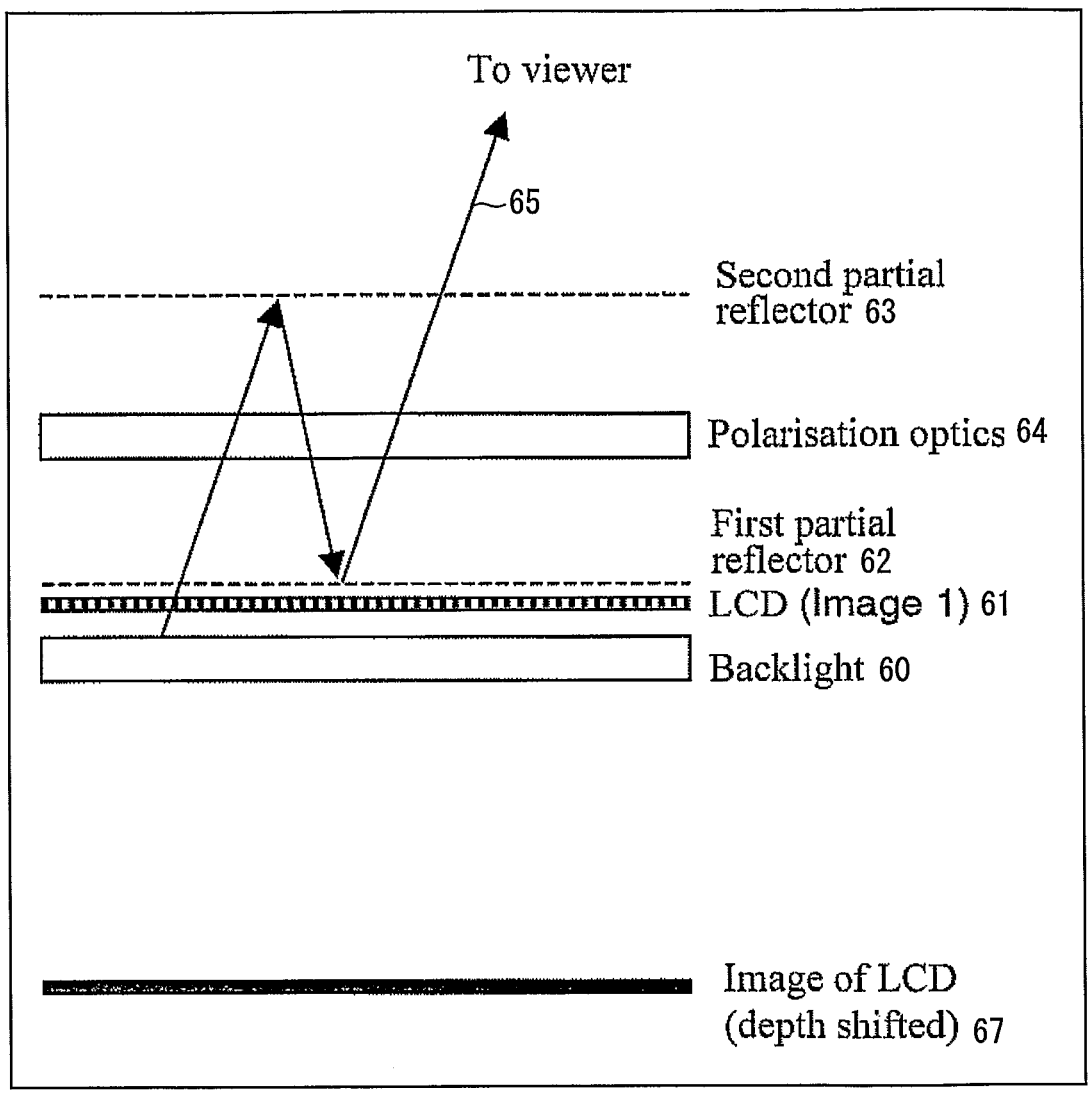
FIGS. 8(a) and 8(b) are diagrams illustrating a display constituting a generalized embodiment of the invention and illustrating a depth-adding mode and a "no-depth" mode, respectively.

FIGS. 8(a) and 8(b) illustrate the construction of a display and two operational modes of the display. The display comprises a backlight 60 disposed behind a spatial light modulator (SLM) in the form of a liquid crystal device (LCD) 61. First and second partial reflectors 62 and 63 are disposed in front of the LCD 61 (on the viewer side thereof) with polarization-modifying optics 64 disposed between the reflectors 62 and 63. The reflectors 62 and 63 are separated from each other by an appropriate spacing for producing a depth-shifted image and are parallel to each other and to an image surface of the LCD 61. For example, the partial reflectors 62 and 63 may be arranged to reflect one polarization state of light and to transmit the orthogonal state or may be partially reflecting mirrors (or combinations of reflecting elements) of some other type. The polarization optics 64 are arranged to change at least one polarization state of light passing in either or both directions through the optics 64.

The elements 61 to 64 are arranged such that light from first and second images or sequences of images displayed by the LCD 61 travels along different light paths towards an extensive viewing region where one or more viewers may be located. Examples of these light paths for the first and second images or sequences are illustrated at 65 and 66, respectively. For the first image or sequence, light is at least partially transmitted by the first reflector 62 towards the second reflector 63. The second reflector 63 reflects at least part of this light towards the first reflector 62, which reflects at least part of the incident light back towards the second reflector 63. The second reflector 63 transmits at least part of the reflected light to the viewing region so that light encoded with the first image or sequence follows a "zig-zag" path before reaching a viewer. The display is arranged such that light encoding the first image or sequence does not pass directly by transmission through the reflectors 62 and 63 to the viewer.

As illustrated by the light path 66, light encoded with the second image or sequence is transmitted at least partially by the reflectors 62 and 63 so as to follow an essentially direct path to the viewing region. As a result of the different paths 65 and 66, in particular their different lengths, the second image or sequence appears substantially at the location of the LCD 61 whereas the first image or sequence is shifted in depth so as to appear at the location 67. The display thus acts as a dual-depth display to allow a viewer to see images in different depth planes.

Whether light follows the path 65 or the path 66 may be determined in a number of different ways. Examples of these include using the paths 65 and 66 at different times or by different colours or by light emerging from different parts of the LCD 61.

Such a display may be operated in ways other than as a dual-depth display (in which a viewer can see images in the different depth planes at effectively the same time). For example, the display may be operated such that light follows the path 65 and does not follow the path 66. In this case, the display acts as a depth-shifting display so that images appear to come from a plane further away from the viewer than the LCD 61. Such an arrangement would allow the display to show images which appear further away and at a location where it is not be possible or convenient to mount the display.

The display may also be operated in such a way as to switch between the different depth image planes. For example, a gaming machine may show an image which appears at the image plane 67 during normal operation. However, when a player wins a prize, the depth plane may be switched so that the image appears to leap forwards.

Where the display is operated as a dual-depth display, images for the different planes may be displayed time-sequentially. Thus, the LCD 61 alternates between displaying the first and second images and, if necessary, the polarisation optics 64 are switched in synchronism so that light from the first images follows the light path 65 whereas light from the second images follows the light path 66. Provided switching between images is performed sufficiently rapidly to avoid the visibility of flicker, a viewer sees the images at their intended different depth planes.

This type of operation has the advantage that all images are displayed in full colour and at the full resolution of the LCD 61. However, this type of operation requires that the LCD 61 be capable of operating at a sufficiently high frame rate, for example of the order of 100 Hz or more, to eliminate the appearance of flicker. LCDs do exist for operating at such frame rates. However, the display is not limited to the use of LCD SLMs and other suitable devices may be used including light-emissive devices as well as light-attenuating devices with backlights. For example, other types of display devices which may be used include cathode ray tubes, plasma display devices, projection display systems and organic light emitting diode (OLED) display devices.

As an alternative, a dual-depth display may be based on polarization optics and reflectors which have a different effect on light of different wavelengths. For example, the reflectors 62 and 63 and the optics 64 may be arranged such that light of some wavelengths, for example red light, follows the path 66 whereas light of some other wavelengths, for example blue and green light, follows the path 65. A viewer would then see images where different colours appear in different depth planes.

This type of operation does not require the high frame rates of time-sequential displays. Also, images are displayed in the full spatial resolution of the display device, such as the LCD 61. However, full colour images cannot be shown in the different depth planes unless the wavelength bands are chosen to be sufficiently narrow for each primary colour (red, green, blue) to be split into two bands with one following the light path 65 and the other following the light path 66.

In another mode of operation suitable for a dual-depth display, the first and second images are spatially interlaced on the LCD 61. The reflectors 62 and 63 and the optics 64 are then arranged so that light from the pixels displaying the first images follows the path 65 whereas light from the pixels displaying the second images follows the path 66. The images may be interlaced in rows or columns on the LCD 61. Such an arrangement does not require a high frame rate and displays images in full colour. However, the resolution of the images is less than the basic spatial resolution of the LCD 61; for a dual-depth display, the resolution in which each image is displayed is half the basic resolution of the LCD 61.

Figure 9A:
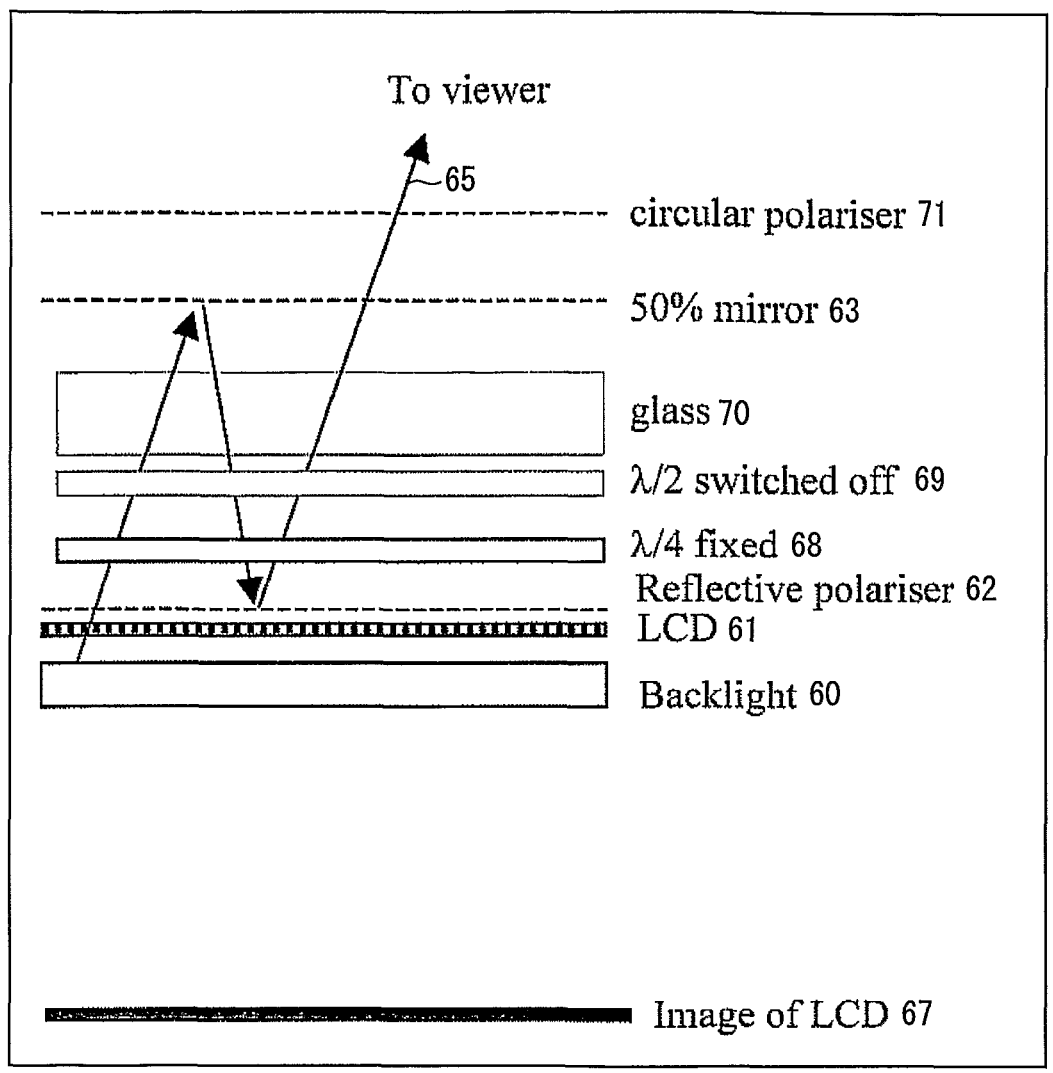
FIG. 9(a) to FIG. 9(c) are diagrams illustrating a display constituting a first embodiment of the invention.

FIGS. 9(a) and 9(b) illustrate a display of the type shown in FIGS. 8(a) and 8(b). In this embodiment, the first partial reflector 62 comprises a reflective polariser, which transmits one linear polarization state of light and reflects the orthogonal state. Such a polariser may, for example, comprise a wire-grid polariser of the type manufactured by Moxtek Inc.

or a DBEF (directional brightness enhancing film) manufactured by 3M. Where the LCD 61 requires an exit polariser, the reflective polariser 62 may be used as the exit polariser or may be provided in addition to the exit polariser.

A fixed quarter wave plate 68 is disposed above the reflective polariser 62 and is oriented so as to convert between linearly polarized light and circularly polarized light. Although the quarter wave plate 68 may simply comprise a film of birefringement material of the appropriate thickness, such a film performs the quarter wave function accurately for only a single wavelength. The quarter wave plate 68 may be formed from a plurality of birefringement layers in order to provide an element which acts as an ideal quarter wave plate for a range of wavelengths across the visible spectrum. Such films are available from Polatechno Limited of Japan or from Sumitomo Chemical Corporation of Japan.

A switchable half wave plate 69 is disposed above the quarter wave plate 68. Such a switchable halfwave plate may comprise a liquid crystal cell which is capable of being switched on and off electrically. Examples of such cells which are suitable for this application include the vertically aligned nematic (VAN) cell, the Freedericksz cell, and the pi cell or optically compensated birefringence (OCB) cell. Such cells are well known and are disclosed in standard reference publications on liquid crystal displays, such as "Liquid Crystal Displays Addressing Schemes and Electro-Optic Effects", Ernst Lueder, Wiley-SID Series in Display Technology 2001. Pi cells are well-suited to this application because of their ability to switch quickly between on and off states.

A spacer in the form of a layer of glass 70 or other transparent material having substantially no effect on the polarisation state of light passing therethrough is disposed above the switchable half wave plate 69. The spacer 70 is optional and may be provided in order to achieve the desired increase in apparent depth.

The second partial reflector 63 comprises a partially reflecting and partially transmitting mirror. The mirror 63 is illustrated as "50%" mirror which reflects approximately half of the incident light and transmits approximately half of the incident light. However, the fraction of light transmitted or reflected may be chosen in order to achieve a desired relative brightness of the images displayed at the different depths.

The mirror may be made by coating a thin layer of a metal such as aluminum on a transparent substrate or may comprise a coating of transparent dielectric layers (a dielectric mirror). Partial reflection may be achieved either by making the reflecting layer uniformly partially transparent, or by using a completely reflecting mirror with transparent gaps or holes. If these holes or gaps are on a scale smaller than those visible to the eye, then the hole or gap pattern will not be visible and the mirror will appear partially reflecting and partially transparent.

For mirrors constructed from metal layers, the use of holes or gaps may be preferable to a uniform partial reflector for two reasons: it may be difficult to control layer thickness accurately so as to achieve a reproducible and uniform reflectivity in a uniform layer; and dependence of reflectivity on polarisation state may be weaker in a mirror with holes than in a uniformly partially reflecting mirror.

A circular polariser 71 is disposed above the mirror 63. The circular polariser transmits left-handed circularly polarized light and absorbs right-handed circularly polarized light. The order of the optical elements may be varied without changing the operation of the display. For example, the glass layer 70 may be disposed anywhere between the reflective polariser 62 and the partially-reflecting mirror 63. Also, the positions of the quarter wave plate 68 and the switchable half wave plate 69 may be exchanged.

Figure 10:
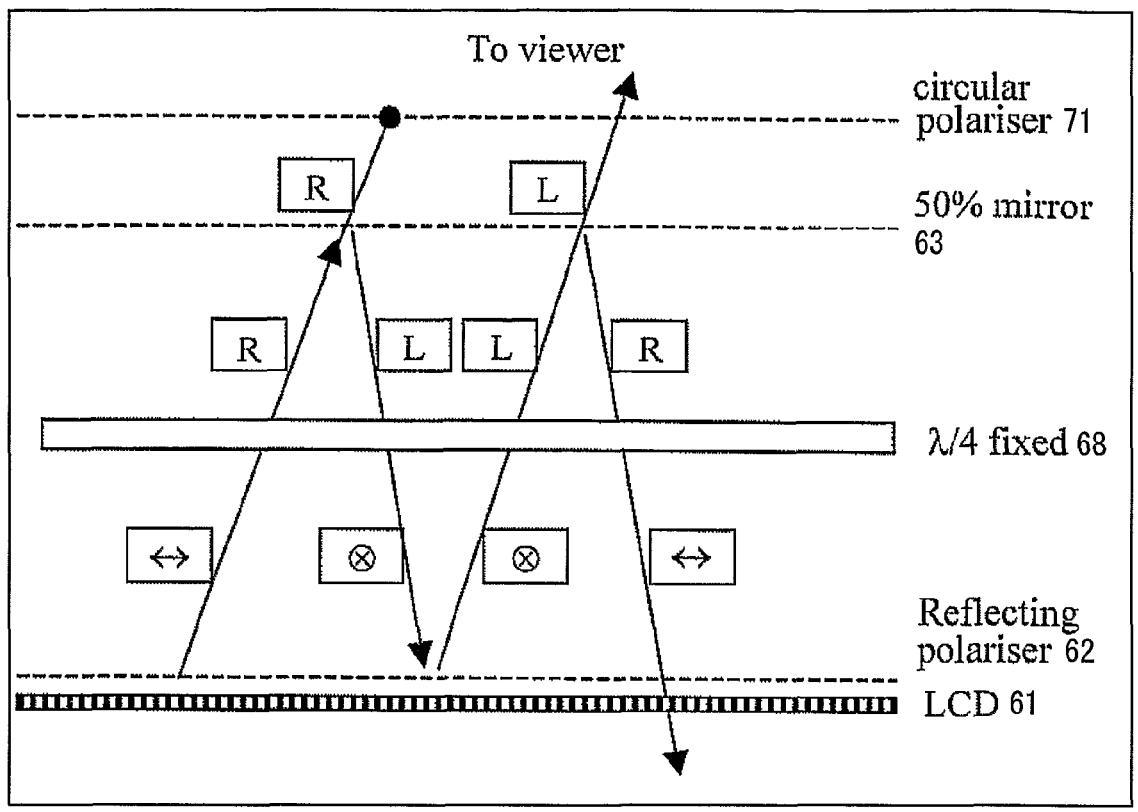
FIGS. 10(a) to 10(d) are diagrams illustrating the operation of the first embodiment.
Figure 10:
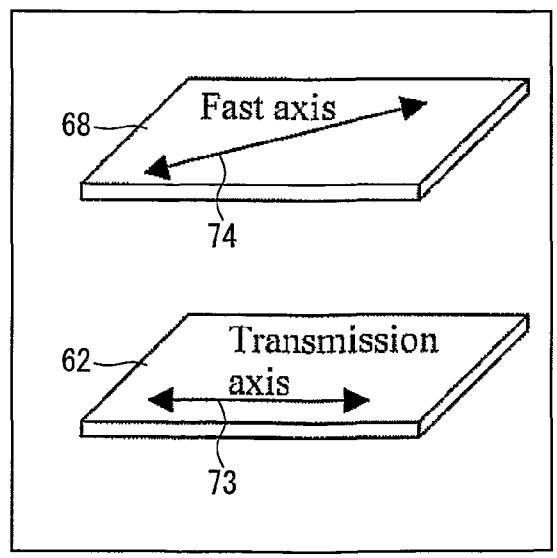
Figure 10:
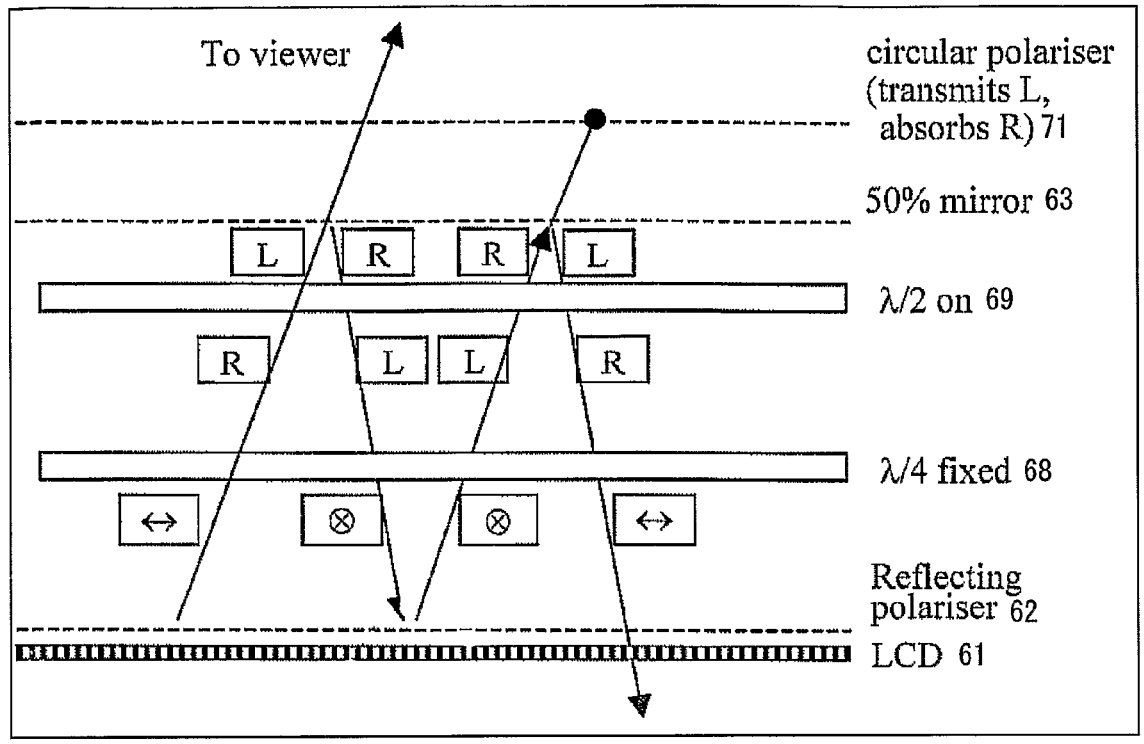
Figure 10:
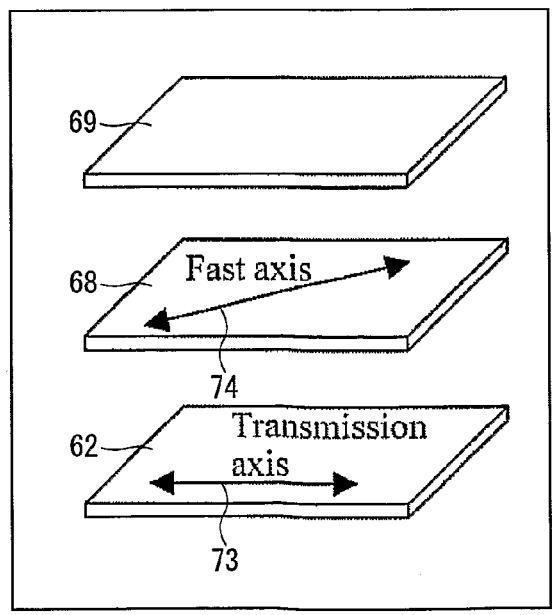

Operation of the display in the depth-shifting mode is illustrated in FIGS. 10(*a*) and 10(*b*). The polariser 62 has a transmission axis 73 oriented in the plane of the drawing and the quarter wave plate 68 has a fast axis 74 oriented at 45° to the transmission axis 73. Light from the LCD 61 is polarized with its electric field vector in the plane of the drawing ( « ) and thus passes through the reflective polariser 62. The quarter wave plate 68 converts the linearly polarized light to right-handed circularly polarized light R, which is partially reflected and partially transmitted by the mirror 63. In this mode, the half wave plate 69 is switched off and is therefore omitted from (a) in FIG. 10).

The transmitted light is absorbed and therefore blocked by the circular polariser 71 whereas the reflected light is converted to left-handed circularly polarized light L. The quarter wave plate 68 converts the light to a state which is linearly polarized in a direction perpendicular to the plane of the drawing (Ä). This light is reflected by the reflecting polariser 62 and is converted to left-handed circularly polarized light by the quarter wave plate 68. The portion of this light which is transmitted by the mirror 64 is also transmitted by the circular polariser 71 and propagates towards the viewing region of the display. The portion of light reflected by the mirror 63 is converted to right-handed circularly polarized light, which is converted by the quarter wave plate 68 to light which is linearly polarized in a direction parallel to the plane of the drawing. This light is transmitted back into the LCD 61 by the polariser 62.

Figure 9:
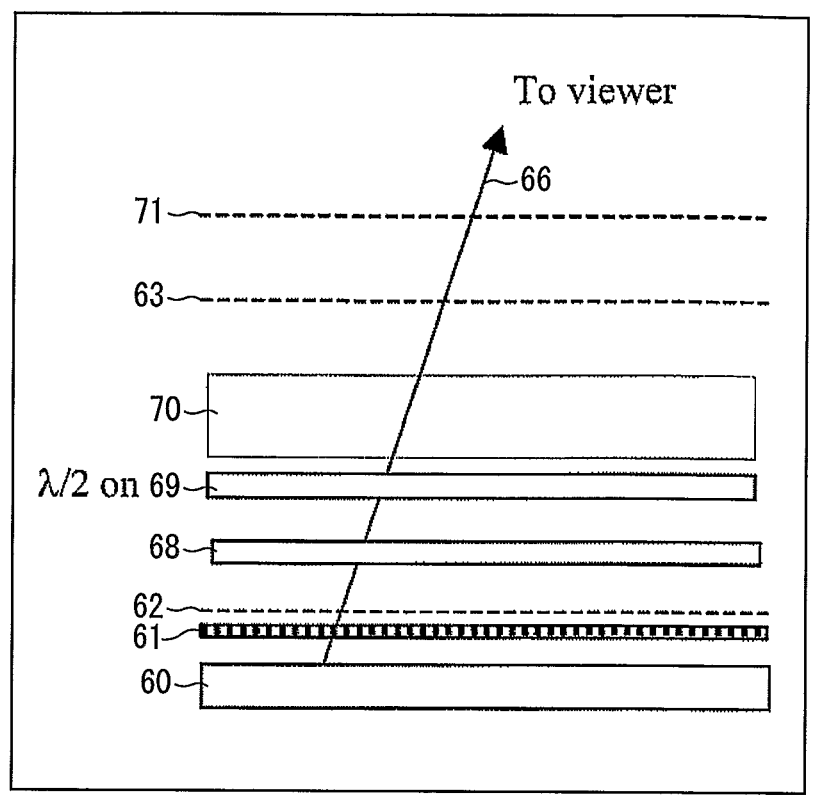
Figure 9:
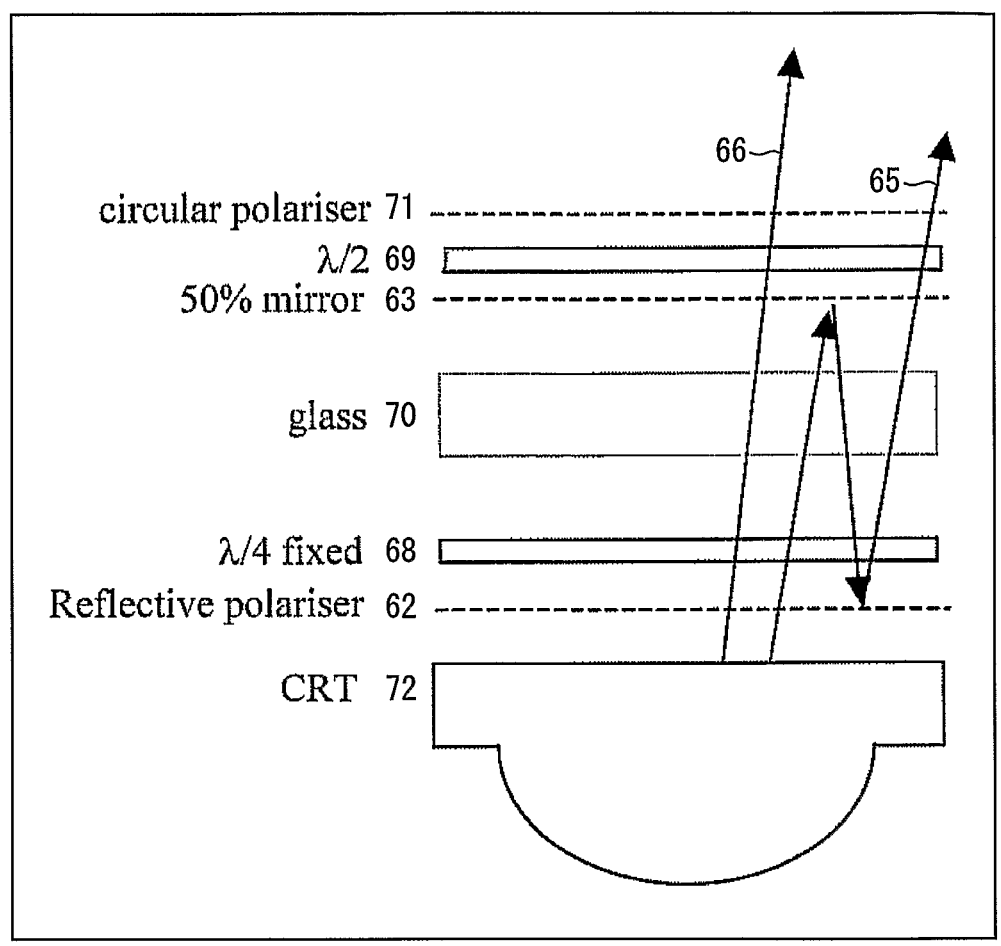

In this mode of operation, the only light which passes to the viewing region is that which has been reflected by the partial reflectors 62 and 63. Thus, as described hereinbefore, a viewer sees an image of the LCD 61 at the position 67 as illustrated in FIG. 9(*a*). The image is effectively displaced "downwards" from its actual position by approximately twice the separation between the partial reflectors 62 and 63, the actual displacement being also determined by the refractive indices of various elements of the display.

FIGS. 10(*c*) and 10(*d*) illustrate the operation of the display with the half wave plate 69 switched on. As illustrated at in FIG. 10(*d*), the fast axis of the half wave plate 69 may have any orientation. However, in practice, for example because of imperfections in the optical elements used in the display or because of dependence of their properties on viewing angle, there may be a preferred orientation. In this application, the half wave plate coverts between right-handed circularly polarized light R and left-handed circularly polarized light L.

As illustrated in FIG. 10(*c*), light which is linearly polarized with its direction of polarization in the plane of the drawing is transmitted by the reflecting polariser 62 and converted to right-handed circularly polarized light by the quarter wave plate 68. The half wave plate 69 converts this to left-handed circularly polarized light which is partly transmitted and partly reflected by the mirror 63. The transmitted light passes through the circular polariser 71 towards the display viewing region. The reflected light is converted to right-handed circularly polarized light, which the half wave plate 69 converts to left-handed circularly polarized light. The quarter wave plate 68 converts this to light which is linearly polarized in a direction perpendicular to the plane of the drawing. This light is reflected by the reflecting polariser 62 and converted to left-handed circularly polarized light by the quarter wave plate 68.

The half wave plate 69 converts this light to right-handed circularly polarized light, part of which is transmitted and part of which is reflected by the mirror 63. The transmitted light is absorbed by the circular polariser 71 and so is blocked and prevented from being transmitted to the viewing region. The reflected light is converted to left-handed circularly polarized light, which is converted to right-handed circularly polarized light by the half wave plate 69. The quarter wave plate 68 converts this to light which is linearly polarized in a direction parallel to the plane of the drawing and the reflecting polariser 62 transmits this light back to the LCD 61.

In order to operate the display illustrated in FIGS. 9$a$, 9$b$ and 10$a$ to 10$d$ in the dual-depth mode, the display is operated time-sequentially. Thus, images which are to be visible with and without depth-shifting are alternately displayed by the LCD 61. When an image to be depth-shifted is displayed, the half wave plate is switched off and the display operates as illustrated in FIG. 10($a$). When the next non-shifted image is displayed, the half wave plate 69 is switched on and the display operates as illustrated in FIG. 10($c$). The half wave plate 69 and the LCD 61 are required to operate at a switching or frame rate which is sufficiently high to cause little or no flicker to be perceived by a viewer. Frame rates of between 80 and 120 Hz may be used with the actual rate being determined from the brightness of the image and environmental factors.

Where the mirror 63 reflects approximately 50% and transmits approximately 50% of the incident light and the first and second images are displayed for substantially equal time periods, the depth-shifted image seem by a viewer has a brightness which is approximately one quarter of its original brightness as displayed by the LCD 61, whereas the non-shifted image has a brightness of about half that displayed by the LCD 61. The total time-averaged brightness of the display is therefore about ⅜ of the brightness displayed by the LCD 61. However, the display periods of the images and the reflectivity/transmissivity of the mirror 64 may be varied to select the relative brightnesses of the images and the total time-averaged brightness of the display. For example, if the depth-shifted image is displayed for twice the duration of the non-shifted image, then the apparent brightnesses of the images are substantially equal but the time-averaged brightness becomes one third of the LCD brightness. Also, if the transmission of the mirror 63 is increased above 50%, the increase in brightness of the non-shifted image is larger than the decrease in brightness of the depth-shifted image so that the overall display brightness increases.

As mentioned hereinbefore, the order of the optical elements may be varied without changing the way in which the display operates. However, because of variations in the elements from ideal behaviour or of wavelength-dependencies, there may be a "best" order of the elements in any specific example. Alternative orders of the optical elements which function in slightly different ways are also possible. For example, as shown in FIG. 9($c$), the switchable half wave plate 69 may be disposed between the mirror 63 and the circular polariser 71. In this arrangement, light passes only once through the switchable half wave plate 69 so that the effects of any imperfections in its operation are reduced.

As mentioned hereinbefore, any type of transmissive or emissive display device may be used in such displays. By way of example, FIG. 9($c$) illustrates the use of a cathode ray tube (CRT) 72 in place of the backlight 60 and the LCD 61.

Where a liquid crystal cell is used as the switchable half wave plate 69, the performance may be improved by the addition of one or more compensation films. For example, liquid crystal cells may have some residual retardance when they are nominally switched "off", generally when a voltage is applied across a liquid crystal layer of the cell. By way of particular example, in the case of a cell which has been designed to switch between zero retardance and 275 nm retardance, there may be a residual retardance of 50 nm when the cell is switched to provide nominally zero retardance. Such residual retardance can cause visible crosstalk between the image depth planes. This may be substantially removed by arranging for the cell to have a retardance of 325 nm in the "on" state and by providing a 50 nm fixed retarder in series with the cell and with its fast axis perpendicular to that of the cell. The total retardance in the "on" state is then the desired 275 nm and the residual retardance is cancelled to provide zero retardance in the "off" state. Further, the actual retardance in both states may be adjusted by varying the applied voltages to achieve a desired or optimum performance.

The orientation of some elements about an axis perpendicular to the display plane may be varied from the example given in FIGS. 10($b$) and 10($d$). For example, the quarter wave plate 68 may be rotated by 90° so that the polarisation state of light on each pass through the quarter wave plate 68 is orthogonal to the states illustrated in FIGS. 10($a$) and 10($c$). This results in the depth-shifted image being visible when the half wave plate 69 is switched on and the non-shifted image being visible when the half wave plate 69 is switched off. Also, the circular polariser 71 may be of the type which transmits right-handed circular polarization and reflects or absorbs left-handed circular polarization. The half wave plate 69 may be rotated without theoretically affecting performance but, because of deviations from ideal behaviour or wavelength-dependence, there may be a preferred orientation in practice.

As mentioned hereinbefore, the display device need not be an LCD, although LCDs have the advantage that they emit light which is already polarized so that relatively little light is lost through the reflective polariser 62. However, it tends to be more difficult to drive LCDs at high speed in order to provide a flicker-free time sequential display so that faster display devices, such as rear projectors, cathode ray tubes, plasma displays and organic LED displays, may also be used.

Although the reflectors 62 and 63 are illustrated as being parallel to each other and to the image surface of the LCD 61, this is not necessary. For example, there may be applications where the depth-shifted and un-shifted images are required to appear to be non-parallel with each other, in which case the reflectors may be oriented appropriately so as to achieve this.

Some of the elements of the display may be made from two or more parts, which may be disposed in different locations from the locations illustrated in FIGS. 9($a$) to 9($c$). For example, the circular polariser 71 may comprise a quarter wave plate and a linear polariser and these two elements may be separated. For example, the linear polariser may be in the location illustrated for the circular polariser and the quarter wave plate may be below this and separated from the linear polariser by the glass layer 70 or by the switchable half wave plate 69.

Although the displays illustrated in FIGS. 9($a$) to 9($c$) and 10($a$) to 10($d$) have been described as providing images for simultaneous viewing at different depth planes, the display may be operated in any of the ways described hereinbefore, as with all of the other displays described herein. For example, an image may be arranged to be switched from one plane to the other so as to appear to move backwards or forwards. In the example described hereinbefore for a gaming machine, the image may be controlled so as to leap forward in order to attract the attention of viewers when a player wins a prize. Also, the display area may be divided into two or more segments, which may be controlled independently of each other, for example so that the apparent depth of the displayed image may be selected for each segment independently of each other segment.

The embodiment illustrated in FIGS. 9(a) to 9(c) and 10(a) to 10(d) is capable of displaying images in two image planes of different depths. However, the same technique may be used to create more than two image planes, all having different depths with respect to the display, and FIG. 11 illustrates an example of this.

Figure 11:
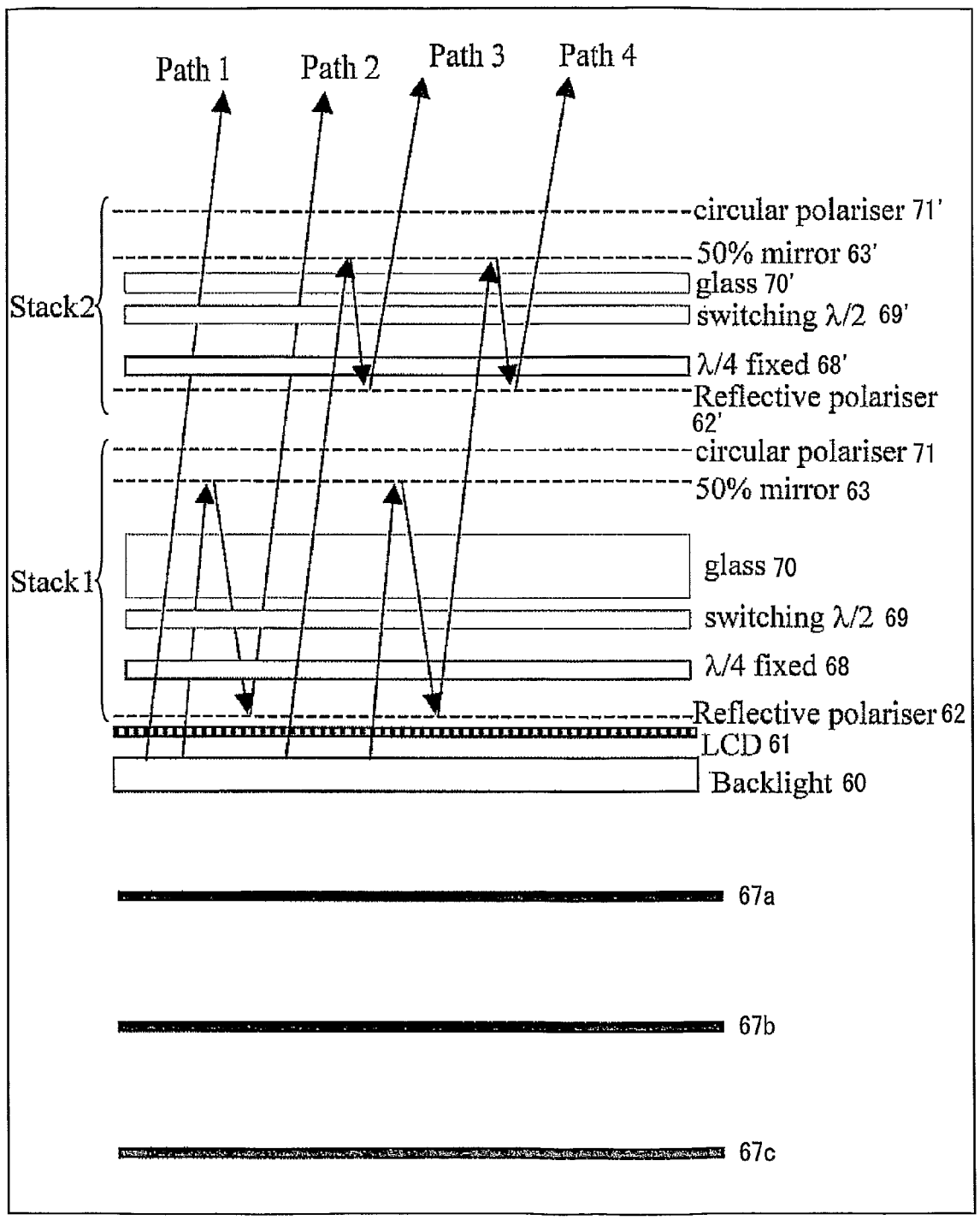
FIG. 11 is a diagram illustrating a display constituting a further modified first embodiment of the invention.

The display shown in FIG. 11 comprises elements 60 to 63 and 68 to 71 of the same type and in the same relative positions as illustrated in FIGS. 9a and 9b. The elements 62, 63 and 68 to 71 are referred to in the drawing as "stack 1" disposed above the LCD 61. A further set of elements referred to as "stack 2" in FIG. 11 is disposed above stack 1 and comprises a reflective polariser 62', a fixed quarter wave plate 68', a switchable half wave plate 69', a glass spacer 70', a "50%" mirror 63' and a circular polariser 71'. The elements of stack 1 are thus duplicated in stack 2 and are substantially identical except that the glass spacer 70' is of a thickness different from that of the glass spacer 70. This arrangement is therefore capable of displaying images at image planes of four different depths with respect to the display.

When both of the half wave plates 69 and 69' are switched on, light passes directly through the layers along "path 1" to the viewing region so that a displayed image is perceived as emanating substantially from the actual location of the image-producing plane of the LCD 61. When the half wave plate 69' is switched on and half wave plate 69 is switched off, light follows "path 2", which includes reflections at the mirror 63 and the reflective polariser 62. A displayed image appears to be located at the image plane 67b. When the half wave plate 69' is switched off and the half wave plate 69 is switched on, light follows "path 3", which includes reflections at the mirror 63' and the reflective polariser 62'. A displayed image is perceived at the image plane 67a. When both of the half wave plates 69 and 69' are switched off, light follows "path 4", which includes reflections at the mirror 63, the reflective polariser 62, the mirror 63' and the reflective polariser 62'. A displayed image is thus perceived at the image plane 67c.

The display of FIG. 11 may be operated in any of the ways described hereinbefore in order to achieve a desired effect. For example, by displaying four images or sequences of images time-sequentially and controlling the switchable half wave plates 69 and 69' in synchronism, images at four different-depth image planes may be viewed effectively simultaneously by a viewer. Alternatively, the image planes may be switched to give the impression of motion towards and away from the viewer.

Figure 12A:
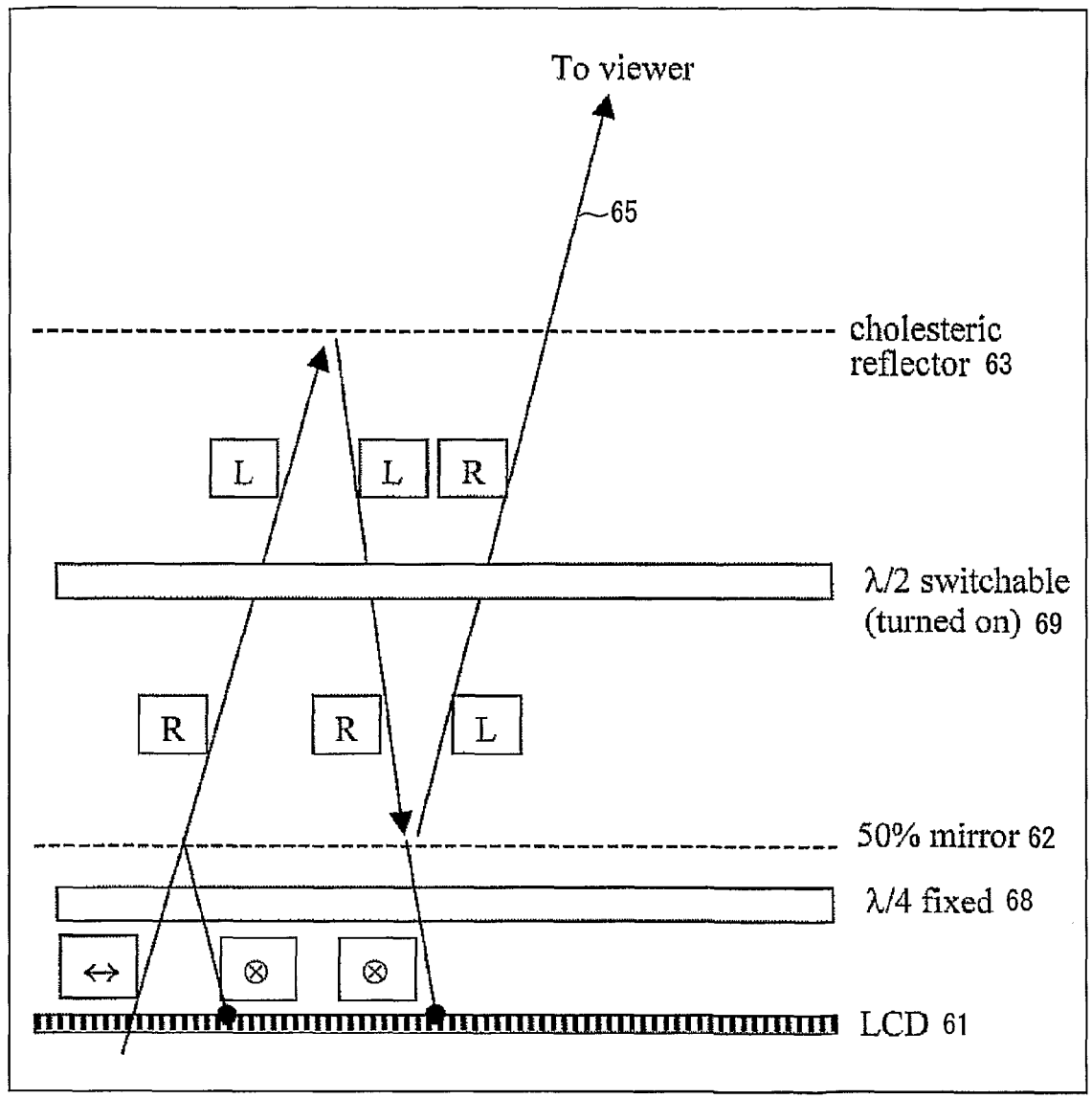
FIGS. 12(a) and 12(b) are diagrams illustrating the structure and operation of a display constituting a second embodiment of the invention.
Figure 12:
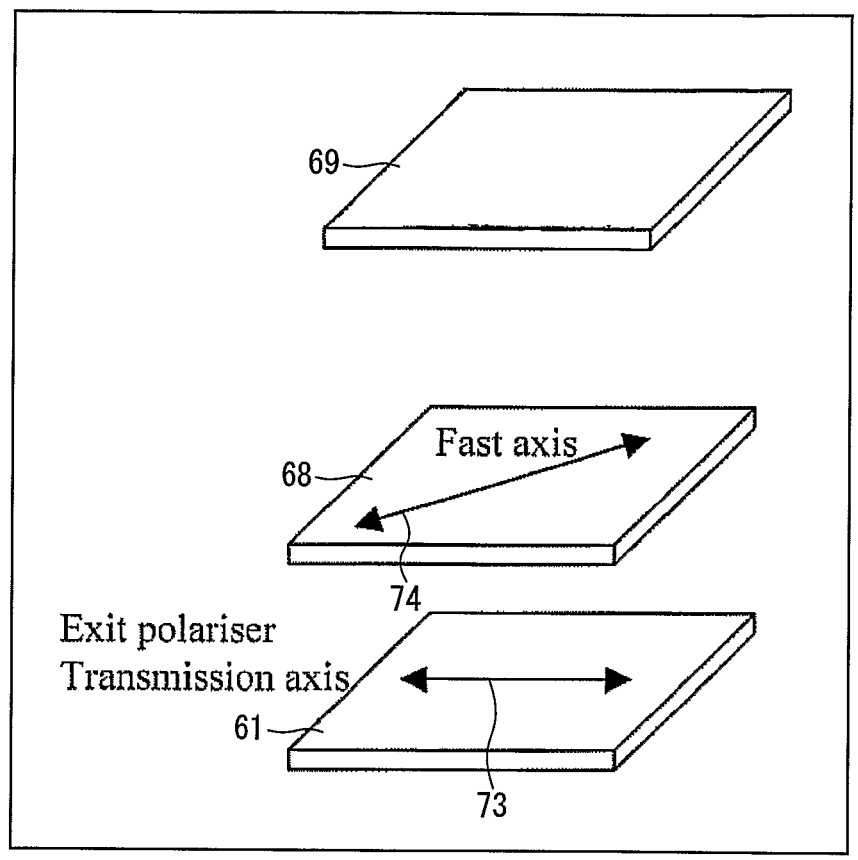

The display shown in FIGS. 12(a) and 12(b) comprises a backlight (not shown) and an LCD 61 as the display device although, as in the case of all of the embodiments described herein, any suitable display device may be used. In this embodiment, the first partial reflector 62 comprises a partially reflecting mirror which, in this example, is arranged to transmit substantially 50% of incident light and to reflect substantially 50% of incident light (ignoring light losses). Also, the second partial reflector 63 comprises a cholesteric reflector which transmits one circular polarization state (in this case right-handed R) and reflects the orthogonal circular polarization state (in this example left-handed L). The cholesteric reflector 63 comprises a liquid crystal layer with a natural helical structure. Such reflectors are well-known and are disclosed, for example, in the reference by Lueder mentioned hereinbefore. Such reflectors may be arranged so as to be switched off by the application of an applied electric field or may be fixed and unswitchable, in which case the liquid crystal layer may be fixed by polymerization.

In the display shown in FIGS. 12(a) and 12(b), the fixed quarter wave plate 68 is disposed between the LCD 61 and the mirror 62. The LCD 61 has an exit polariser with a transmission axis 73 and the quarter wave plate 68 is oriented with its fast axis 74 at 45° to the transmission axis 73. As in the previous embodiment, the display comprises a switchable half wave plate 69 between the reflectors 62 and 63 with its fast axis in any desired orientation.

FIGS. 12(a) and 12(b) illustrates operation in the depth-shifting mode of image display. The linearly polarized light with its electric field vector oriented parallel to the plane of the drawing is converted to right-handed circularly polarized light R by the quarter wave plate 68. Approximately half of this light is transmitted by the mirror 62 whereas approximately half is reflected, converted by the quarter wave plate 68 to linearly polarized light with its electric field vector perpendicular to the plane of the drawing, and absorbed by the exit polariser of the LCD 61. The half wave plate 69 is active and converts the transmitted light to left-handed circularly polarized light L. This polarization state is reflected by the cholesteric reflector 63 and converted to right-handed circularly polarized light R. Approximately half of this light is transmitted by the mirror 62, converted by the quarter wave plate 68 to linearly polarized light with its electric field vector perpendicular to the plane of the drawing, and absorbed by the exit polariser of the LCD 61. Half of the incident light on the mirror 62 is reflected and converted to left-handed circularly polarized light L. This is converted to the right-handed circularly polarized state R by the half wave plate 69 and is transmitted towards the viewing region by the cholesteric reflector 63.

In the non-depth shifted mode of operation (not illustrated in the drawings), the half wave plate 69 is switched off and so has substantially no effect on the polarisation state of light propagating through it. As before, light emitted by the LCD 61 is converted to right-handed circularly polarized light, which is transmitted without any substantial change in polarization by the switched-off half wave plate 69 and is transmitted by the cholesteric reflector 63 towards the viewing region.

In order to provide the desired shift in perceived depth of the image, the reflectors 62 and 63 are spaced apart by the appropriate distance and this may be adjusted by means of a transparent spacer (not shown), for example made of glass. Also, the order of the elements may be changed from that illustrated in FIGS. 12(a) and 12(b). For example, the half wave plate 69 may be disposed between the quarter wave plate 68 and the mirror 62 or the positions of the mirror 62 and the cholesteric reflector 63 may be exchanged. It is further possible to replace the cholesteric reflector 63 with a combination comprising a quarter wave plate and a reflective polariser.

Figure 13:
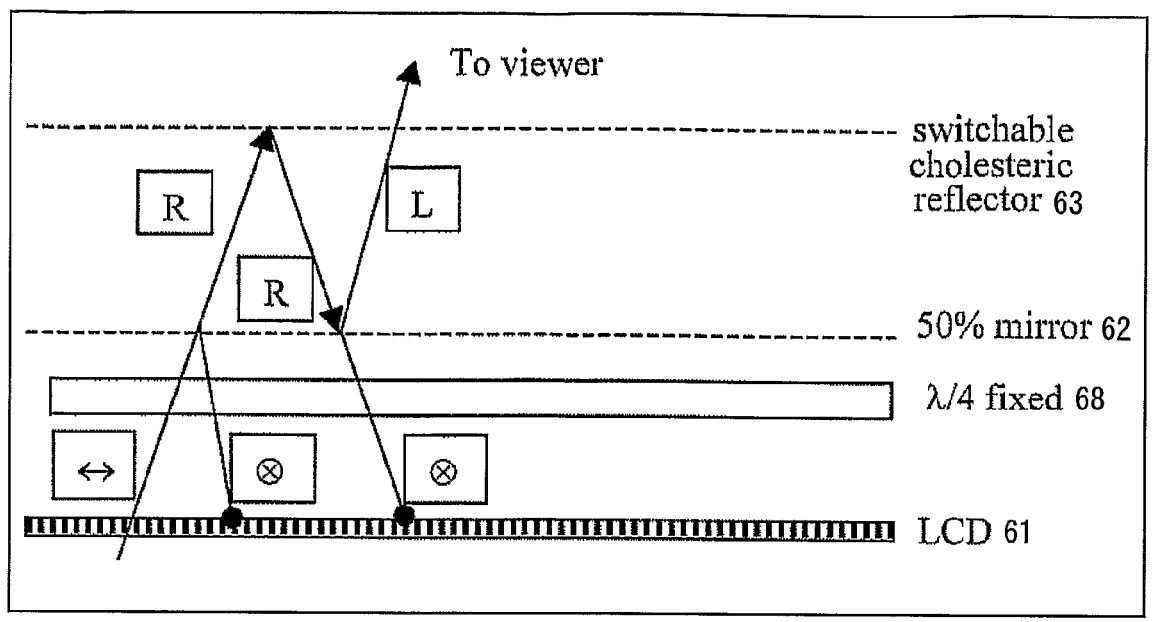
FIGS. 13(a) to 13(c) are diagrams illustrating a display (FIGS. 13(a) and 13(b)) and a modified display (FIG. 13(c)) constituting third embodiments of the invention.
Figure 13:
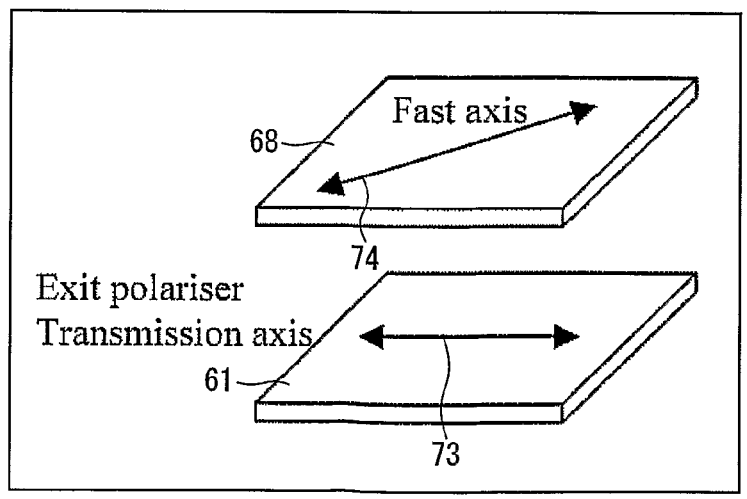

The display illustrated in FIGS. 13(a) and 13(b) differs from that shown in FIGS. 12(a) and 12(b) in that the switchable half wave plate 69 is omitted and the cholesteric reflector 63 is of the switchable type which, when switched off, transmits light irrespective of its polarisation state and, when switched on, transmits left-handed circularly polarized light L and reflects right-handed circularly polarized light R. The general arrangement and operation in the depth-shifted mode is illustrated in FIG. 13a and the orientation of the quarter wave plate and exit polariser of the LCD 61 are illustrated in FIG. 13b.

In the depth-shifted mode, the cholesteric reflector 63 is switched on. The LCD 61 emits linearly polarized light with its electric field vector oriented in the plane of the drawing. This is converted to right-handed circularly polarized light R by the quarter wave plate 68, approximately half of which is transmitted by the mirror 62 without any substantial change to the polarisation state and approximately half of which is reflected towards the quarter wave plate 68. The quarter wave plate 68 converts the reflected light to linearly polarized light with the electric field vector perpendicular to the plane of the drawing and this light is absorbed by the exit polariser by the LCD 61.

The light transmitted by the mirror 62 is reflected by the cholesteric reflector 63. Half of this light is transmitted by the mirror 68 and absorbed as described hereinbefore. The reflected portion of the light is converted to the left-handed circularly polarized state and is transmitted by the reflector 63 towards the viewing region.

In the non-shifted mode, the cholesteric reflector 63 is switched off. The portion of light emitted by the LCD 61 and transmitted by the mirror 62 is thus transmitted through the reflector 63 to the viewing region.

Switchable cholesteric reflectors can be made to operate over a relatively narrow band of wavelengths, typically of the order of 100 nm. It may therefore be necessary to embody the switchable cholesteric reflector 63 as a stack of such switchable reflectors. For example, three such reflectors may be provided for selectively reflecting the primary colours red, green and blue. Such reflectors are disclosed, for example, in "Reflective multicolour displaying using cholesteric liquid crystals", M. Okada et al, SID 1997 Digest and "Multiple color high resolution reflective cholesteric liquid crystal displays", D. Davies et al, SID 1997 Digest. In such an arrangement, the three colours can be switched independently of each other so that different colours may operate in the different modes. By switching the colours between the modes at different times, the visibility of flicker may be reduced.

Displays of this type can be modified so as to show more than two depth planes. For example, a display of this type capable of showing three different depth planes is illustrated in FIG. 13c. This display differs from that shown in FIG. 13a in that the switchable cholesteric reflector 63 is replaced by two spaced-apart cholesteric reflectors 63a and 63b. With both of the reflectors 63a and 63b switched off, light follows a "direct" path 66 so that substantially no depth-shifting of the displayed image takes place. With the reflector 63a switched on and the reflector 63b switched off, the display operates as illustrated in FIG. 13a and light follows a longer path 65a to provide a relatively large shift in depth of the displayed image. When the reflector 63b is switched on and the reflector 63a is switched off, light follows the path 65b to provide a different depth-shifted image plane.

Figure 14:
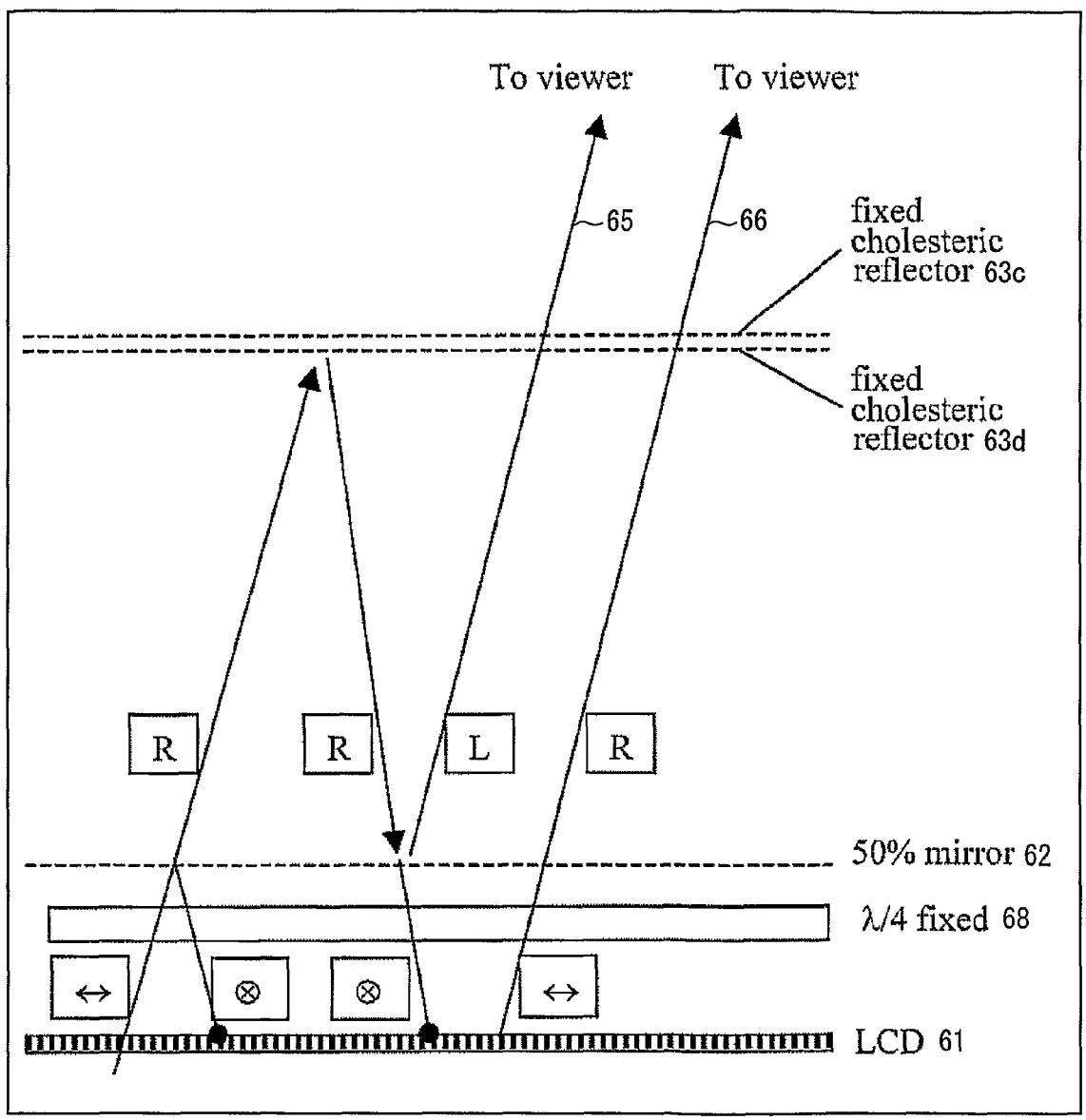
FIGS. 14(a) and 14(b) are diagrams illustrating the structure and operation of a display constituting a fourth embodiment of the invention.

FIGS. 14(a) and 14(b) illustrate a display which is similar to those shown in FIGS. 13(a) to 13(c) but in which the switchable cholesteric reflector or reflectors are replaced by a pair of fixed "single colour" cholesteric reflectors 63c and 63d. The reflectors 63c and 63d are disposed immediately adjacent each other with minimal spacing. The reflector 63c reflects red right-handed circularly polarized light and transmits all other light whereas the reflector 63d reflects blue right-handed circularly polarized light and transmits all other light.

Green light emitted by the LCD 61 is converted to right-handed circularly polarized light R by the quarter wave plate 68, approximately half of which is transmitted and approximately half of which is reflected by the mirror 62. The reflected light returns through the quarter wave plate 68 and is absorbed in the LCD 61 as described hereinbefore. The transmitted light passes through the reflectors 63c and 63d along a direct light path 66 to the viewing region.

Red and blue light emitted by the LCD 61 is similarly converted to right-handed circularly polarized light R by the quarter wave plate 68 and is partially transmitted by the mirror 62. The red light is reflected by the reflector 63c and the blue light is reflected by the reflector 63d back towards the mirror 62, where part of the light is transmitted and absorbed and part is reflected. The reflected red and blue light has its polarization changed by this reflection to the left-handed circularly polarized state L and this reflected red and blue light is transmitted by the reflectors 63c and 63d along a light path 65.

The light paths 65 and 66 are therefore of different lengths for the different colours. A viewer therefore sees an image with two depth planes, the deeper image containing red and blue and the shallower image containing green.

The use of red and blue cholesteric reflectors is merely exemplary and reflectors for other combinations of colours may be used. Also, the reflectors may be spaced apart in different planes, for example so that the three primary colours are shown in different image planes. Another possibility when using this type of reflector is to switch different colours at different times. For example, a dual depth display may switch rapidly between a state A and a state B. In the state A, red and blue components for the "front" depth plane and a green component for the "rear" depth plane are displayed. In the state B, red and blue components for the rear depth plane and a green component for the front depth plane are displayed.

Figure 15B:
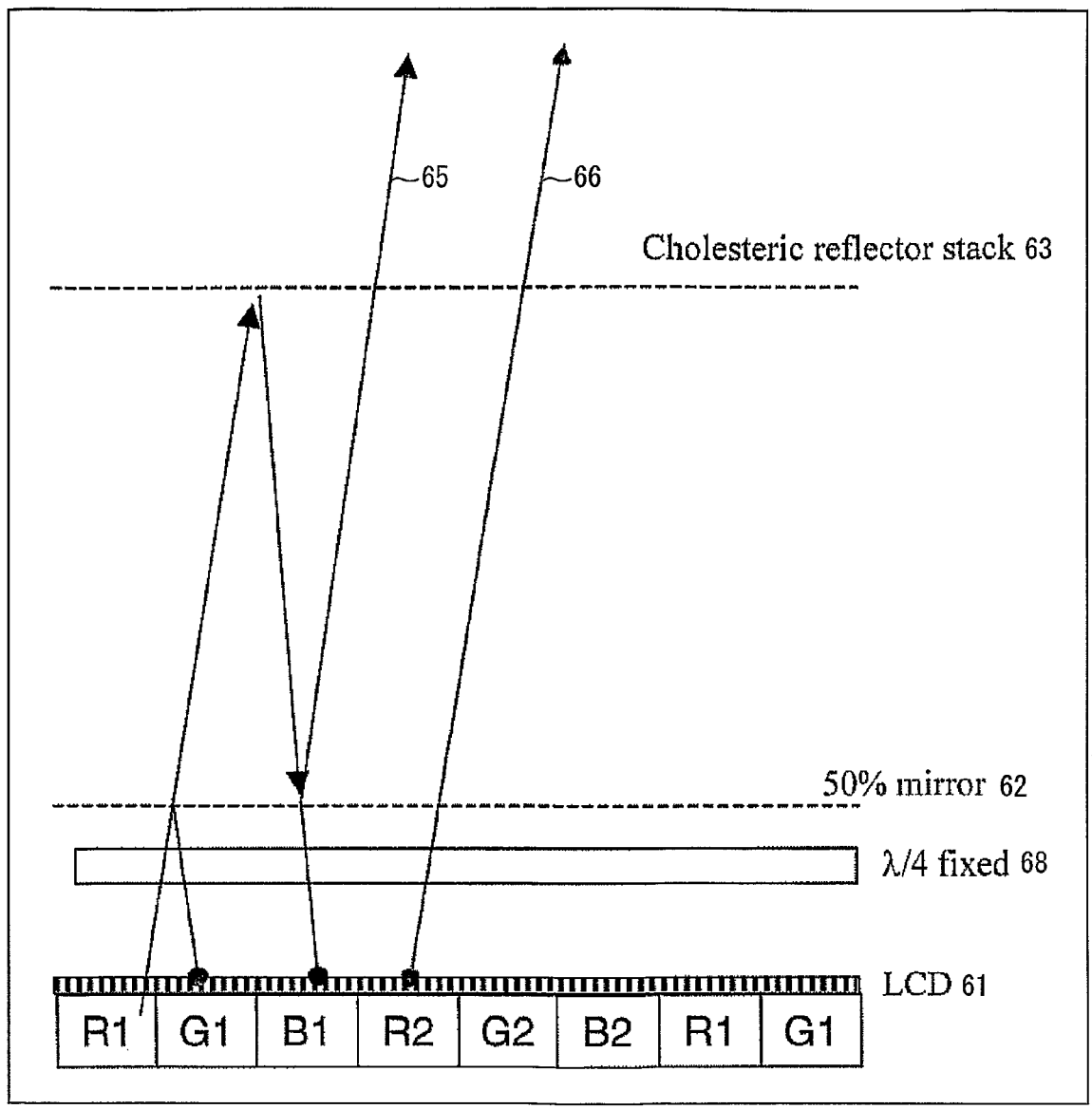

FIG. 15(b) illustrates a display of the same general type as that shown in FIG. 14(a) but providing "full colour" images at two different depths. The display comprises a cholesteric reflector stack 63, which is arranged to reflect light of the right handed circularly polarized state in a relatively narrow red waveband R1, a relatively narrow green waveband G2, and a relatively narrow blue waveband B1. The pixels of the LCD 61 have colour filters for transmitting light in the wavebands R1, R2, G1, G2, B1 and B2 as illustrated in FIG. 15(a). For example, the LCD 61 may include a colour filter arrangement with a repeating pattern, for example of columns or rows for transmitting a repeating pattern such as R1, G1, B1, R2, G2, B2. The cholesteric reflector stack 63 may comprise three reflectors, each of which reflects one of the bands of a respective colour. However, it is also possible to provide two cholesteric reflectors having the reflection spectra shown as C1 and C2 in FIG. 15(a) so that one reflector reflects the waveband B1 whereas the other reflector reflects the wavebands G2 and R1.

The LCD 61 displays two images as spatially multiplexed or interlaced strips with one image being encoded by light in the wavebands R1, G2 and B1 and the other image being encoded by light in the wavebands R2, G1 and B2. Light encoding the first such image follows the light path 65 whereas light encoding the second such image follows the light path 66. Thus, two full-colour or approximately full-colour images or sequences are displayed at different perceived depths.

Such a display may be modified for use with a backlight which is controllable to illuminate the LCD 61 with light in each of the wavebands in turn. The LCD 61 in such an arrangement does not require any colour filters and may be operated so as to display the red, green and blue portions of the two images time-sequentially and in synchronism with the colour of illumination by the backlight. Alternatively, the colour filter arrangement illustrated in FIGS. 15(a) and 15(b) may be used with a backlight which supplies light of different red, green and blue wavebands in alternate image frames so that the two images or sequences are displayed time-sequentially in synchronism with operation of the backlight.

Figure 16:
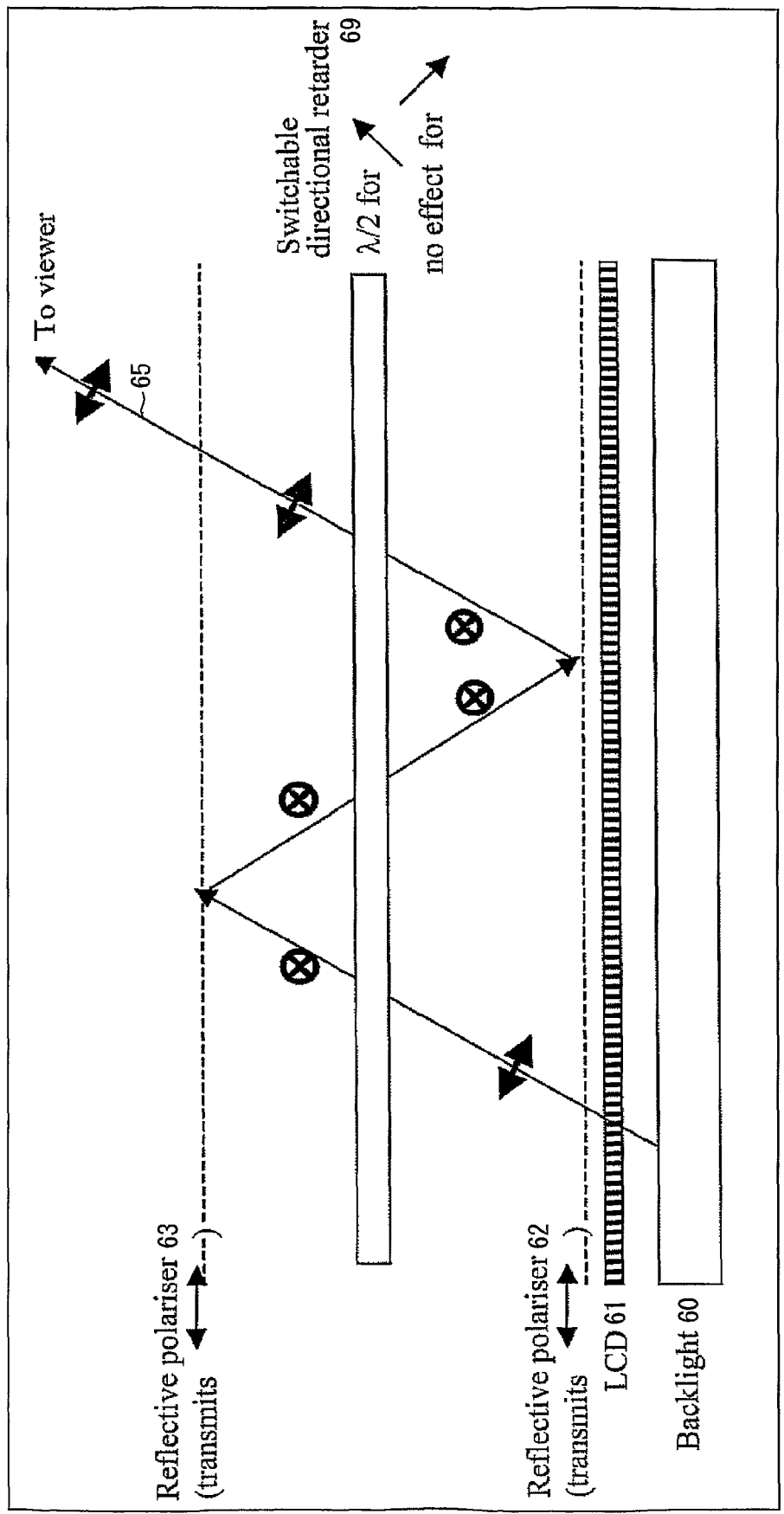
FIG. 16 is a diagram illustrating a display constituting a fifth embodiment of the invention.

The display shown in FIG. 16 differs from the previously described embodiments in that the optical arrangement disposed in front of the LCD 61 comprises reflective polarisers 62 and 63 as the partial reflectors and a switchable directional half wave retarder 69. The reflective polarisers are arranged to transmit light whose electric field vector is oriented in the plane of the drawing and to reflect the orthogonal polarization state. The switchable directional retarder 69 is switchable between an "off" state, in which it has substantially no effect on the polarization of light passing through it, and an "on" state. In the "on" state, the retarder 69 acts as a half wave plate for light traveling in a direction inclined at +30° to the display plane normal and has substantially no effect on the polarization of light traveling at −30° to the display plane normal. The retarder 69 may, for example, comprise a liquid crystal cell of the type disclosed in GB 2 405 516.

FIG. 16 illustrates operation of the display in the depth-shifting mode with the retarder 69 switched on. Viewing conditions are such that viewers observe the display at an angle close to +30°.

Light emerging from the LCD 61 is linearly polarized with its electric field vector in the plane of the drawing. The retarder 69 rotates the polarization of the light passing through it at +30° such that the electric field vector is perpendicular to the plane of the drawing. This light is reflected from the reflective polariser 63 and passes back through the retarder 69 at an angle of −30° so that its polarization is unaffected. The light is then reflected by the reflective polariser 62 and passes through the retarder 69 at an angle of +30° so that its polarization is rotated by 90°. The resulting light is transmitted by the reflective polariser 63 towards the viewing region.

When the retarder 69 is switched off, it has no effect on the polarization of light passing through it. Thus, the light emitted by the LCD 61 and passing through the polariser 62 also passes through the polariser 63 as the transmission axes of the reflective polarisers 62 and 63 are parallel.

An advantage of this arrangement is that it provides substantially full-brightness images in both modes of operation. In practice, some losses will occur as light passes through or is reflected by the various optical elements. However, no attenuation takes place because of the intended operation of the optical elements.

Figure 17B:
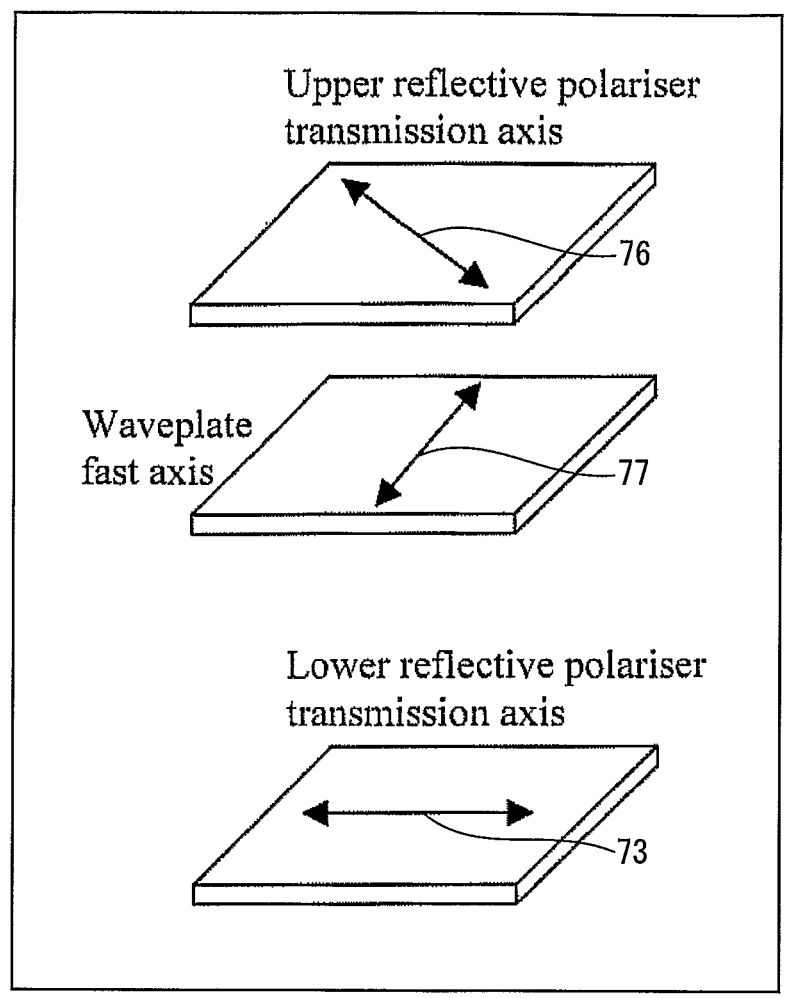

The display shown in FIGS. 17(a) and 17(b) differs from the previously described displays in that the optical arrangement in front of the LCD 61 comprises reflective polarisers 62 and 63, between which are disposed a fixed Faraday rotator 75 and a switchable half wave plate 69. The transmission axis 73 of the polariser 62 is oriented in the plane of the drawing whereas the transmission axis 76 of the reflective polariser 63 is oriented at 45° with respect to the transmission axis 73. When switched on, the half wave plate has a fast axis 77 which is perpendicular to the transmission axis 73. The Faraday rotator rotates the polarization of linearly polarized light by +45° upon passage of the light in either direction through the rotator 75.

Faraday rotators comprise layers of material which rotate the polarization state of light passing therethrough by an angle proportional to a magnetic field applied to the layer. Such devices are known and are described in standard reference texts, for example "Optics", E. Hecht et al, fourth edition, Addison Wesley (2003).

Figure 18:
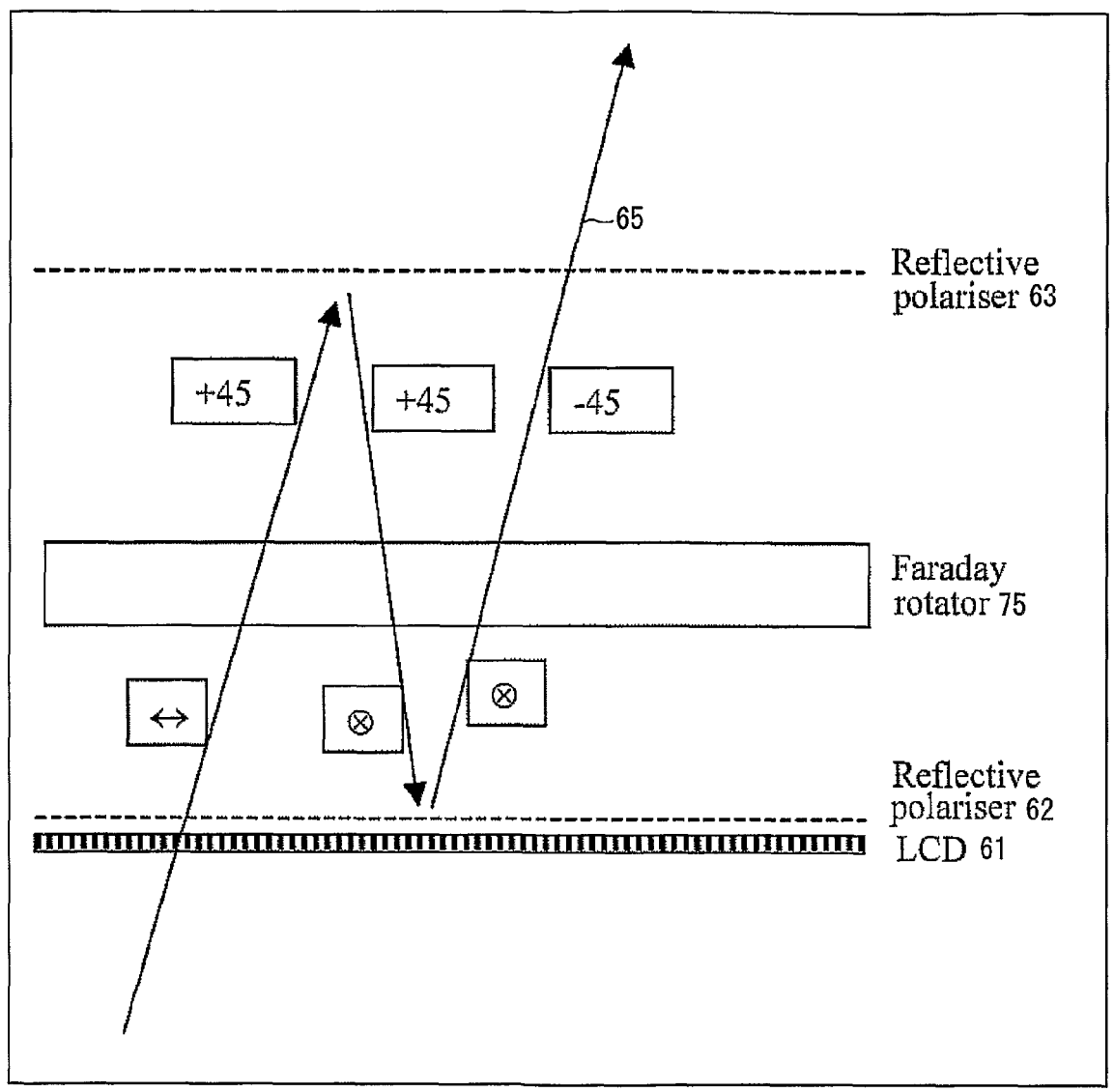
FIGS. 18(a) and 18(b) are diagrams illustrating operation of the display of FIGS. 17(a) and 17(b) in a first depth mode.

FIGS. 18(a) and 18(b) illustrates operation of the display of FIGS. 17(a) and 17(b) in the depth shifting mode, in which the half wave plate 69 is switched off and has substantially no effect on the polarisation of light passing through it. Linearly polarized light from the LCD 61 passing through the reflective polariser 62 has its electric field vector oriented in the plane of the drawing. The rotator 75 rotates the electric field vector so that it is oriented at +45° and is reflected back by the reflective polariser 63. The light passes through the rotator 75 again and emerges with its electric field vector oriented perpendicular to the plane of the drawing. The light is reflected by the polariser 62 and passes through the rotator 75, which rotates the polarisation plane so that the electric field vector is oriented at −45°. The reflective polariser 63 transmits this light towards the viewing region.

Figure 19:
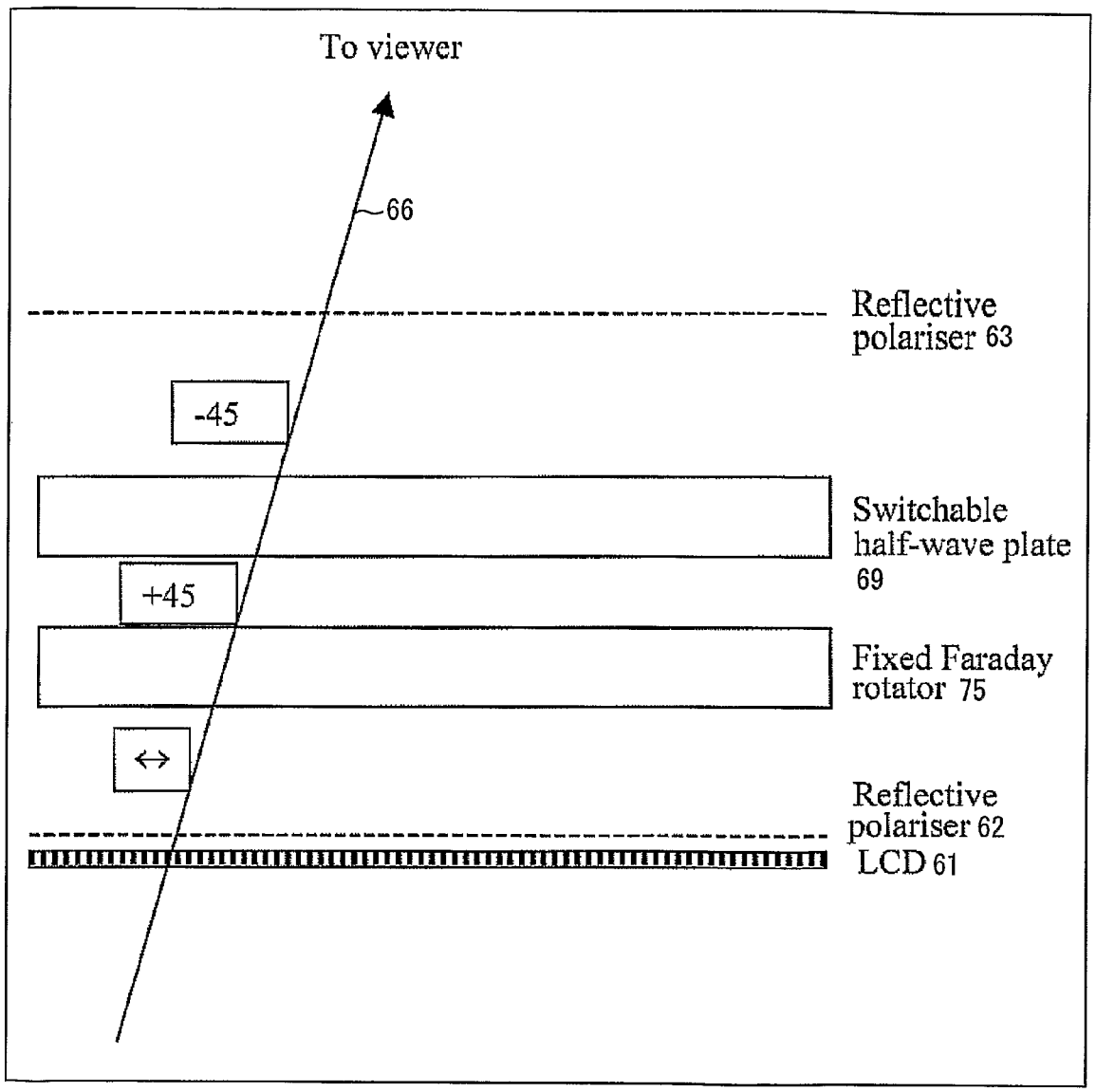
FIGS. 19(a) and 19(b) are diagrams illustrating operations of the display of FIGS. 17(a) and 17(b) in a second depth mode.

FIGS. 19(a) and 19(b) illustrate operation in the non-shifting mode. In this mode, the half wave plate 69 is switched on. Light with its electric field vector oriented in the plane of the drawing passes through the rotator 75, which rotates the plane of polarisation so that the electric field vector is oriented at +45°. The half wave plate 69 further rotates the plane of polarisation such that light emerging from it has its electric field vector oriented at −45°. This light is transmitted by the reflector polariser 63 towards the viewing region.

As in the previous embodiment, light is not lost because of the operation of the various optical elements. The displayed images are therefore relatively bright in both the depth-shifted mode and in the non-shifted mode.

FIGS. 20(a) and 20(b) show a display in which pairs of images to be displayed at different effective depths are simultaneously displayed by the LCD 61 by means of spatial multiplexing. The LCD 61 is pixilated with the pixels arranged as rows and columns. The images are displayed as interlaced rows or columns with the "D pixels" displaying, for example, vertical strips of the depth-shifted image and the "T pixels" displaying vertical strips of the non-shifted image. Alternatively, a chequerboard pattern may be used. The LCD has entrance and exit polarisers 80 and 81 with the exit polariser 81 having a transmission axis 83 oriented in the plane of the drawing.

A patterned quarter wave retarder 82 is disposed above the exit polariser 81 and comprises quarter wave retarder regions whose fast axes alternate with each other. Thus, the retarder portions such as 84 above the D pixels have their fast axes oriented so as to convert the light emitted from the D pixels to right-handed circularly polarized light R. Retarder portions such as 85 disposed above the T pixels have their fast axes oriented such that light emerging from the T pixels is converted to left-handed circularly polarized light L.

A "50%" mirror 62 is disposed above the patterned quarter wave retarder 82. A quarter wave plate 68 is disposed above the mirror 62 and has a fast axis 74 oriented at 45° to the transmission axis 83 of the exit polariser 81. A reflective polariser 63 is disposed above the quarter wave plate 68 with its transmission axis 76 parallel to the transmission axis 83.

Light from the D and T pixels passes through the exit polariser 81 and the quarter wave plate 82 so as to be converted into right-handed and left-handed circularly polarized light, respectively. Approximately half of the light is reflected by the mirror 62 and effectively lost from the system. Approximately half of the incident light is transmitted by the mirror 62 to the quarter wave plate 68. The light from the D pixels is converted into linearly polarized light with its electric field vector oriented perpendicular to the plane of the drawing. This light is reflected by the reflective polariser 63 back through the quarter wave plate 68, where the polarisation is converted to the right-handed circularly polarized state R. Part of the light from the quarter wave plate is transmitted by the mirror 62 and effectively lost to the system. Part of the light incident on the mirror 62 is reflected and converted to the left-handed circularly polarized state L. The quarter wave plate 68 converts this light to the linearly polarized state with its electric field vector parallel to the plane of the drawings and this light is transmitted by the polariser 63 to the viewing region.

The light from the T pixels transmitted by the mirror 62 is converted by the quarter wave plate 68 to linearly polarized light with its electric field vector parallel to the plane of the drawing. The light is therefore transmitted by the reflective polariser 63 towards the viewing region.

Any substantial separation between the plane within the LCD 61 where the images are displayed and the patterned retarder 82 results in parallax effects, which limit the viewing region for correct viewing of the display and hence the viewer freedom of movement. For example, if the images are displayed as interlaced columns, with the regions 84 and 85 extending in the column direction, a viewer may move up and down while correctly perceiving the displayed images. However, viewer movement from side to side results in crosstalk between the interlaced images so that the multiple depth effect is compromised. Similarly, if the images are displayed as interlaced rows, the viewer may move from side to side while still correctly perceiving the displayed images but movement up and down again leads to crosstalk.

Figure 20:
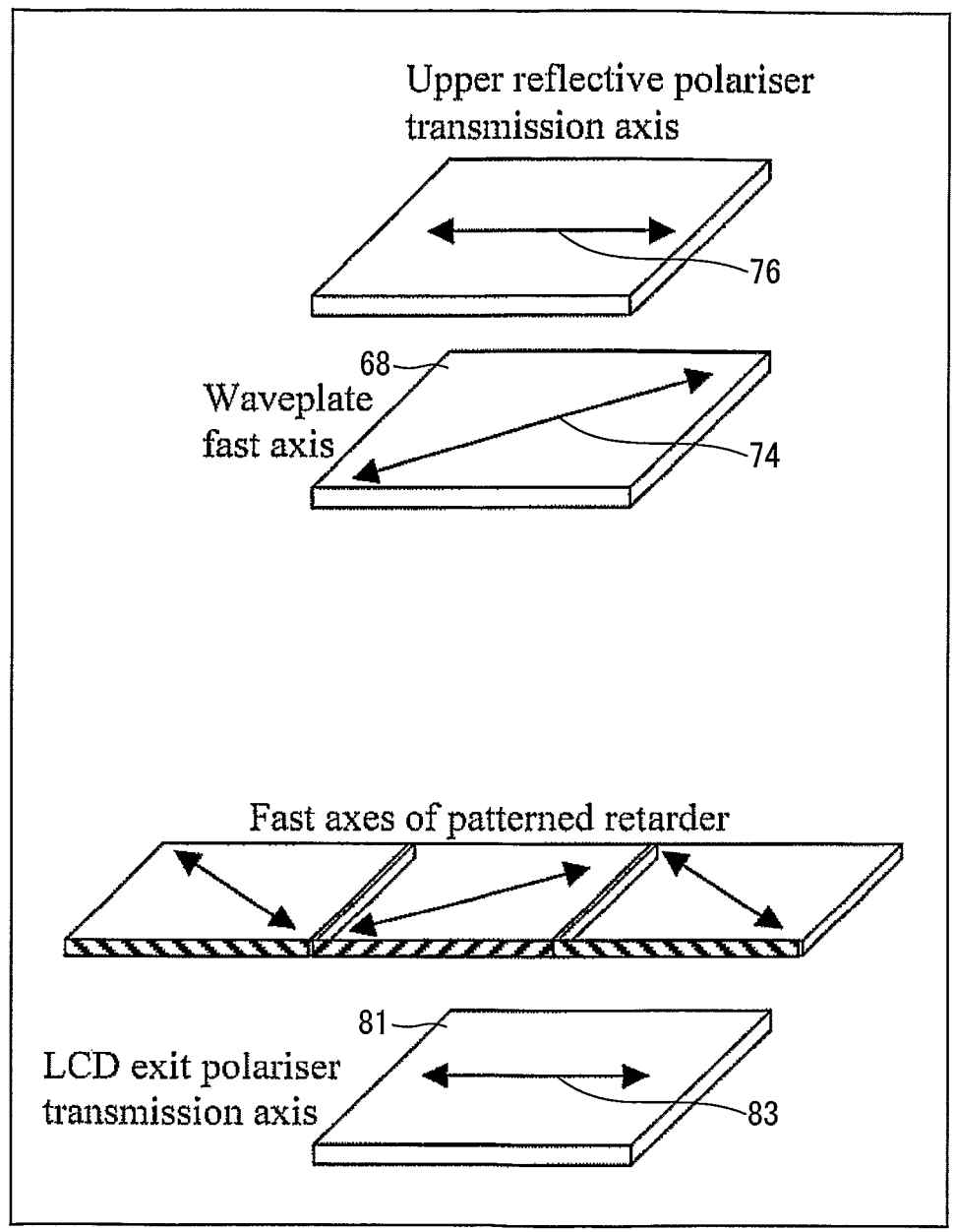
FIGS. 20(a) and 20(b) are diagrams illustrating a display constituting a seventh embodiment of the invention.
Figure 21A:
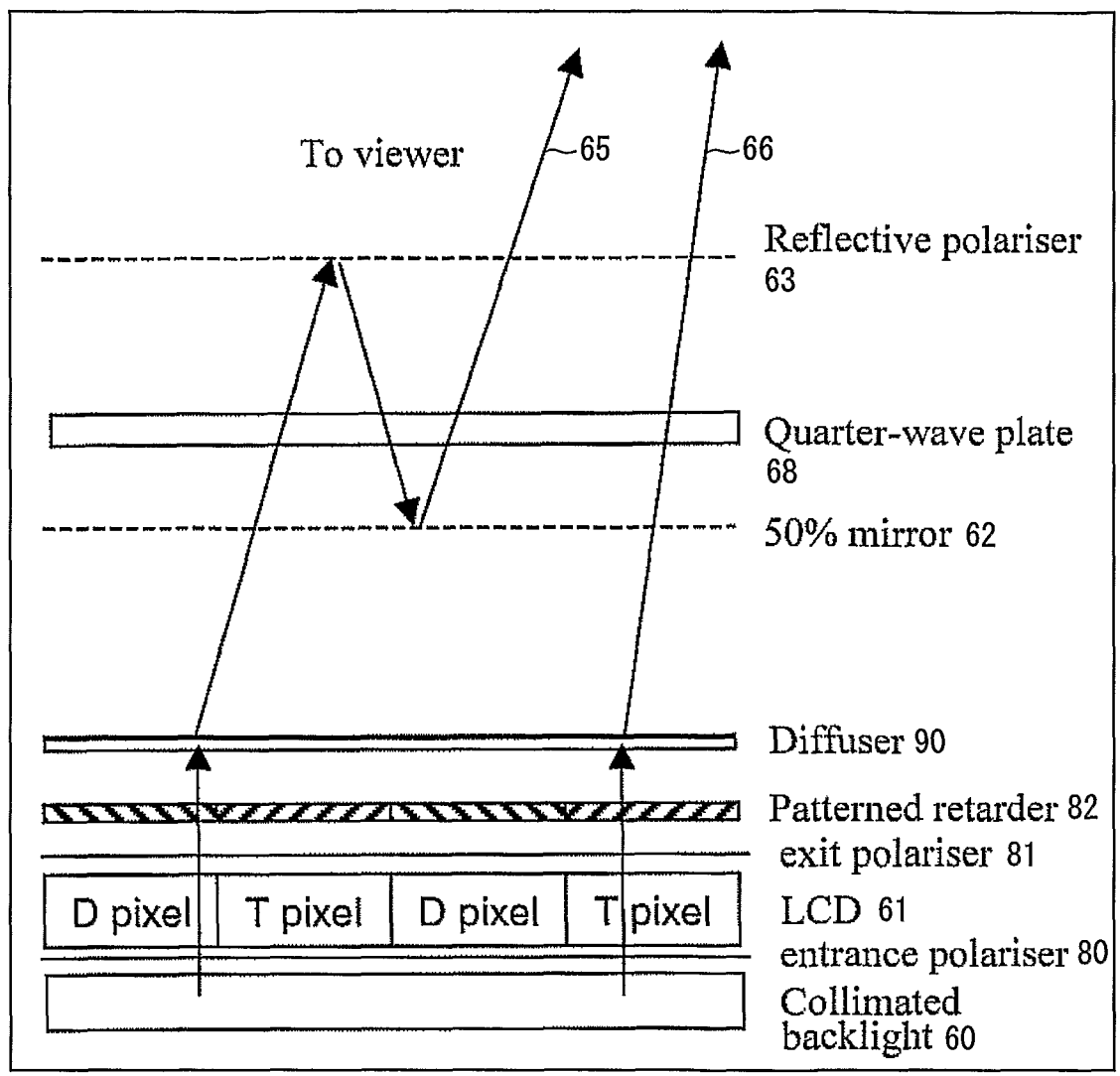
FIGS. 21(a) and 21(b) are diagrams illustrating modifications of the display shown in FIGS. 20(a) and 20(b)

FIG. 21(a) shows a modified display which differs from that shown in FIG. 20 in that the backlight 60 is of the collimated type and a diffuser 90 is disposed between the patterned retarder 82 and the mirror 62. The collimated backlight 60 directs light through the LCD 61 substantially normally to the image plane. Collimated backlights are well-known, for example as disclosed in "Proceedings of the International Display Workshops", Fukuoka, Japan, December 2004, paper FMC 10-4. Suitable backlights are available, for example, from Omron.

The diffuser 90 is required in order to allow the displayed images to be viewed from a relatively wide viewing range. The diffuser 90 is of a type which has no substantial effect on the polarisation of light passing therethrough. An example of such a diffuser is known as a "GRIN film" and is available, for example, from Microsharp Corporation, UK.

It is also possible to reduce the undesirable effects of parallax by reducing the spacing between the patterned retarder 82 and the image plane of the LCD 61. For example, the patterned retarder 82 and the exit polariser 81 may be disposed within the LCD 61 between the LCD substrates. Alternatively, the LCD substrate adjacent the polariser 81 and the retarder 82 may be made relatively thin and the polariser 81 may be formed on the substrate or on a relatively thin substrate.

Figure 21B:
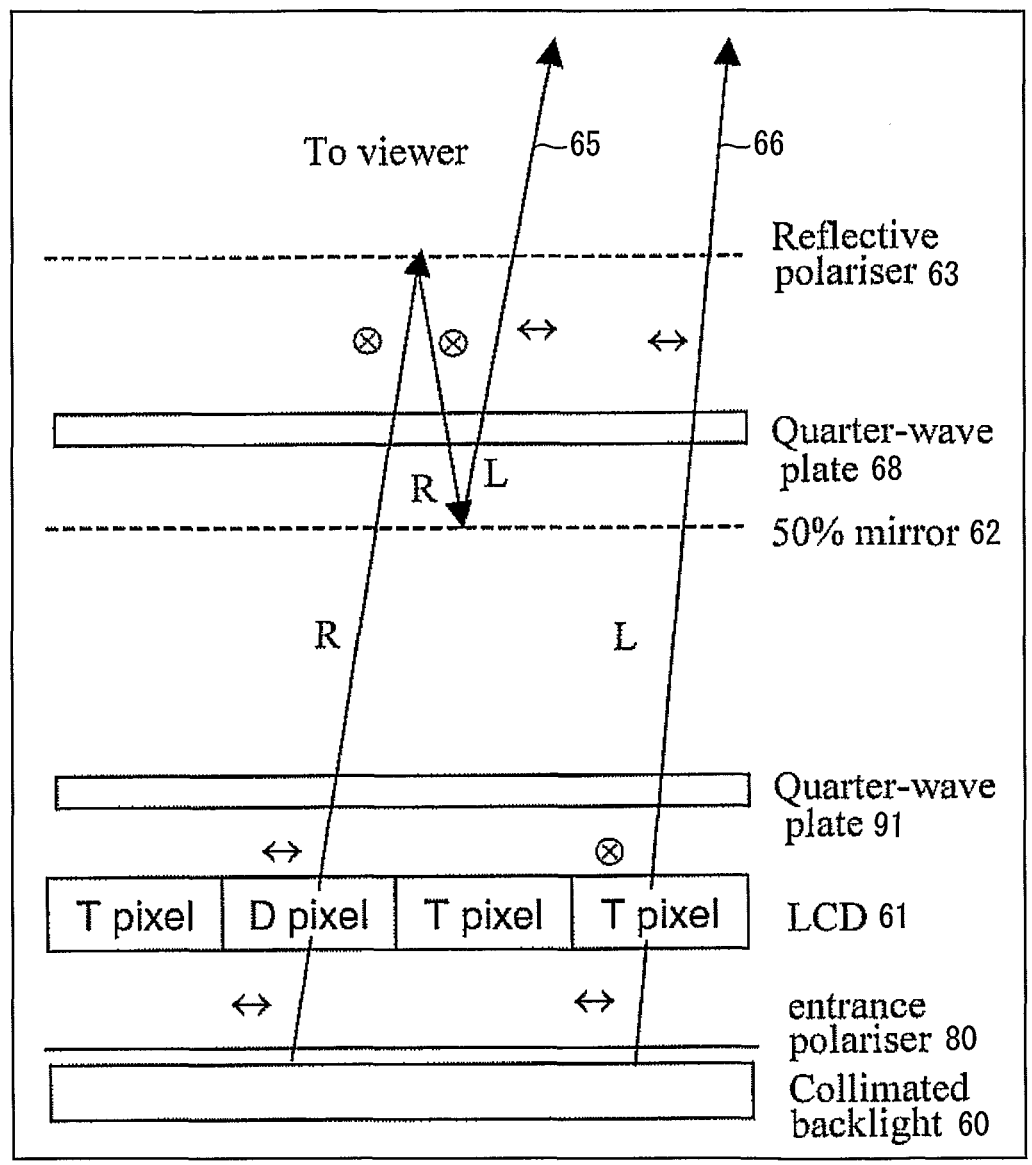

FIG. 21(b) illustrates another modified display which differs from that shown in FIG. 21(a) in that the exit polariser 81, the patterned retarder 82 and the diffuser 90 are omitted and a quarter wave plate 91 is disposed between the LCD 61 and the mirror 62. Because of the absence of an exit polariser, the individual pixels of the LCD 61 control the polarisation state of the modulated light so that the LCD 61 controls the depth plane in which the pixels appear. When a pixel is switched on, the polarisation state is rotated so that light passing through the pixel passes directly through the display and the image or sequence of images using such light has an image depth substantially at the display surface of the LCD 61. Conversely, for pixels which are switched off, the modulated light follows the longer light path 65 so that the corresponding image or images appear at a shifted image plane. In this arrangement, the LCD 61 determines the pixel image depths but does not modulate light with the images. The appearance of the display is therefore of two image planes with the image shown at one plane being a "negative" of the image shown at the other plane. Such a display is striking in appearance any may have applications in advertising and information display. For example, information may be shown as bright detail on a dark background in a "front" plane so that the detail appears to cast a shadow onto a "rear" plane.

In order to display fully controlled images, a further spatial light modulator such as an LCD may be disposed between the entrance polariser 80 and the collimated backlight 60. The further LCD (not shown) has entrance and exit polarisers and the same pixel arrangement as the LCD 61 with the pixels of the LCDs being aligned. The exit polariser of the further LCD may be provided by the entrance polariser 80 shown in FIGS. 21(a) and 21(b).

Figure 22:
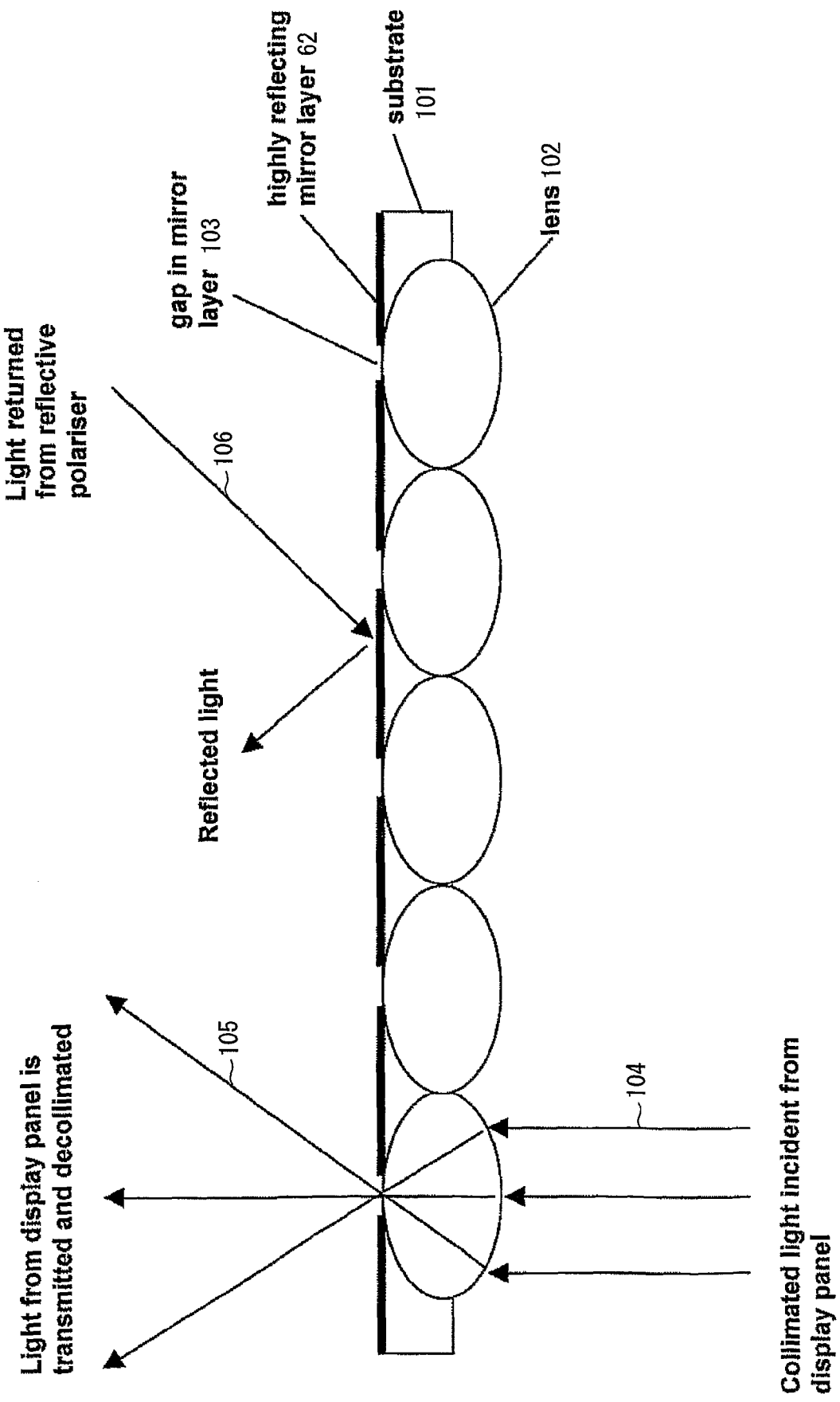
FIG. 22 is a diagram illustrating a further modification of the display of FIGS. 20(a) and 20(b)

FIG. 22 illustrates a modification to the display shown at the left part of 21(a) and 21(b). According to this modification, the 50% mirror 62 and the diffuser 90 are replaced by a combined element formed on a substrate 101. The element comprises an array of lenses 102 embedded in the substrate 101 with the lenses 102 having a focal plane which coincides with the upper surface of the substrate 101. The upper surface of the substrate 101 is coated with a highly reflective mirror layer forming the reflective element 62. Gaps 103 are formed in the mirror layer at the focal points of the lenses 102 in the case of spherically converging lenses. Alternatively, the lenses 102 may comprise cylindrically converging lenses with the gaps 103 being formed at the focal lines of the lenses. The gaps thus occupy only a relatively small portion of the upper surface area of the substrate 101.

When collimated light is incident on the combined element from the collimated backlight via the LCD as illustrated at 104, it is focused by the lenses 102 through the gaps 103 so as to be de-collimated and transmitted as illustrated at 105. Conversely, when light reflected from the reflective polariser 63 is incident on the mirror layer 62 as illustrated at 106, most of the incident light is reflected.

The use of such a combined element provides a substantial improvement to the efficiency of light utilization and hence brightness of the display. With the display illustrated in FIG. 21(a) using the 50% mirror 62, ignoring losses which occur in practical embodiments, the brightness of the non-shifted image is reduced to about 50% of the image brightness provided by the LCD 61 whereas the brightness of the depth-shifted image is reduced to about 25% of the displayed image brightness. By using the combined element illustrated in FIG. 22, the collimated light 104 is transmitted with relatively high efficiency, for example about 90%. Similarly, light 106 reflected by the mirror layer 62 is reflected with relatively high efficiency, again about 90%. The brightness of the non-shifted image is therefore about 90% of the brightness of the image displayed by the LCD 61 whereas the brightness of the depth-shifted image is about 81%.

Patterned retarders, such as the retarder 82 shown in FIG. 20 and various retarders shown in the embodiments described hereinafter, may be made in a variety of ways and several of these are illustrated in FIGS. 23(a) to 23(e). For example, as shown in FIG. 23(a), the retarder function may be destroyed in regions which are required to provide no retarder function. Although FIGS. 23(a) to 23(e) refer to half wave retarders, the same principals may be used for quarter wave or other retarders. Thus, regions such as 107 retain their retarder function whereas regions such as 108 have the retarder function destroyed, for example by exposure to ultraviolet (UV) radiation. Thus, an initially uniform retarding layer is formed on a transparent substrate 109 and is then exposed to ultraviolet irradiation via a suitable mask to provide the patterned retarder. As an alternative, the regions which are required not to have a retarder function may be removed as illustrated in FIG. 23(b). Examples of methods of removing the retarder material include etching and laser machining.

Patterned retarders may also be formed using liquid crystal materials and a first example is illustrated in FIG. 23(c). The patterned retarder is formed between glass substrates 110 and comprises strips of liquid crystal material 111 interlaced or alternating with strips of a transparent resin or photoresist material 112. The facing surfaces of the glass substrate 110 are provided with appropriate alignment layers in order to align the birefringence axes in the desired direction. Such alignment layers (not shown) may be of any suitable type and the alignment direction may be provided by a known alignment layer rubbing process or any other suitable technique.

Where the patterned retarder is required to rotate the linear polarisation electric field vector of light, a polarisation-rotating arrangement may be used instead of a retarder. For example, the liquid crystal material 111 and the adjacent alignment layers may be arranged to provide a twisted nematic cell for providing polarisation rotation of 90° or of any other desired angle of rotation.

The patterned layer may need to be switchable between a patterned and a non-patterned configuration and an example of how this may be achieved is illustrated in FIG. 23(d). In this case, the lower substrate is provided with a uniform transparent electrode 113, for example made of indium tin oxide (ITO), whereas the upper substrate has a patterned electrode 112 formed of the same material. A liquid crystal layer 111 is provided between alignment layers formed on the electrodes. The liquid crystal mode employed by the device is such that, when no voltage is applied between the uniform electrode 113 and the patterned electrodes 112, the liquid crystal cell acts as a uniform half wave or other retarder. When a voltage is applied between the electrodes, the liquid crystal molecules adjacent the patterned electrodes align substantially perpendicularly to the plane of the liquid crystal layer so that these regions have substantially no retardation, whereas the parts of the liquid crystal layer adjacent the gaps between the patterned electrode are substantially not affected and continue to provide the desired retardation.

The arrangement illustrated in FIG. 23(d) may also be used to provide a switched patterned polarization rotator. For example, in the absence of an applied voltage between the electrodes, the liquid crystal may be aligned to be in the twisted nematic mode so as to act as a polarization rotator. When a voltage is applied between the electrodes, the twisted nematic structure is lost in the regions of the patterned electrodes 112 so as to form a patterned polarization rotator.

In embodiments where a patterned retarder or polarization rotator is required across the whole of the area of the element, the optic axes may be patterned as illustrated in FIG. 23(e). In order to achieve this, either or both of the alignment layers may be patterned. In this case, patterned upper and lower alignment layers 114 and 115 are provided with the same patterning of alignment directions so that liquid crystal regions A are aligned in the same direction and liquid crystal regions B are aligned in a different direction. Methods of making such patterned alignment layers are known and examples are disclosed, for example, in EP 0 887 667.

Such a patterned retarder may be used, for example, in the display shown in FIG. 21(a) where the patterned retarder is required to provide different retardation or polarization rotation across its whole area. However, a retarder of the type shown in FIG. 23(e) may also be used in some embodiments where only some of the regions are required to provide retardation. For example, if the patterned retarder is a half wave plate, then regions which are not required to provide retardation may be oriented such that their optic axes are parallel or perpendicular to the electric field vector of linearly polarized light whereas the optic axes of regions required to provide retardation are oriented at a different angle as appropriate for the specific application.

In the case of patterned retarders using liquid crystal material as the "active" retardation element, it is possible to switch off the dual (or multiple) effect by making use of the electrically switchable optical effect of the liquid crystal material. For example, in the example illustrated in FIG. 23c, both of the substrates 110 may be provided with uniform transparent electrodes. The application of an electric field across the liquid crystal material 111 causes the liquid crystal molecules to align substantially perpendicularly to the plane of the element so that the liquid crystal material has substantially no effect on the polarization state of normally incident light. The whole area of the element then has substantially no effect on polarization so that all of the pixels display an image in the same plane. This may be the non-shifted image plane because this provides a brighter image in most embodiments. The example illustrated in FIG. 23(d) has the capability of single plane image display because, in the absence of any applied electric field, the whole of the liquid crystal layer 111 is in the same state. The example shown in FIG. 23(e) may also be provided with this capability by providing uniform electrodes on both of the substrates 110 so as to align all of the liquid crystal molecules substantially perpendicular to the plane of the layer so as to provide a uniform layer.

In embodiments using liquid crystal material to provide patterned retarders (or polarization rotators) without requiring the ability to be switched to single depth display, the liquid crystal material may be fixed during manufacture so as to avoid the need for applying an electric field across the liquid crystal material. For example, the liquid crystal material may comprise a polymerisable liquid crystal material such as a reactive mesogen made by Merck. Such materials may be polymerized during manufacture so as to reduce the sensitivity of the liquid crystal cell to humidity, temperature and mechanical damage.

In displays of the types shown in FIGS. 20(a), 20(b), 21(a) and 21(b), in the case of dual depth displays, each of the images is displayed at half the actual spatial resolution of the LCD 61. This may result in viewers being able to perceive strips in the displayed images. The visibility of such strips may be reduced by interlacing different colour components of the images separately. For example, the even rows of a display may display red and green components of the non-shifted image and the blue component of the depth-shifted image whereas the odd rows of the display may display red and green components of the depth-shifted image and the blue component of the non-shifted image. This may be achieved, for example, by inserting into the elements of the display a wavelength-dependent retarder, which acts as a half wave retarder for red and green but has substantially no effect for blue. An example of such a wavelength-dependent retarder is disclosed in U.S. Pat. No. 6,273,571.

The display shown in FIGS. 24(a) and 24(b) differs from that shown in FIGS. 20(a) and 20(b) in that the patterned quarter wave retarder 82 is replaced by a uniform quarter wave plate 120 and a patterned half wave retarder 121. The fast axis 123 is perpendicular to the fast axis 74 of the quarter wave plate 68. The patterned retarder 121 comprises regions such as 124, which have substantially no effect on the polarization state of light, and regions such as 125 acting as half wave retarders and having fast axes 126 which are substantially parallel to the fast axis 123 of the quarter wave plate 120.

Figure 24:
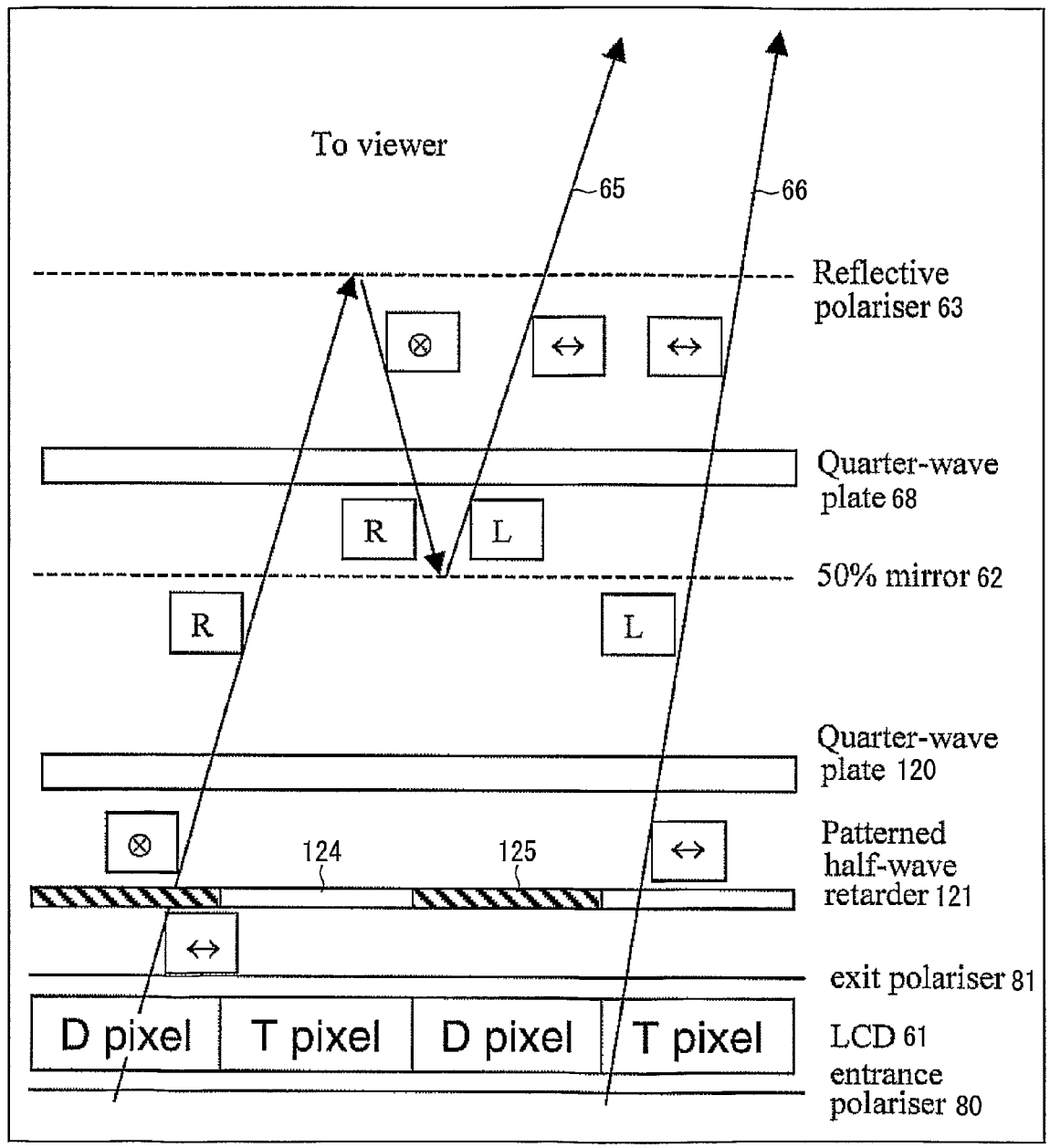
FIGS. 24(a) and 24(b) are diagrams illustrating a display constituting an eighth embodiment of the invention.
Figure 24:
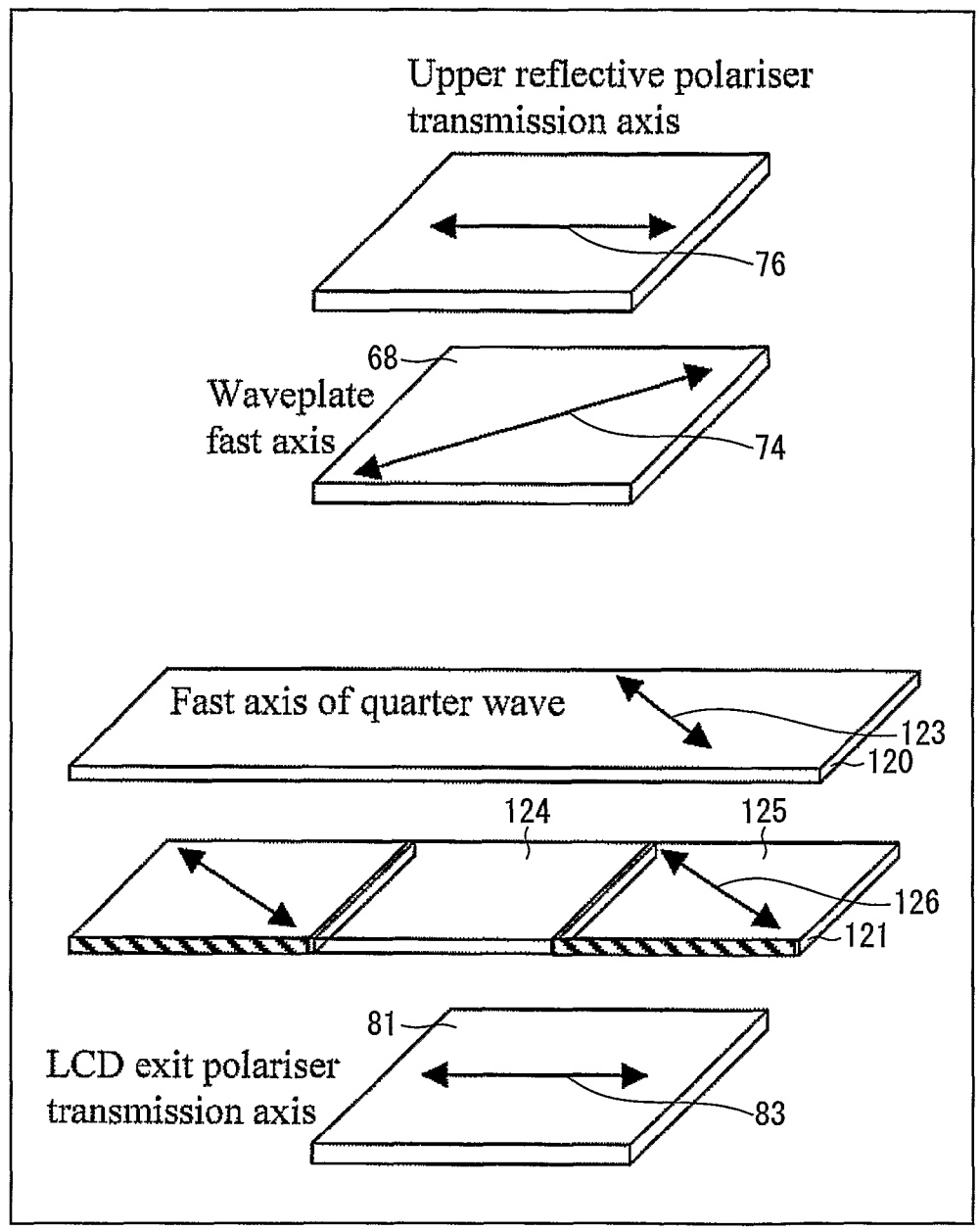

The combination of the quarter wave plate 120 and the patterned half wave retarder 121 in FIGS. 24(*a*) and 24(*b*) has substantially the same effect on the polarization state of light as the patterned quarter wave retarder 82 in FIGS. 20(*a*) and 20(*b*). Thus, light passing through the regions such as 125 of the retarder 121 follows the light path 65 whereas light passing through the regions such as 124 follows the light path 66. The patterned retarder 121 may comprise any of the elements described hereinbefore, for example as shown in FIG. 23.

Figure 25A:
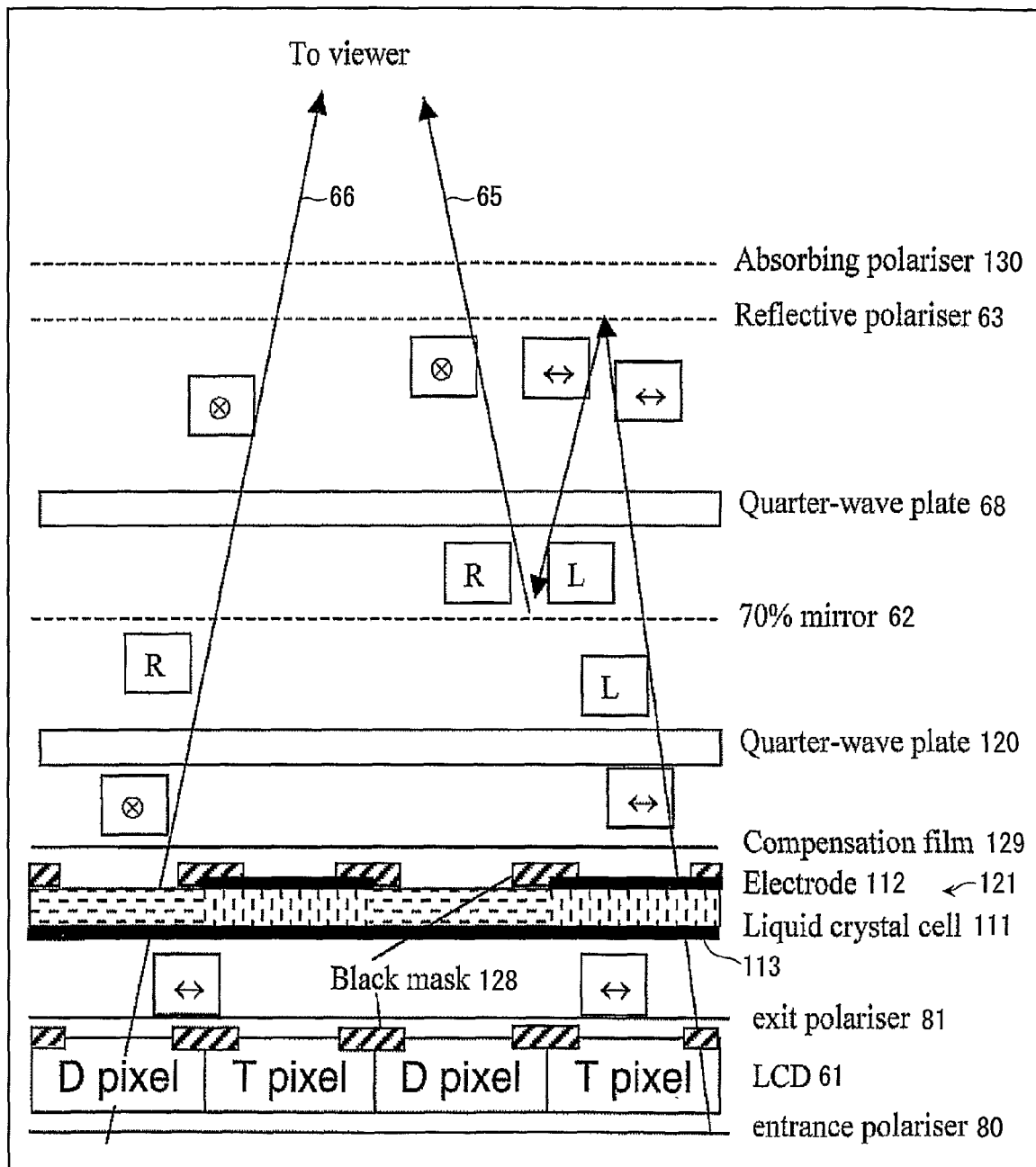
FIGS. 25(a) and 25(b) are diagrams illustrating a display constituting a ninth embodiment of the invention.
Figure 25:
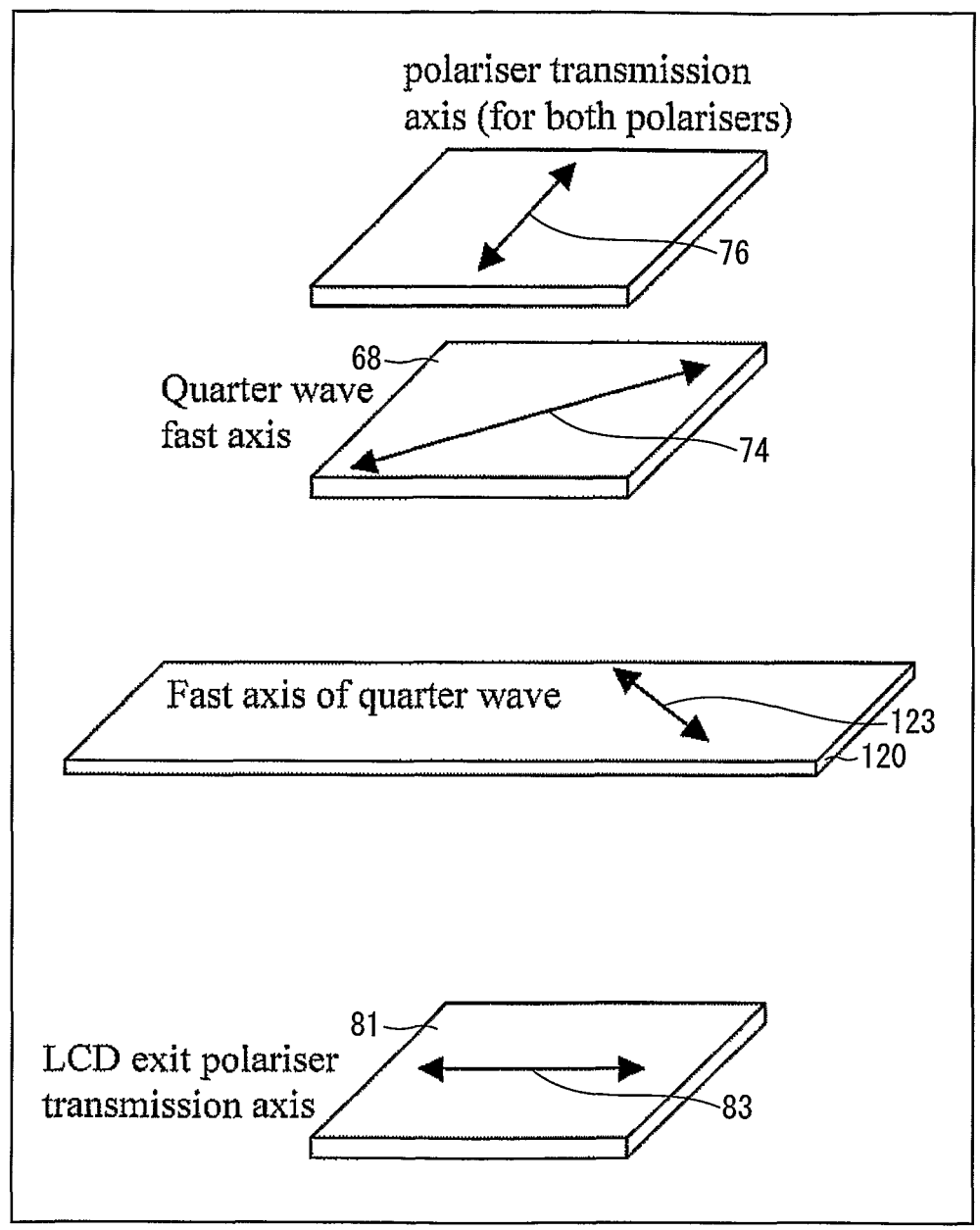

FIGS. 25(*a*), 25(*b*) and 26 illustrate a display of a type similar to that shown in FIGS. 24(*a*) and 24(*b*). In this embodiment, the patterned half wave plate 121 is embodied by a liquid crystal device of the type illustrated in FIG. 23(*d*). Black mask regions 128 are provided on the patterned retarder 121 and on the LCD 61 so as to prevent undesirable artefacts from being visible. In particular, such artefacts may occur at the edges of the patterned electrodes 112 and the black mask portions hide this from view. A compensation film 129 is disposed above the patterned retarder 121 to improve the viewing angle properties of the display. Such compensation films are well known in liquid crystal technology and examples are described in the reference by Lueder mentioned hereinbefore.

The display further differs from that shown in FIGS. 24(*a*) and 24(*b*) in that the 50% mirror 62 is replaced by a 70% mirror, the orientation of the transmission axis 76 of the reflective polariser 63 is rotated by 90°, and a further absorbing polariser 130 is disposed above the reflective polariser 63 with its transmission axis parallel to the axis 76. The absorbing polariser 130 reduces the reflection of ambient light from the surface of the display. In the absence of such a polariser, incident light whose polarisation is orthogonal to the transmission axis of the reflective polariser 63 is reflected back, for example towards a viewer. The presence of the absorbing polariser 103 prevents or very greatly attenuates such reflected light.

The mirror 62 is arranged to transmit approximately 70% of incident light and to reflect approximately 30% of incident light. Such a mirror improves the overall image brightness provided by the display. In particular, with a 50% mirror, the non-shifted image has a brightness which is theoretically (ignoring losses) equal to 50% of the image brightness at the LCD 61 whereas the depth-shifted image brightness is theoretically reduced to 25%. The use of the 70% mirror increases the non-shifted image brightness to 70% whereas the depth-shifted image brightness is reduced by a relatively small amount to 21%.

The display is illustrated in the dual depth mode in FIGS. 25(*a*) and 25(*b*) with a voltage applied between the uniform electrode 113 and the patterned electrodes 112 of the retarder 121. In the liquid crystal region adjacent the patterned electrodes 112, the liquid crystal molecules are oriented by the applied field so as to be substantially perpendicular to the plane of the liquid crystal layer and thus have substantially no effect on the polarization state of light passing through such regions. The liquid crystal regions adjacent the gaps between the patterned electrodes 112 do not receive an applied field and therefore remain oriented by the alignment layers. These regions of the liquid crystal material thus act as half wave plates with their fast axis oriented parallel to the fast axis 123 of the quarter wave plate 120. The light passing through these regions from the D pixels thus propagates directly to the viewing region whereas light from the T pixels propagating through the "switched" liquid crystal regions follows the longer path 65 to the viewing region.

As described hereinbefore, the alignment of the liquid crystal cell may be such that, in the absence of an applied field, the liquid crystal material is in the twisted nematic mode and acts as a polarization rotator for rotating the electric field vector of linearly polarized light by 90°. The operation of the display is thus as described above because the twisted nematic structure is destroyed by the applied field in the liquid crystal regions adjacent the patterned electrodes 112.

Figure 26:
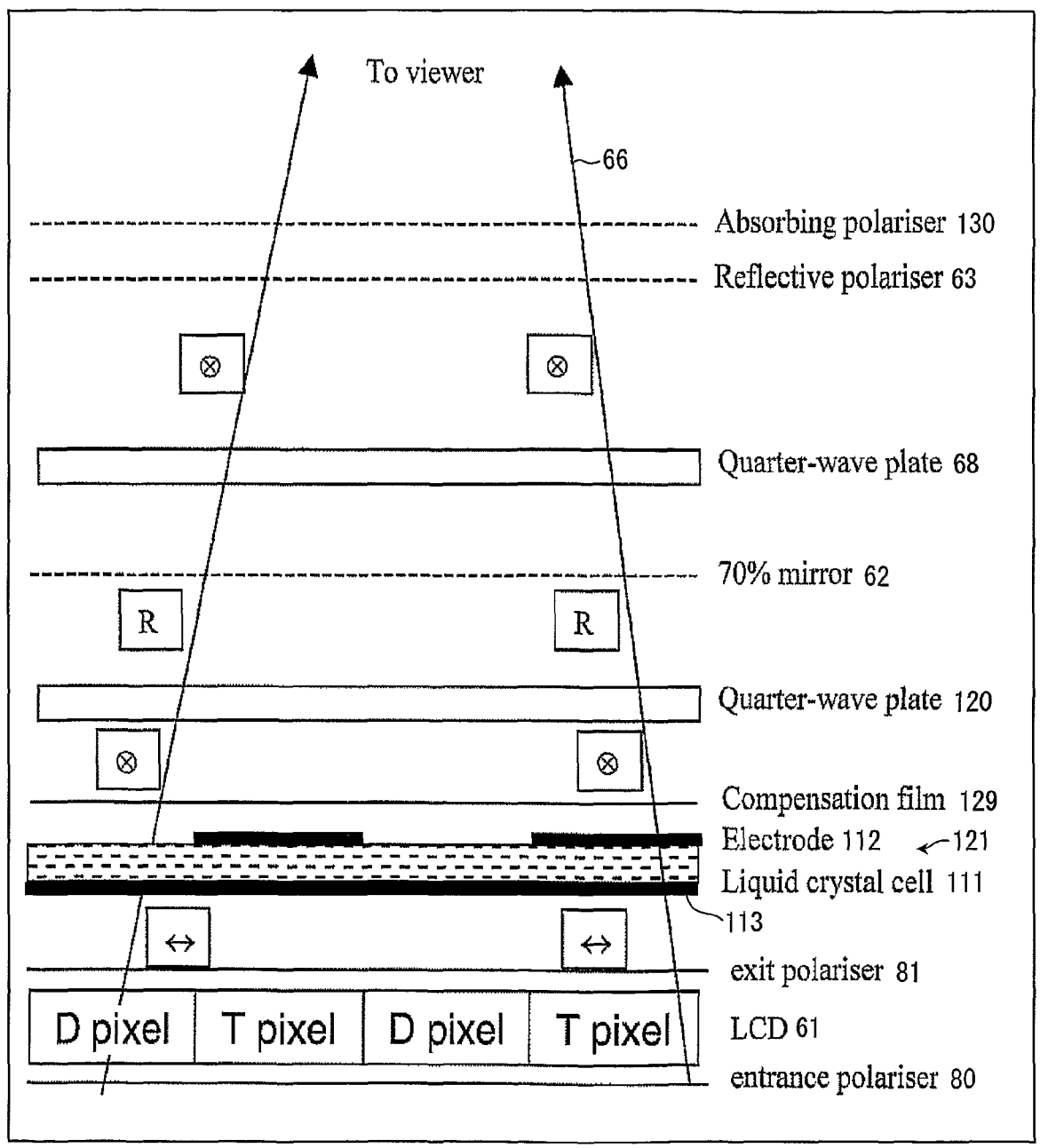
FIG. 26 is a diagram illustrating a display constituting a ninth embodiment of the invention.

FIG. 26 illustrates the display of FIGS. 25(*a*) and 25(*b*) in an alternative single depth mode of operation. In this mode of operation, no electric field is applied between the electrodes 112 and 113 so that the liquid crystal mode is determined by the alignment layers and the liquid crystal material. In this case, the element 121 acts as a uniform half wave plate or polarization rotator so that all of the light modulated with the image or sequence of images by the LCD 61 follows a direct path 66 to the viewing region and the image is displayed as a non-shifted image.

In a variation of the device shown in FIGS. 25(*a*) and 25(*b*), a liquid crystal cell with patterned alignment as shown in FIG. 23(*e*) is used. The liquid crystal regions A-B-A-B in FIG. 23(*e*) act as quarter wave plates of alternating orientation, and the quarter wave plate 120 is not necessary. If a compensation film 129 is also not used, then the functions of the mirror 62 and black mask 128 may be combined by making the black mask 128 from reflecting material such as aluminum or silver.

Figure 27A:
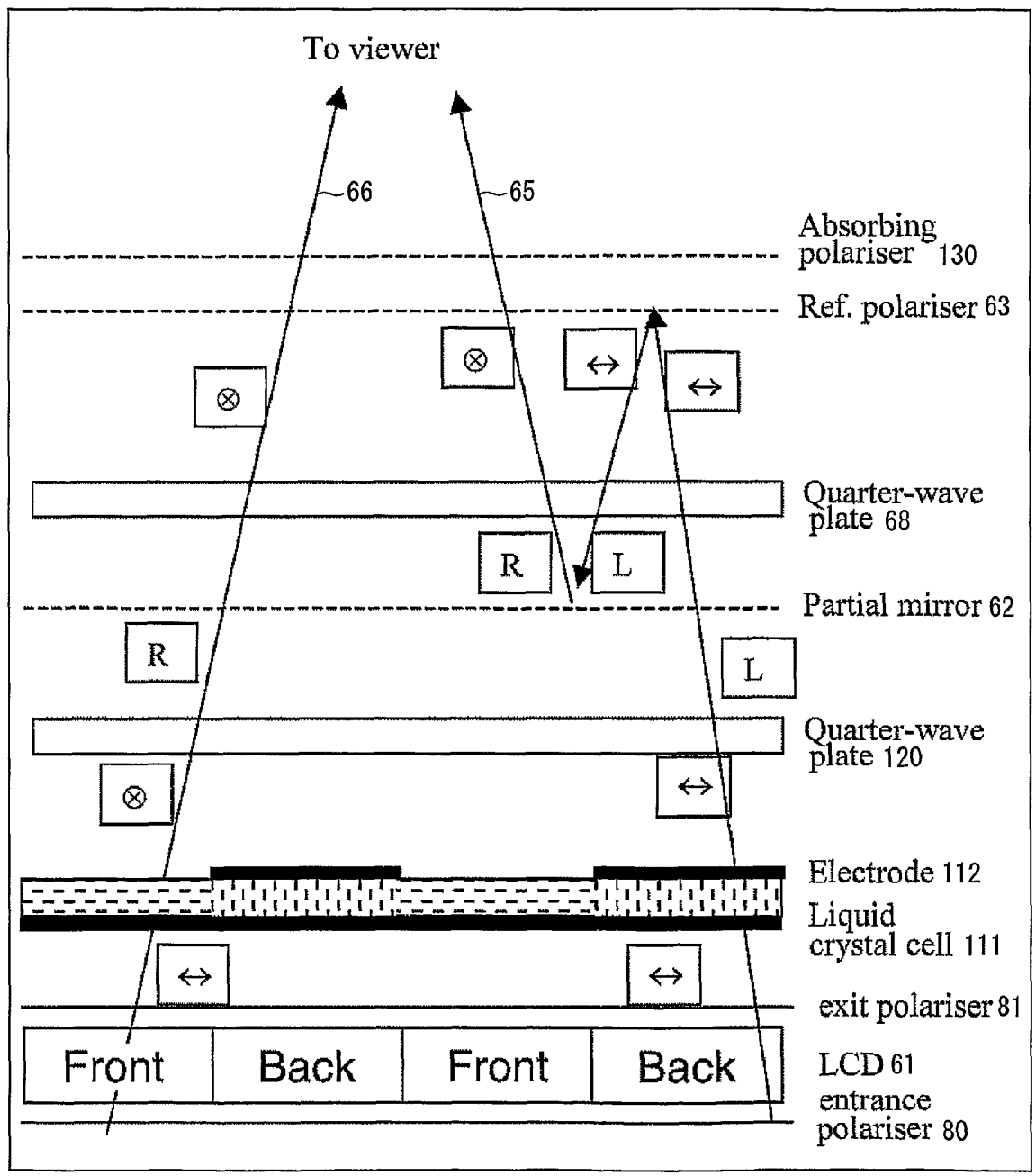
FIGS. 27(a) and 27(b) are diagrams illustrating a modified form of the display shown in FIGS. 25(a), 25(b) and 26.
Figure 27:
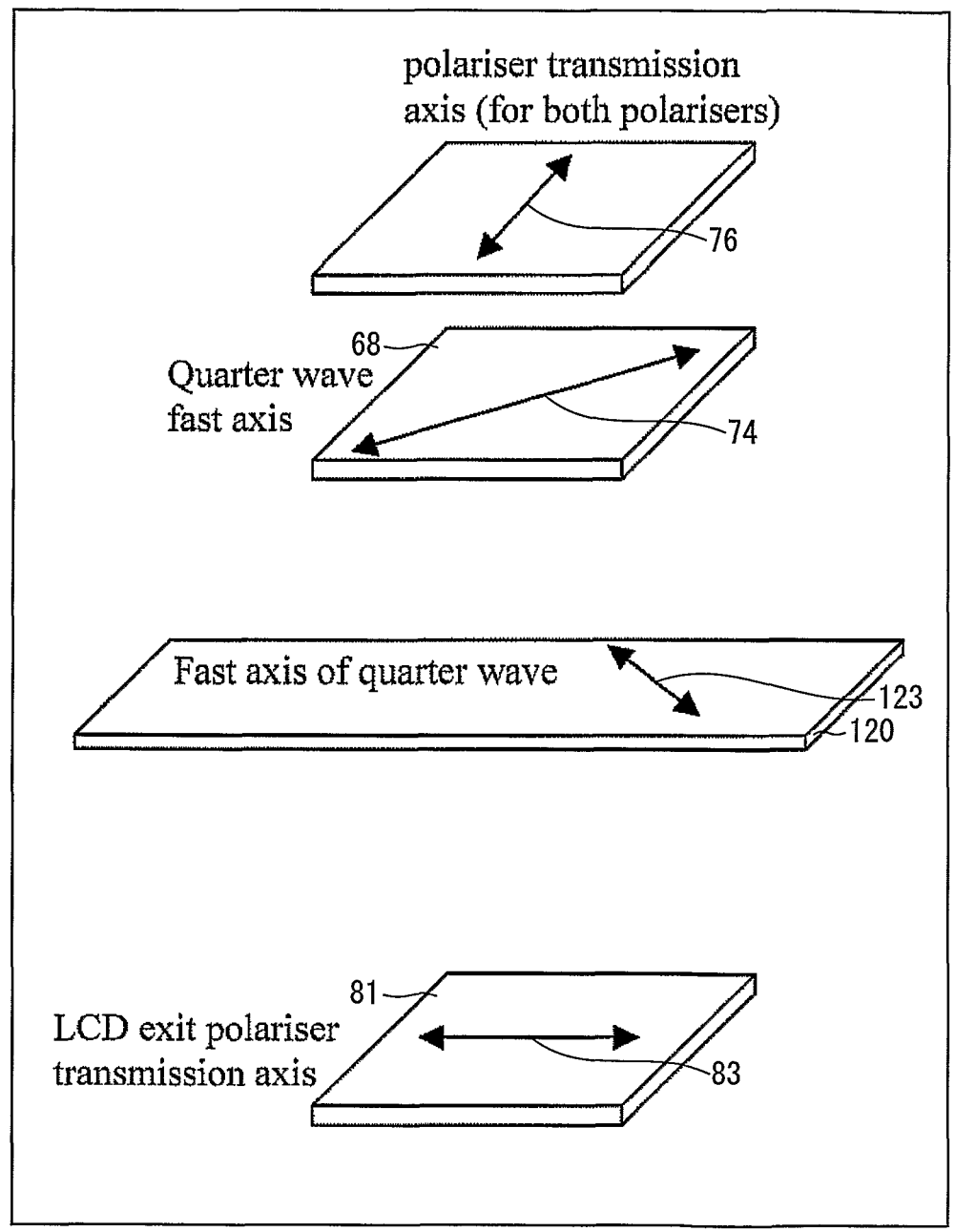

FIGS. 27(*a*) and 27(*b*) illustrate a modified form of the display shown in FIGS. 25(*a*), 25(*b*) and 26. In particular, the black mask 128 and the compensation film 129 are omitted. The operation of the display of FIGS. 27(*a*) and 27(*b*) is substantially the same as that of the display of FIGS. 25(*a*), 25(*b*) and 26 and will not be described again.

Figure 28:
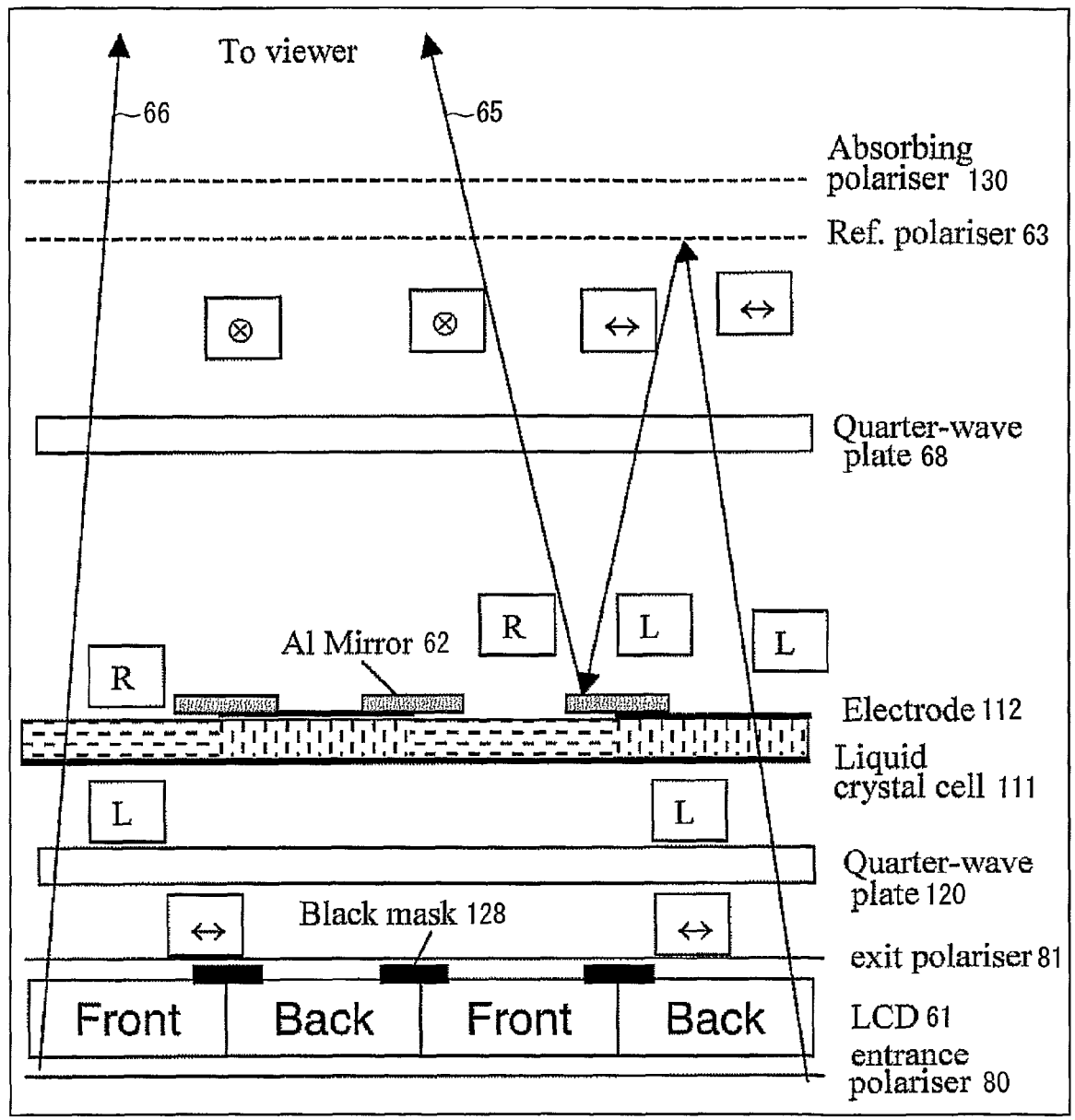
FIG. 28 is a diagram illustrating further modified forms of the display shown in FIGS. 25(a), 25(b) and 26.

FIG. 28 illustrates a display which is arranged to permit an increase in image brightness. The display differs from that shown in FIG. 25(*a*) in several respects. The quarter waveplate 120 is disposed between the liquid crystal cell 111 and the exit polariser 81. The part of the black mask 128 on the liquid crystal cell 111 performs the function of the partial mirror 62 and comprises a patterned metallic reflector, for example in the form of a thin layer of aluminum (Al) or silver. By arranging the reflective parts of the partial mirror to correspond to the non-transmissive black mask regions 128 in the LCD 61, an overall brightness increase may be achieved as the non-transmissive parts of the mirror 62 obscure regions where little or no light would pass. In this configuration, the liquid crystal cell 111 is required to function as a half waveplate, and not in a guiding mode, and may be embodied as a Freedericksz cell.

Figure 29:
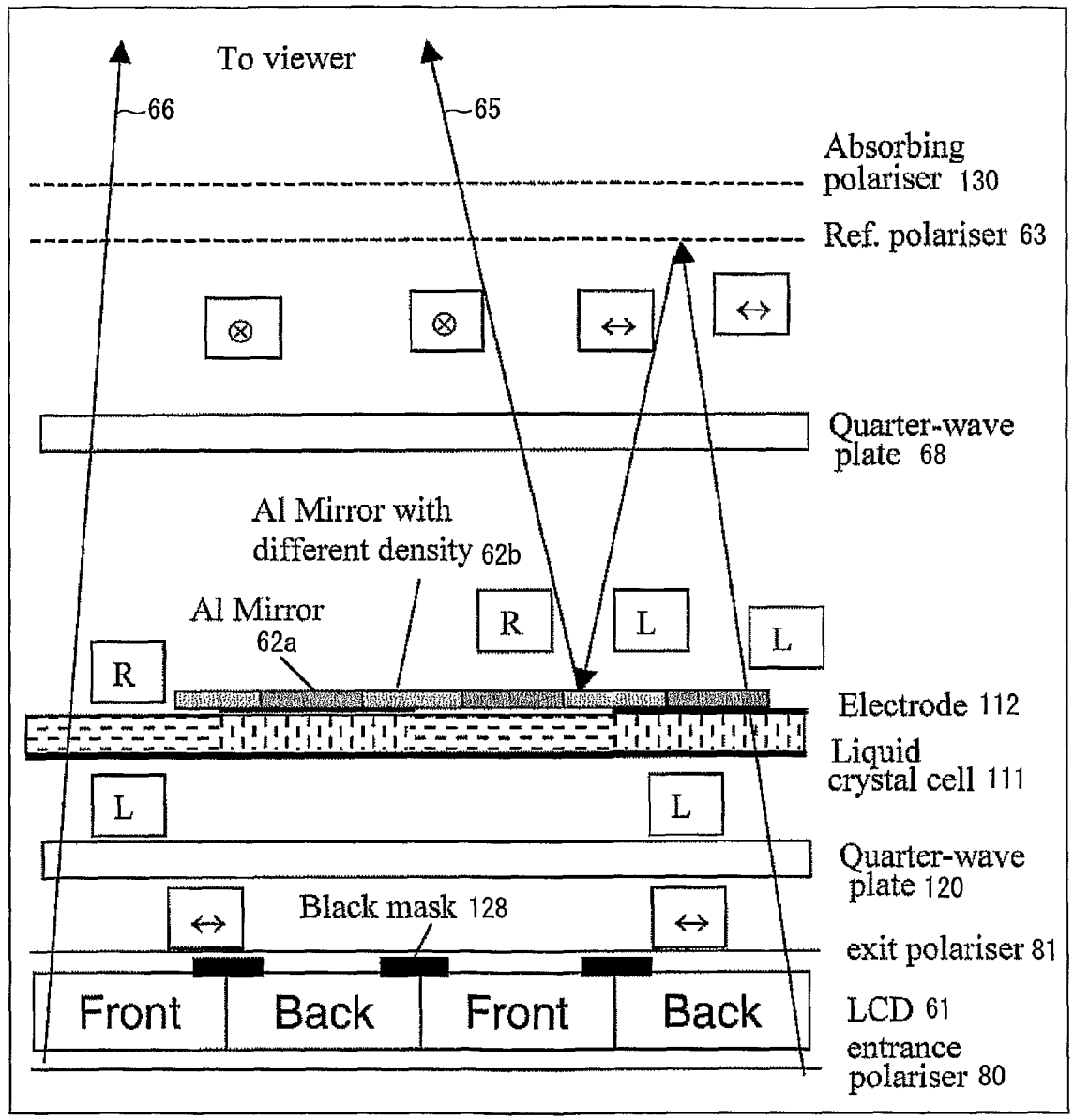
FIG. 29 is a diagram illustrating further modified forms of the display shown in FIGS. 25(a), 25(b) and 26.

FIG. 29 shows a display which differs from that shown in FIG. 28 in that a metallic mirror of spatially varying reflective density acts as the mirror 62. In this example, there are reflective regions 62*a* and 62*b* of different reflective/transmissive densities. The density may be varied, for example, by thinning the reflective layer or by spatial patterning on a small scale. Such an arrangement may be useful in reducing Moire fringes caused by regular patterning beating with other spatially varying structures within the display.

Figure 30:
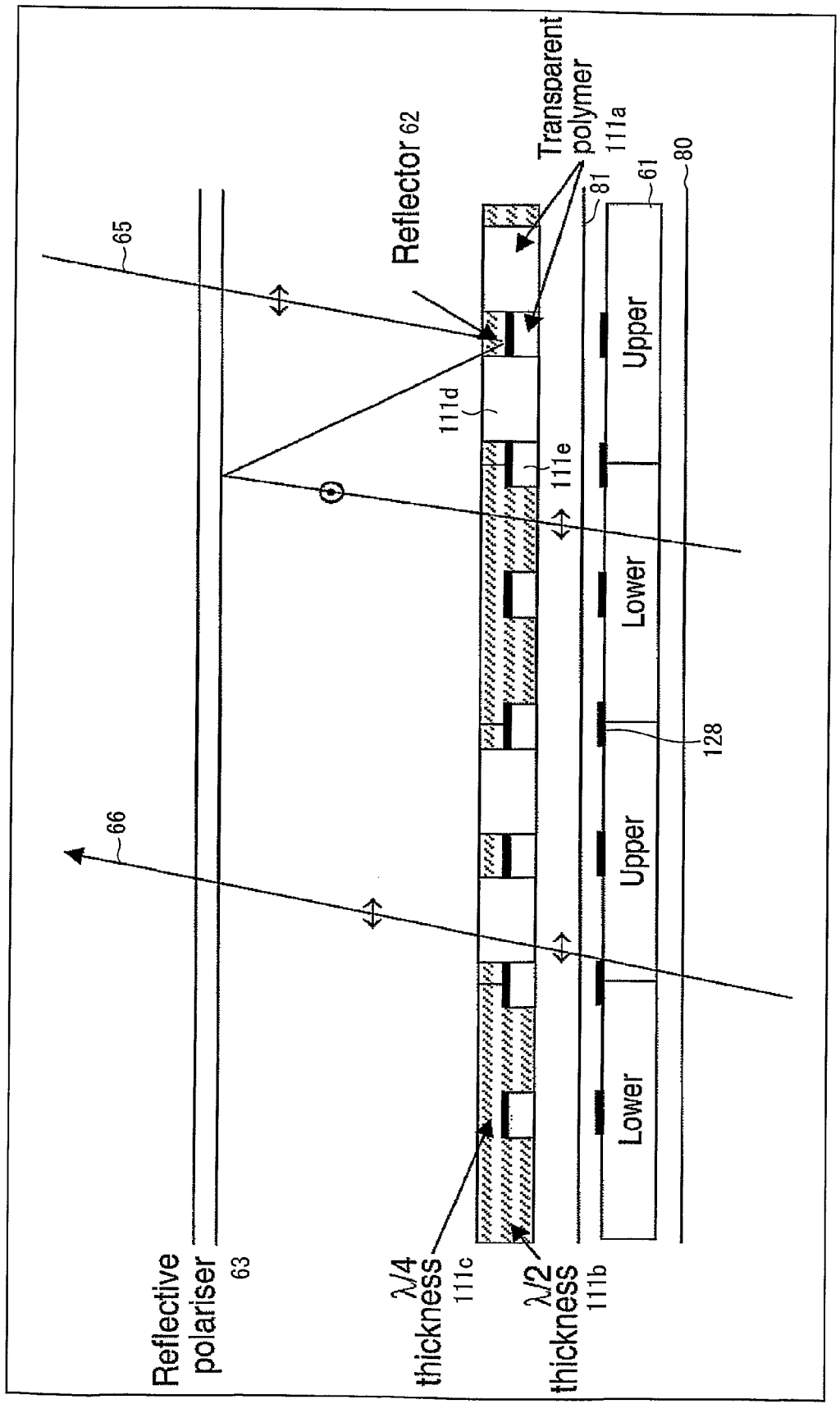
FIG. 30 is a diagram illustrating further modified forms of the display shown in FIGS. 25(a), 25(b) and 26.

FIG. 30 illustrates a display of a type similar to that shown in FIG. 28 but in which the function of the quarter waveplate 68 is incorporated within the liquid crystal cell. The cell is spatially patterned with transparent polymer steps 111*a*. The steps such as 111*d* extend throughout the thickness of the cell whereas the steps such as 111*e* extend upwards (with the orientation shown in FIG. 30) from the lower surface and have the reflective regions of the reflector 62 formed on their upper surfaces. The regions of the cells above the steps 111e and the reflective regions have a thickness such that the liquid crystal material acts as a quarter waveplate 111c. The thicknesses or depths of the regions 111e and the reflective regions on top thereof have a thickness such that they define a liquid crystal cell providing a half waveplate 111b.

Such an arrangement requires a reduced number of individual components, which may be advantageous in at least some applications. Also, the light path from the "upper" or front pixels is not required to pass through any waveplates and so experiences reduced losses and reduced crosstalk resulting from polarization errors. However, in an alternative embodiment, the transparent polymer regions 111d may be replaced by liquid crystal material and electrodes for applying a suitable voltage across the liquid crystal material.

Figure 31:
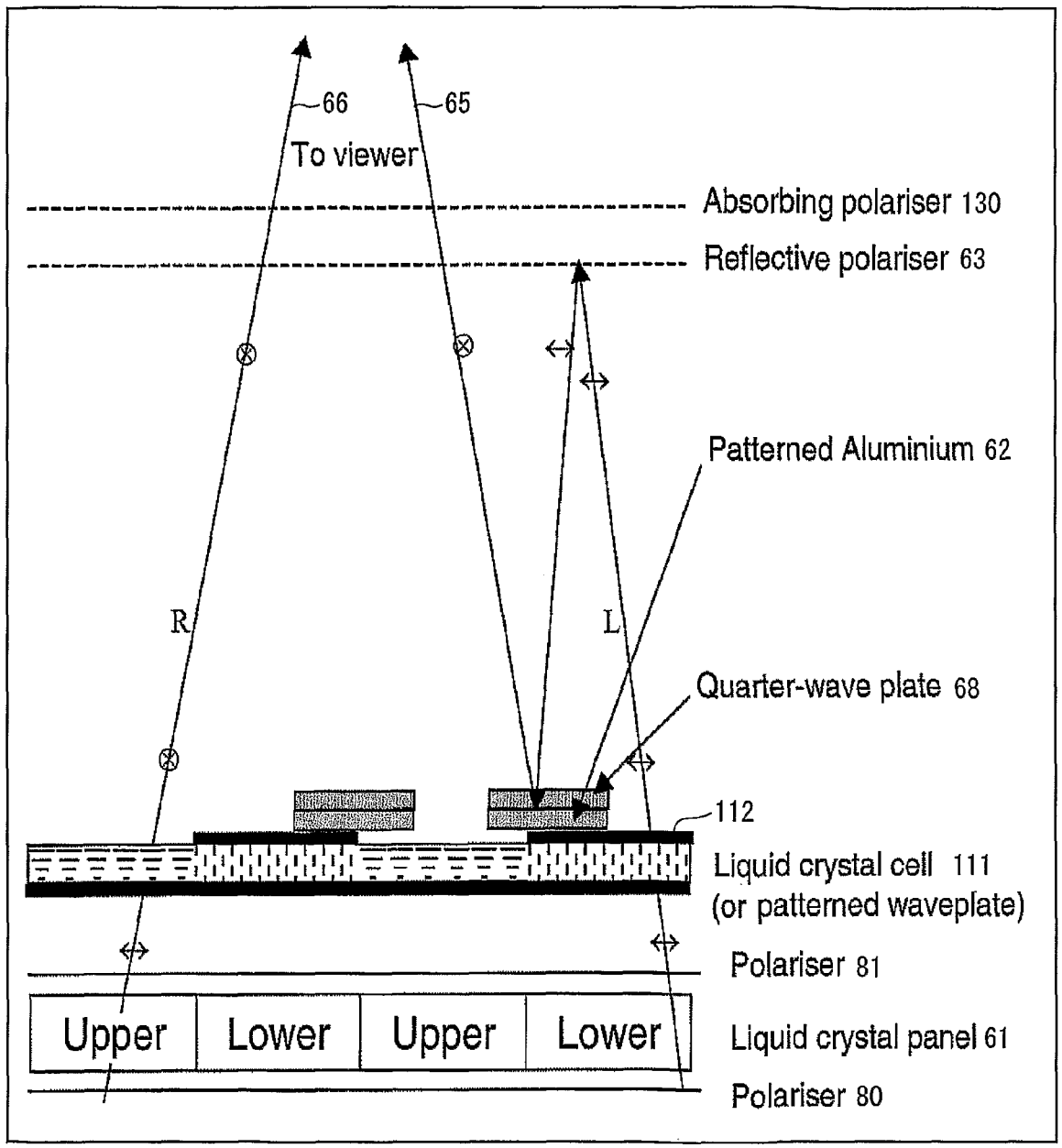
FIG. 31 is a diagram illustrating further modified forms of the display shown in FIGS. 25(a), 25(b) and 26.

FIG. 31 illustrates a display which differs from that shown in FIG. 28 in that the quarter waveplate 68 comprises regions disposed above the patterned aluminum regions forming the partial reflector 62. The quarter waveplate regions 68 are therefore only traversed by light following the path 65, so that losses and crosstalk resulting from polarisation errors may be reduced.

Figure 32:
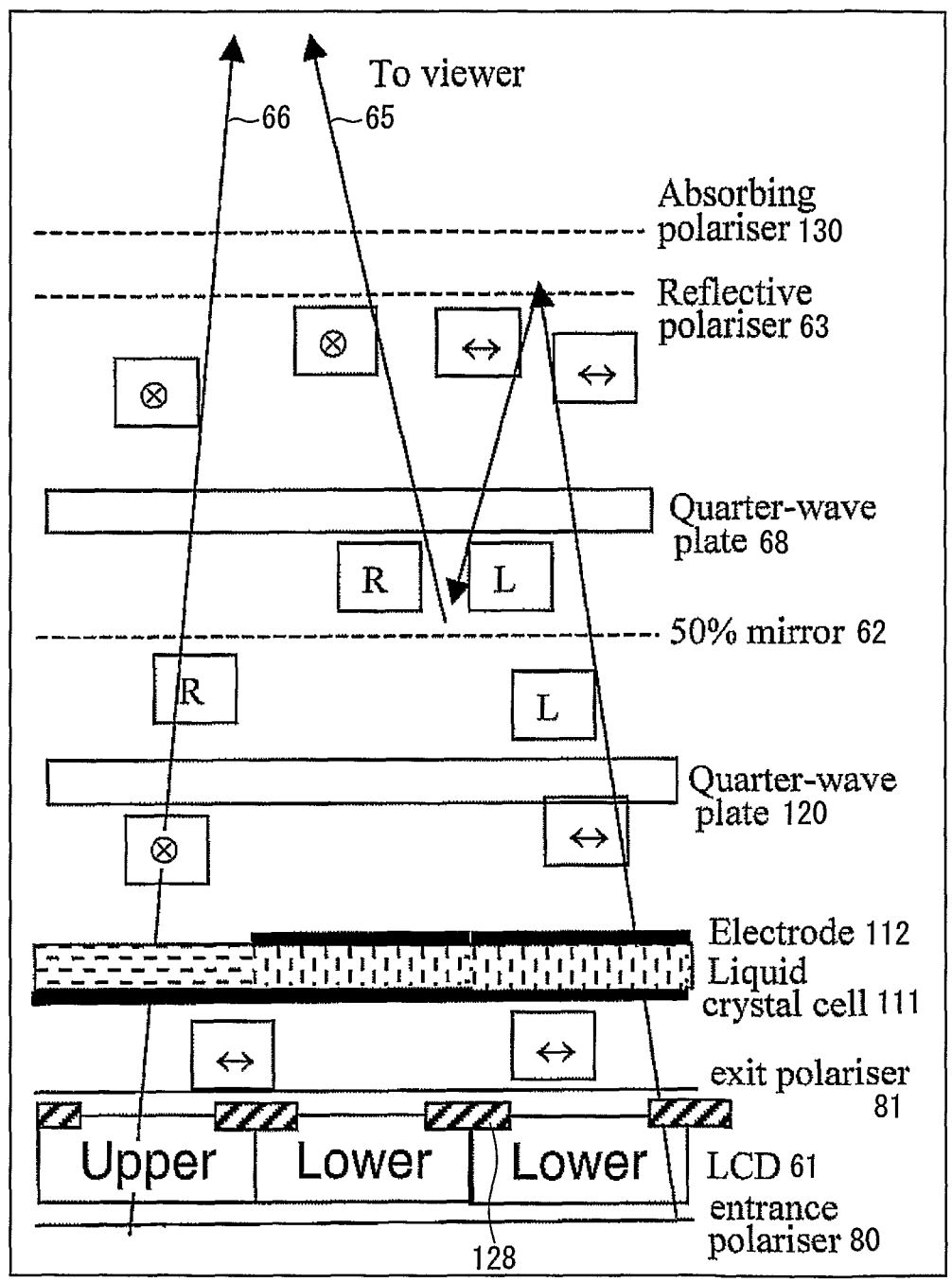
FIG. 32 is a diagram illustrating further modified forms of the display shown in FIGS. 25(a), 25(b) and 26.

In the embodiments described hereinbefore, the front and back (or upper and lower) images are displayed with substantially the same spatial resolution, for example with strips of alternate images being displayed by alternate rows of pixels of the LCD 61. However, this is not necessary and the upper and lower images may be displayed with different spatial resolutions. FIG. 32 illustrates an example of this for a display of the type shown in FIG. 27(a). In this case, twice as many pixels in twice as many rows are allocated to the lower image as to the upper image. Such as arrangement provides higher resolution and greater brightness for the lower image. However, the numbers of pixels and the numbers of rows may be allocated as desired for any particular application.

Figure 33:
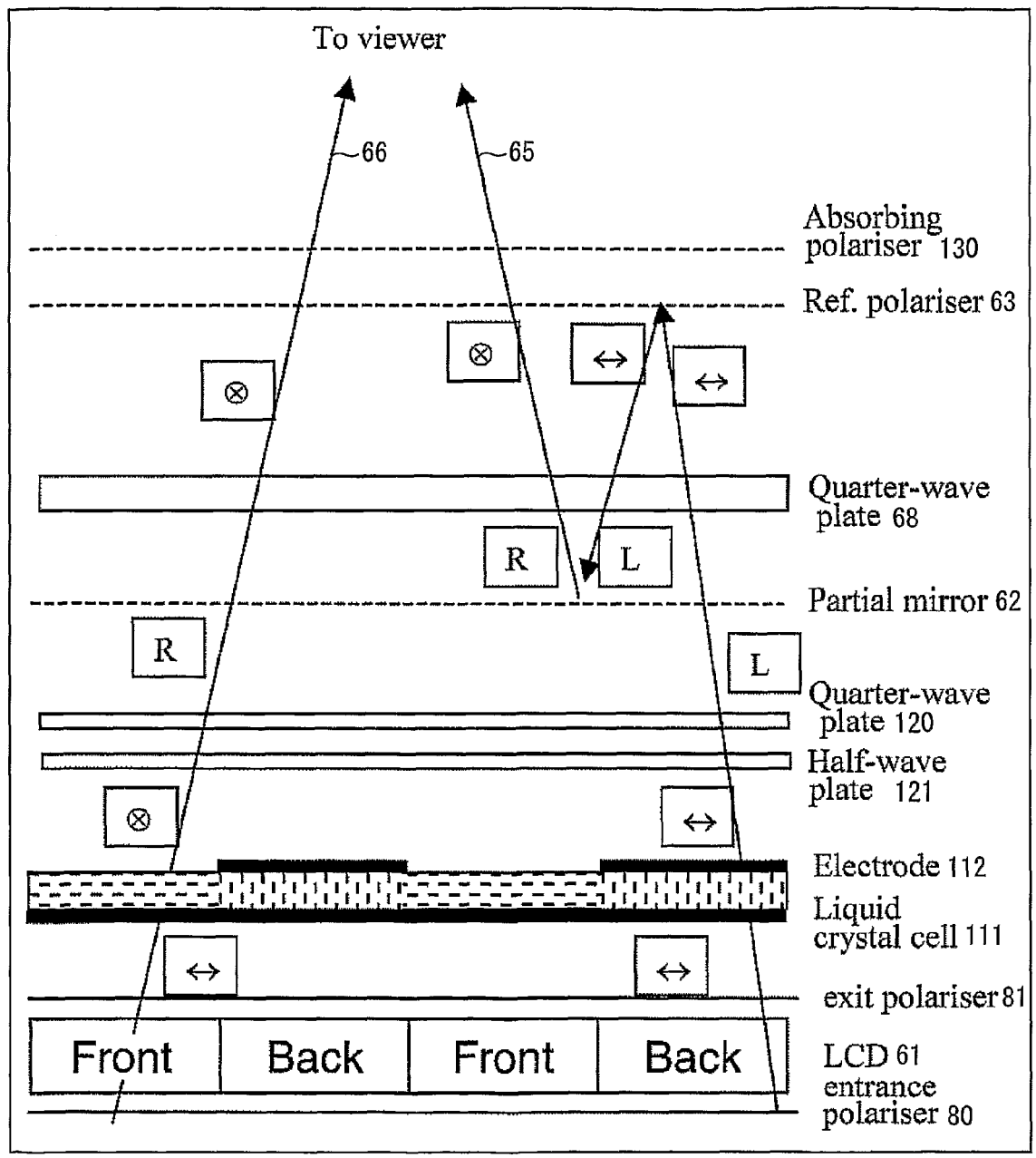
FIG. 33 is a diagram illustrating further modified forms of the display shown in FIGS. 25(a), 25(b) and 26.

FIG. 33 illustrates a display which differs from that shown in FIG. 27(a) in that a half waveplate 121 is disposed between the quarter waveplate 120 and the liquid crystal cell 111. The combination of the quarter waveplate 120 and the half waveplate 121 performs substantially the same function as the quarter waveplate 120 on its own in the display of FIG. 27(a). However, the waveplate combination may provide a more achromatic response and this may be useful in reducing crosstalk and colour artefacts.

Various undesirable artefacts may occur in the displays and may result in reduced performance. For example, Fresnel reflections may occur at interfaces between components of the display. Such reflections may occur at the interfaces between the quarter waveplate 68 and the partial mirror 62, between the partial mirror 62 and the quarter waveplate 120, and between the quarter waveplate 120 and the liquid crystal cell 111 in the display shown in FIG. 32. Such reflections may introduce losses and increase crosstalk. These reflections may be reduced, for example, by index-matching between components or by applying anti-reflection coatings to one or more of the component surfaces.

Typical backlights for the displays are generally designed to provide uniform illumination over a relatively wide angular range to provide a large viewing area. However, the displays disclosed herein generally have a more limited angular viewing range because of parallax between the liquid crystal cell and other components of the display. It is therefore possible to use a partially collimated backlight providing a narrower angular range of illumination of the display. For a given input power, such an arrangement provides a higher image brightness.

In at least some of the displays disclosed herein, an alternative liquid crystal mode may be used. In particular, instead of a conventional twisted nematic configuration, a thicker layer of liquid crystal may be used such that it operates in the known Mauguin region. Such an arrangement may give lower polarization errors, both on-axis and at higher angles, and may thus reduce crosstalk.

In order to increase brightness in the "single image mode" where available, the partial mirror 62 may be electrically switchable to a transparent non-reflecting mode. An electrically switchable mirror of suitable type is disclosed, for example, in U.S. Pat. No. 6,961,105.

Figure 34:
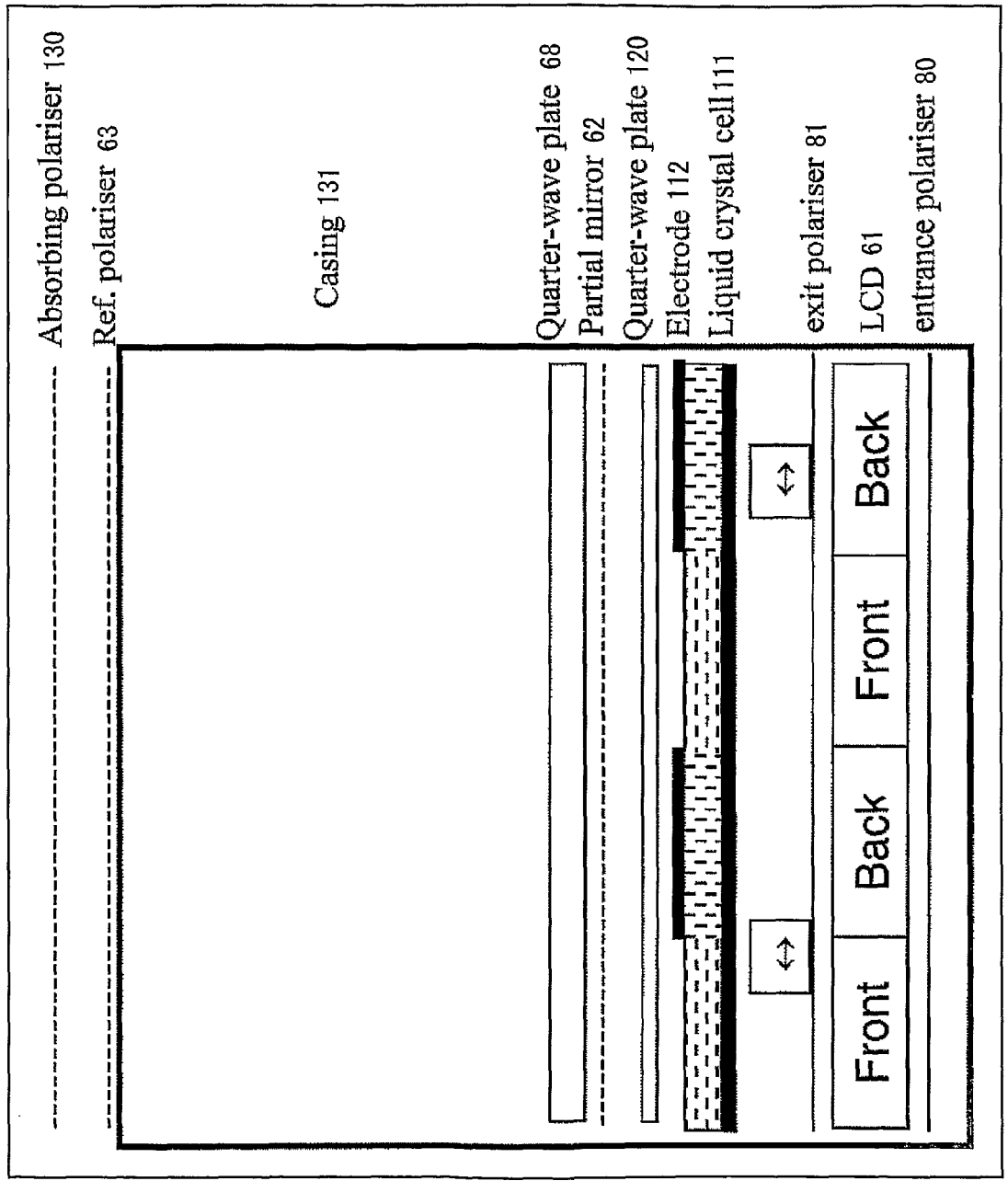
FIG. 34 is a diagram illustrating further modified forms of the display shown in FIGS. 25(a), 25(b) and 26.

FIG. 34 illustrates how a display of the type disclosed herein may be mounted in a housing in the form of a casing 131. In the arrangement shown in FIG. 34, the components 80, 61, 81, 111, 112, 120, 62 and 68 are mounted within the casing 131. The reflective polariser 63 and the absorbing polariser 130 are mounted outside the casing above a transparent window so that the casing provides a convenient means for spacing the reflective polariser 53 from the partial mirror 62 to provide the increased depth effect.

Figure 35:
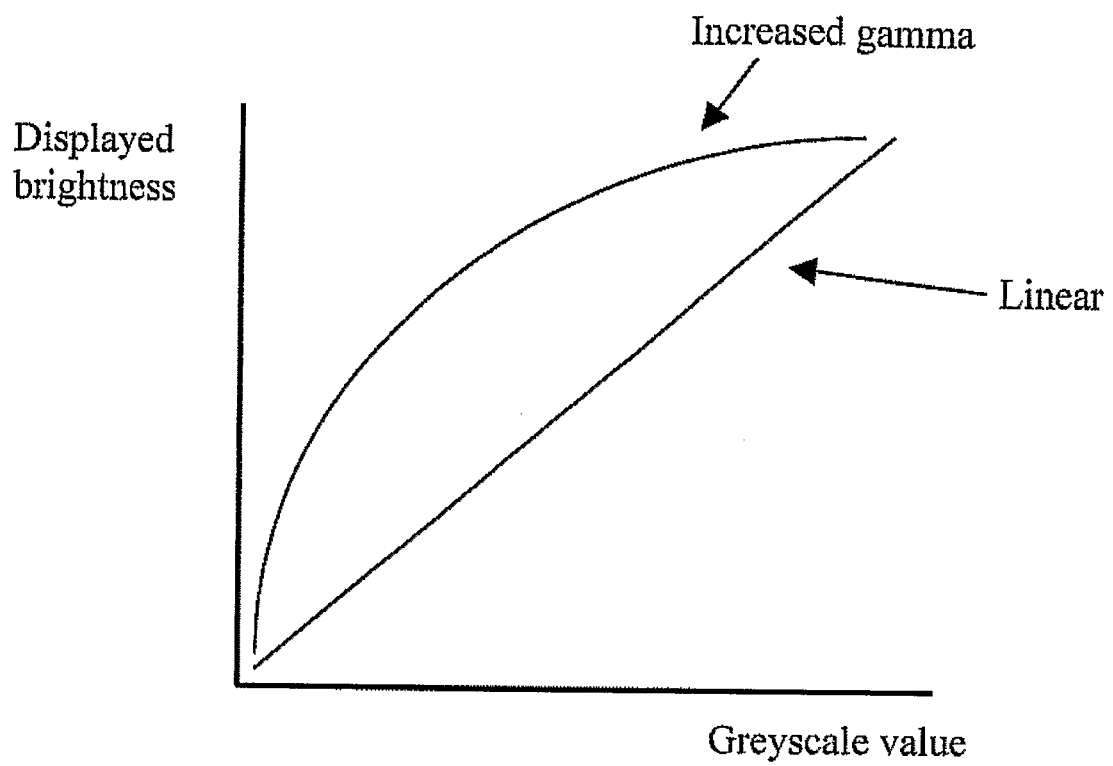
FIG. 35 is a graph of displayed brightness against greyscale or value illustrating a modified gamma function.

FIG. 35 illustrates an image processing technique which may be used with the displays disclosed herein to increase the apparent brightness of the display. This may be particularly useful for the image formed in the "lower plane". The technique relies on adjusting the gamma values in the image. The gamma values refer to the correspondence between the grey level data in the image and the actual voltages applied to the LCD and hence the brightness that is ultimately displayed. FIG. 35 illustrates the displayed brightness against grey scale value and illustrates a linear relationship. FIG. 35 also illustrates an "increased gamma" function such that the displayed brightness of the mid-grey levels are increased whereas the fully black and fully white levels remain unchanged. This results in an increase in the apparent brightness in the image.

Figure 36:
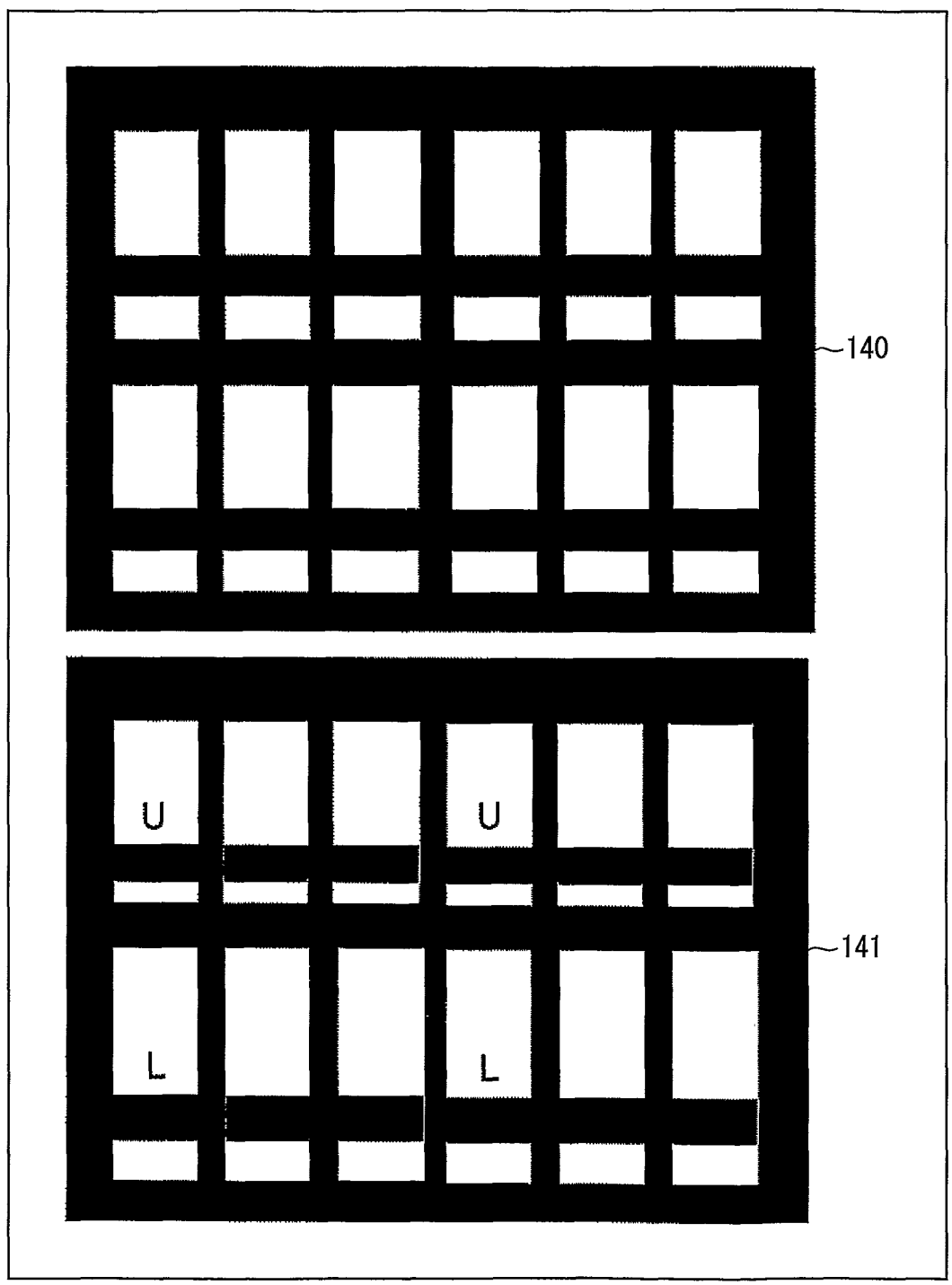
FIG. 36 is a diagram illustrating LCD pixel arrangements suitable for use in the displays.

FIG. 36 shows at 140 a typical pixel layout of a known LCD panel. The black regions are non-transmitting and are covered with a black material to form a mask covering, for example, transistors, capacitors, and control lines of the panel. All of the pixels in this arrangement have the same aperture ratio. Such a pixel arrangement may be used in the displays disclosed herein. However, the layout may be modified as illustrated at 141 so that the pixels L for displaying the lower plane image have a larger aperture ratio than the pixels U displaying the upper plane image. Such an arrangement allows the brightness of the lower plane image to be increased.

FIG. 37 illustrates another pixel arrangement at 142 with the conventional arrangement being again shown at 140. In the arrangement 142, the non-transmitting regions between rows of pixels are increased and the regions between columns of pixels are reduced so as to maintain the overall aperture ratio. Such an arrangement may be used to increase the viewing freedom of the display.

Figure 38:
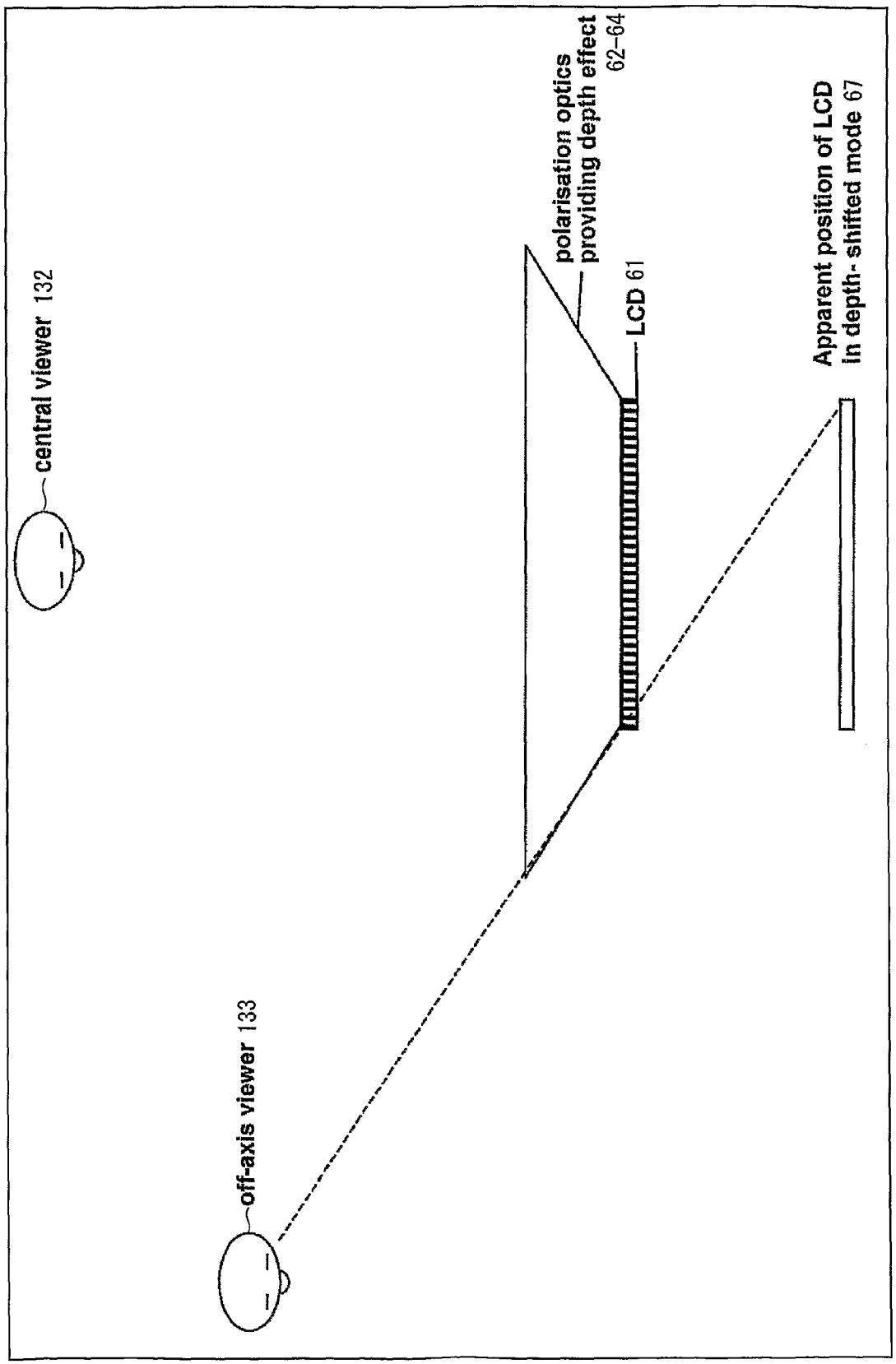
FIG. 38 is a diagram illustrating an application of displays constituting embodiments of the invention.

FIG. 38 illustrates another possible application of displays of the type described hereinbefore. In this application, the display is switchable between a narrow viewing angle or "private" mode and a wide viewing angle or "public" viewing mode. When in the private viewing mode, the display provides a restricted angular viewing range so that a central viewer 132 can see the displayed image whereas the displayed image is not visible to an off-axis viewer 133. In the private mode, the display is operated such that the image is visible in the depth-shifted position 67 "behind" the LCD. This mode may be used, for example, to display financial or other delicate or sensitive information which is not intended for public viewing. When information intended for public viewing is displayed, the display is operated in the non-shifted mode so that the image appears to be substantially at the display surface of the LCD 61. In order to provide a sufficiently wide angular viewing range in the public mode, the polarisation optics 62-64 is made wider than the display surface of the LCD 61.

Figure 39:
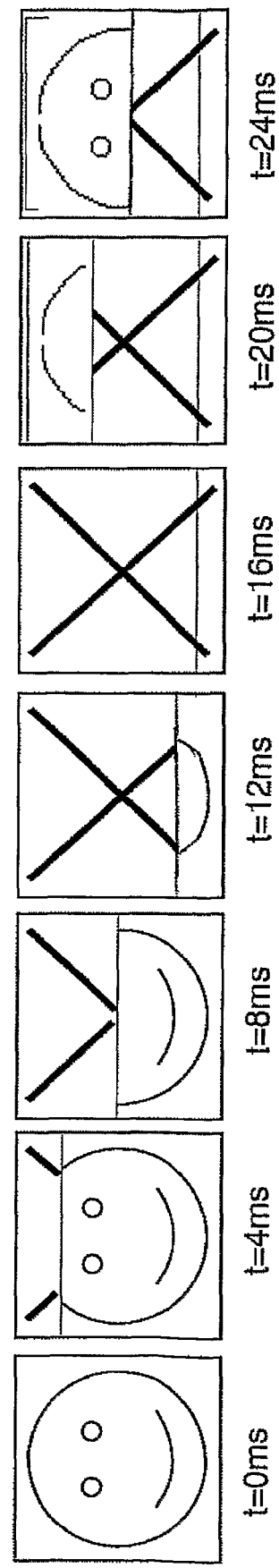
FIGS. 39 and 40 are diagrams illustrating operation of displays constituting embodiments of the invention.

It is usual for the LCDs 61 described hereinbefore to be updated or refreshed a row at a time starting from the top of the LCD and continuing to the bottom so as to refresh a complete frame. In the case of time-sequentially operated displays where the LCD 61 alternately displays the first and second images or sequences, switching between the images occurs row by row. An example of the resulting displayed images is illustrated in FIG. 39. In this case, the images are changed every 16 milliseconds, which is the frame rate of the LCD.

This may cause problem for displays in which one or more elements of the optical arrangement in front of the LCD is switched in synchronism with the sequences of images. For example, the half wave plate in the embodiment of FIG. 9(*a*) is required to be switched on for one of the images or sequences and switched off for the other image or sequence.

Figure 40:
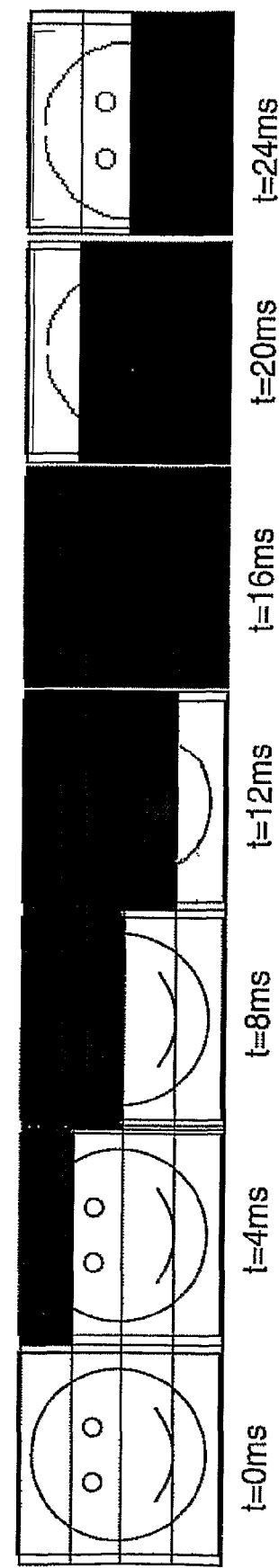

In order to reduce the effects of row and row refreshing of the LCDs, the associated switched optical elements may be divided into a plurality of individually switchable segments, for example so that each segment covers a plurality of rows of the LCD. The individual segments are then switched in sequence and in synchronism with switching of all of the underlying rows of the LCD so that the time difference between the refreshing of any pixel and the switching of the individual segment above it is relatively small. This is illustrated in FIG. 40, where the segments of the optical element switched to one of its states are shown shaded, the optical element having four such segments.

Figure 41:
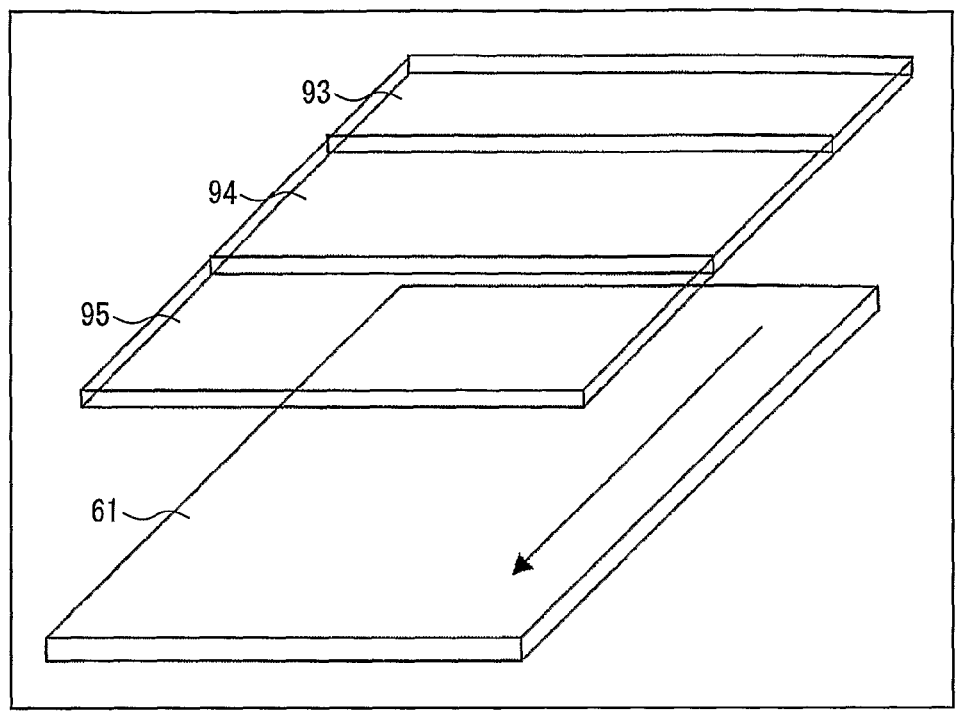
FIGS. 41(a) and 41(b) are diagrams illustrating a modification which may be applied to some embodiments of the invention.
Figure 41:
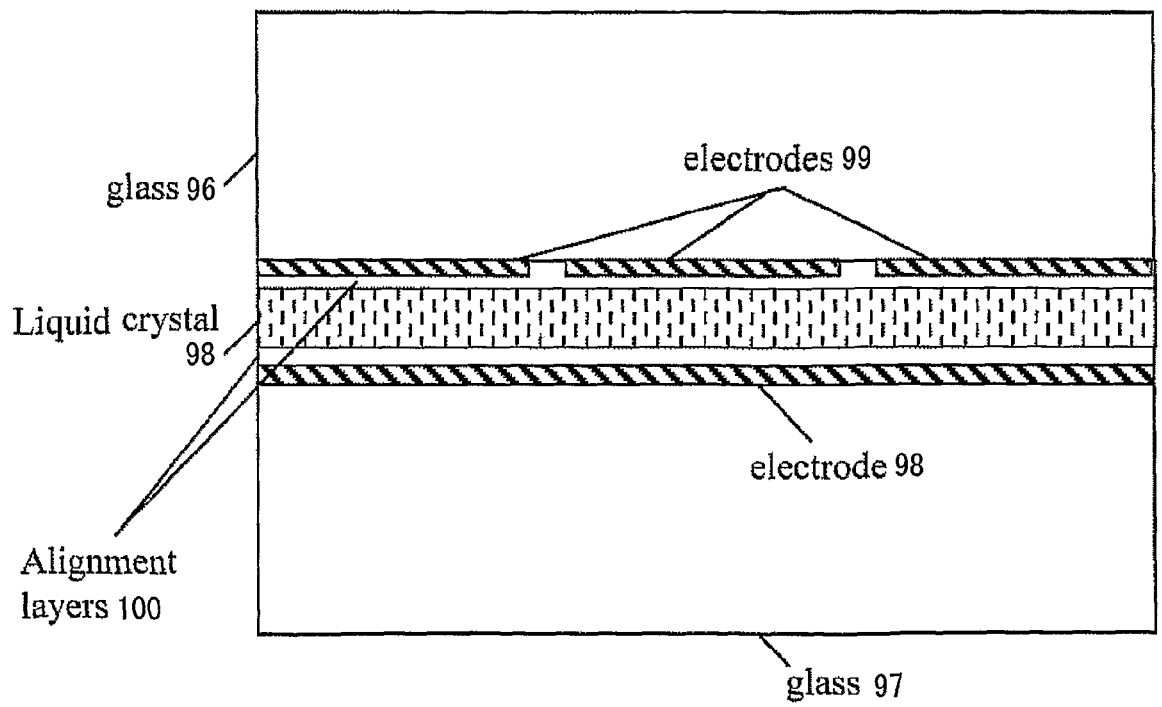

FIGS. 41(*a*) and 41(*b*) illustrate such a segmented switchable optical element in the form of a liquid crystal cell having three independently switchable horizontal segments 93, 94 and 95. The optical element comprises glass substrates 96 and 97 defining therebetween a liquid crystal cell containing a layer of liquid crystal material 98. The lower substrate 97 carries a single electrode extending over the whole area of the optical element whereas the upper substrate 96 carries three electrodes 99 defining the three sections of the optical element. The individual electrodes 99 are separately addressable so as to permit independent switching of the optical element segments. The electrodes 98 and 99 carry suitable alignment layers 100 for the liquid crystal mode of the optical element.

Another technique for reducing the effects of row by row LCD refreshing is to increase the time period between the refreshing of consecutive frames. This allows the fraction of the frame refresh period used to perform refreshing to be reduced so that synchronization errors caused by row by row updating are reduced.

The effects of row by row updating may also be reduced by means of a backlight 60 which is switched off during refreshing of the rows and switched on between consecutive frame refreshing periods. Some types of backlight, such as coldcathode fluorescent lamps, do not switch on and off instantaneously. However, reducing the illumination time to a fraction of the frame period reduces synchronization errors and hence crosstalk between images as perceived by a viewer.

For example, such a backlight may be switched on only during the "waiting period" between consecutive frame refreshes and for a few milliseconds at the beginning and end of each frame refresh period. The or each switchable optical element switches state during the time when the backlight is switched off. Although this results in a small synchronisation error for pixels close to the top and bottom of the screen, there is substantially no error for the majority of the pixels of the LCD 61 so that an improvement in crosstalk performance is provided.

In all of the embodiments described hereinbefore, it is possible that the separation of the images between the different depth image planes will not be perfect. Some of the image intended for the depth-shifted plane D may leak into the true-depth plane T and some of the T image may leak into the plane D. Such leakage results in crosstalk, which should be reduced so as to be substantially imperceptible to a viewer. For example, if the T image is a bright figure on a dark background and the D image is mainly dark, a viewer may see a faint trace of the bright figure superimposed on the D image.

There are a number of reasons why such crosstalk is likely to happen both from the D image to the T image and from the T image to the D image. Polarisation-manipulating optical elements are generally not perfect. For example, practical polarisers generally transmit some of the "wrong polarisation", retarders have behaviours which depend on orientation, wavelength and processing conditions, and (in time sequential displays) liquid crystal elements have finite switching times, resulting in time periods when light appears to come from both of the planes T and D.

Most crosstalk mechanisms lead to an approximately linear dependence of both the T and D image brightnesses on the original image data. This is because doubling the brightness of a particular pixel in the display device at a particular time results in a doubling of both light from that pixel in the depth plane for which it is intended and leakage of light from that pixel at that time into the depth plane for which it is not intended.

The problem of crosstalk may therefore be represented by a matrix formulation. This will be described hereinafter for a time-sequential type of display but similar techniques may be used for displays relying on interlaced images and wavelength multiplexing. It is assumed that the data value sent to the display device is proportional to the brightness displayed by its pixels. However, if this is not the case, then the actual "transfer function" must be taken into account. For example, cathode ray tube devices often have a power-law response where the displayed brightness is proportional to a power of the voltage at the signal input.

Let d be a vector whose two components are the data sent to a particular pixel of the display device (CRT, LCD or other device) at times in the time-sequential imaging cycle when the display is in modes D and T respectively. Suppose that the range of data values available is between 0 and 1. The vector b contains the brightnesses of the images seen by the viewer in the two depth planes at this particular pixel. Because of the linearity mentioned above, the two vectors are related by a 2×2 matrix M.

$$B=Md.$$

When using the display, it is necessary to specify the brightnesses b' and calculate the data d' which need to be sent to the display in order to show those brightnesses. It is therefore necessary to invert the matrix and calculate d' according to.

$$d'=M-1b'.$$

In principle, this calculation adjusts for the crosstalk and allows undistorted images to be displayed. Unfortunately, it also may lead to values of the components of d' outside the allowed range [0,1]. It is necessary to use a range of brightnesses b' which will avoid this.

The components of the matrix are the positive numbers
M=[α β]
[γ δ].

If the brightness of depth plane 1 is controlled mainly by data component $d_1$, and depth plane 2 by component $d_2$, then α>β and δ>γ. All possible values of the image data d are in the unit square as shown in FIG. 30. FIG. 30 shows the resulting range of possible values of b (the quadrilateral outlined with a solid line).

If $\beta < b_1 < \alpha$ and $\gamma < b_2 < \delta$, then both brightnesses can be varied independently without leading to values of d' outside the allowed range. This restricts the values of b' to the rectangle B. Because the minimum values of the brightnesses are not equal to zero, there is a loss of contrast.

In practice, the raw image data d is mapped into the brightness range B by a scaling operation:

$$b'_1 = \beta + (\alpha - \beta)d_1$$

$$b'_2 = g + (d - \gamma)d_2$$

Corrected data d' is then calculated by applying the inverted matrix $M_{-1}$ to b'.

Figure 42:
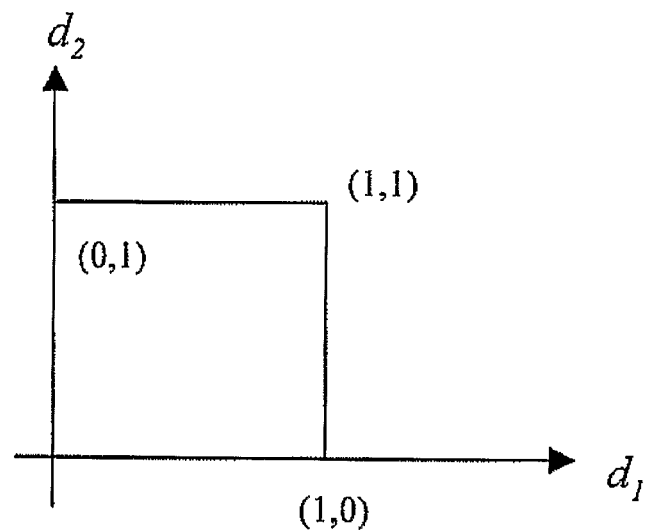
FIGS. 42(a) through 42(d) are diagrams illustrating crosstalk correction which may be applied to some embodiments of the invention.
Figure 42:
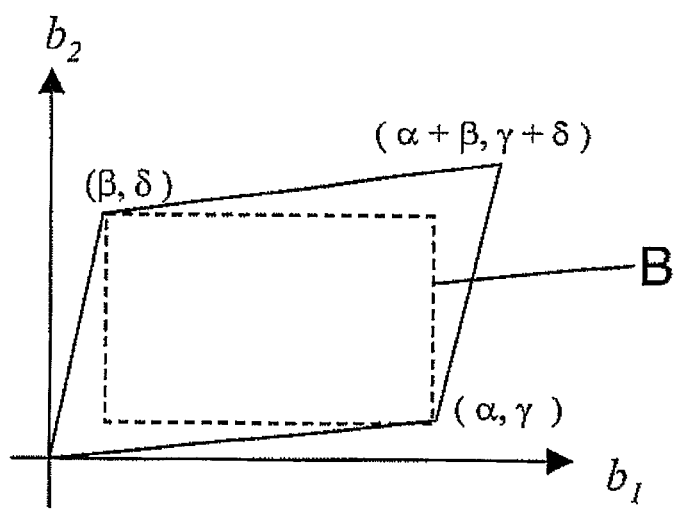
Figure 42:
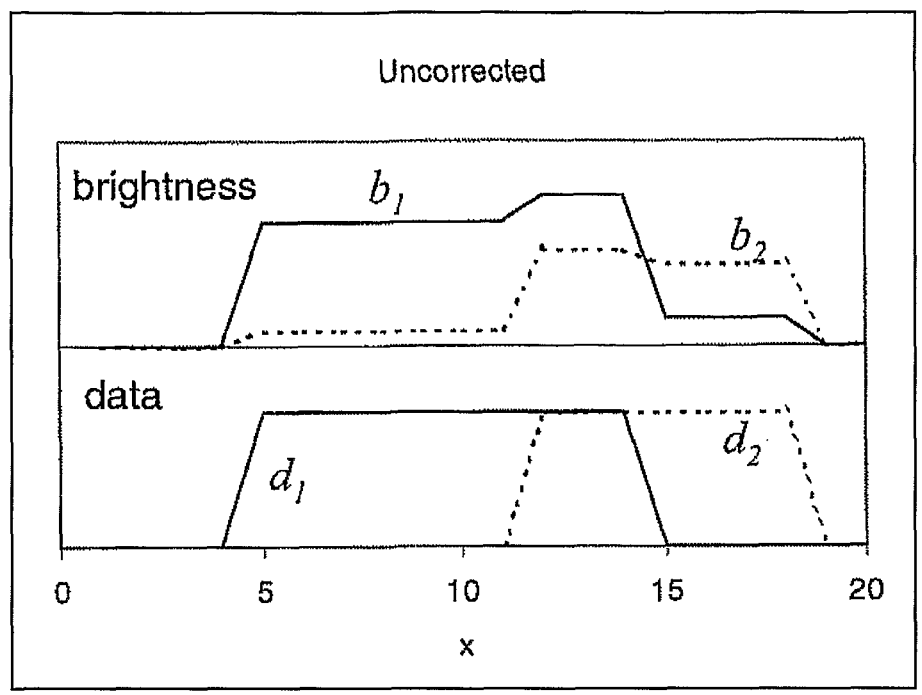
Figure 42:
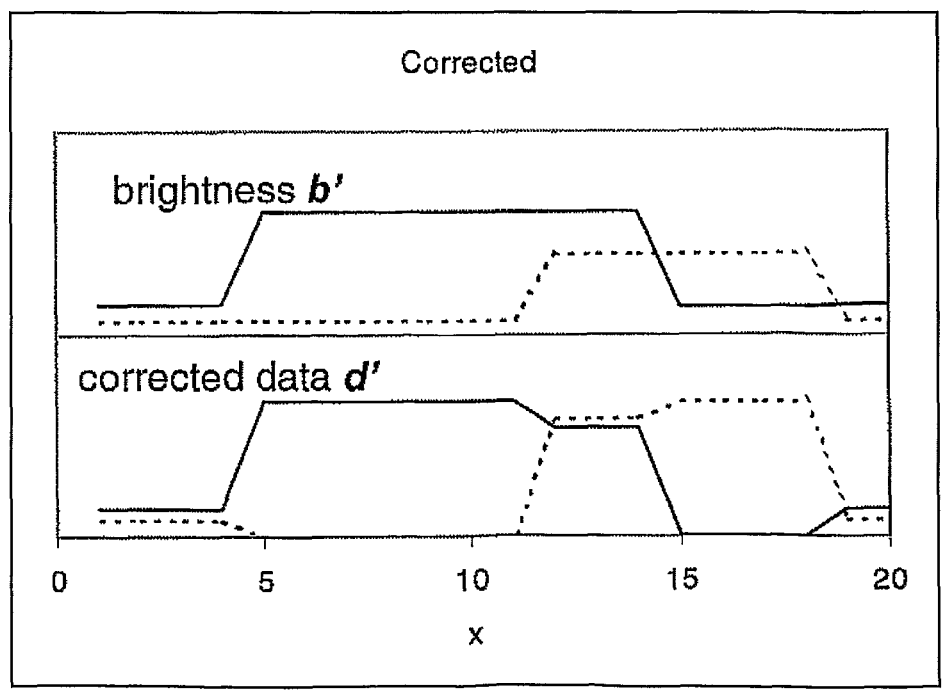

FIGS. 42(a) and 42(d) show an example of this process. The lower graph in FIG. 42(c) shows one row of image data sent to a dual-depth display without crosstalk correction. The co-ordinate x measures distance across the screen. In the example, the components of M are:

M=[0.9 0.2]
  [0.1 0.6].

The upper graph in FIG. 42(c) shows the brightnesses of the images in the two depth planes. At x=12 there is an edge in the component b1 which is not present in the data d1. This is caused by crosstalk.

FIG. 42(d) shows the process of crosstalk correction. Brightnesses b' are calculated from the data d by mapping the components into the allowed brightness ranges. Corrected data d' is then calculated by applying the inverted matrix $M^{-1}$ to b'. Unwanted features in the images caused by crosstalk are removed, but there is a loss of contrast because zero brightness is no longer available.

The matrix M may depend upon the colour of light (red, green or blue) and also on the position of a pixel on the display. The crosstalk correction may be applied using values of the coefficients which depend on colour and/or on position.

M may also depend on environmental factors. In particular, the temperature may affect the switching time of liquid crystal cells and therefore the crosstalk. The display may therefore include environmental sensors which feed information into the crosstalk correction method, changing the coefficients in response to changes in the environment.

A feedback method may be used to control the coefficients used in crosstalk correction. For example, pixels in one corner of the display (perhaps hidden behind a cover) may be monitored by photodiodes angled so that they can detect light from the two depth planes independently. Brightnesses measured by these photodiodes are then used to correct the crosstalk correction coefficients.

In some situations, crosstalk may not follow the linear model given above, for example so that doubling the intensity of image D does not double the intensity of the crosstalk into image T, or so that the intensity of crosstalk into image T depends upon the brightness of image T. In this situation, crosstalk correction may still be applied but measurements of the crosstalk must be made for a number of values of image brightness in both plane D and plane T in order to apply correction which operates well across all brightness values in both planes.

Figure 43:
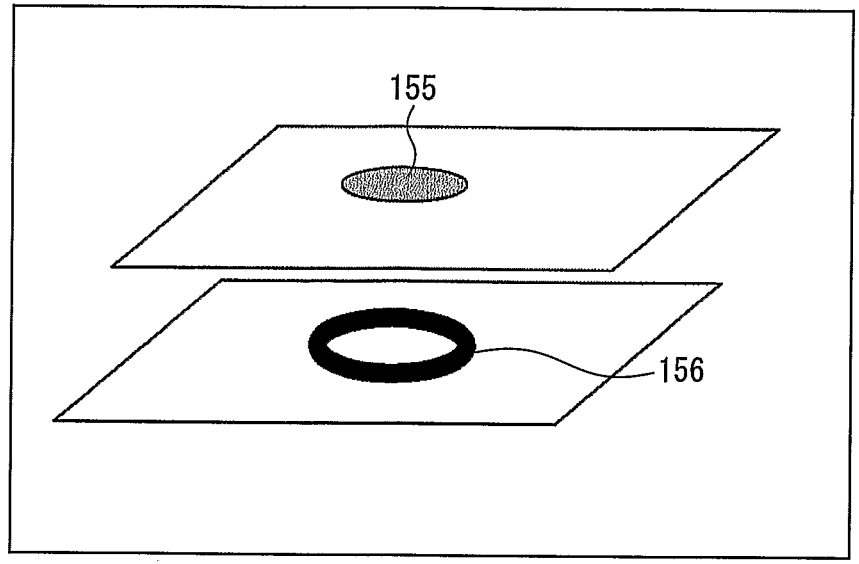
FIGS. 43(a) and 43(b) are diagrams illustrating an application of the displays for simulating a control button.
Figure 43:
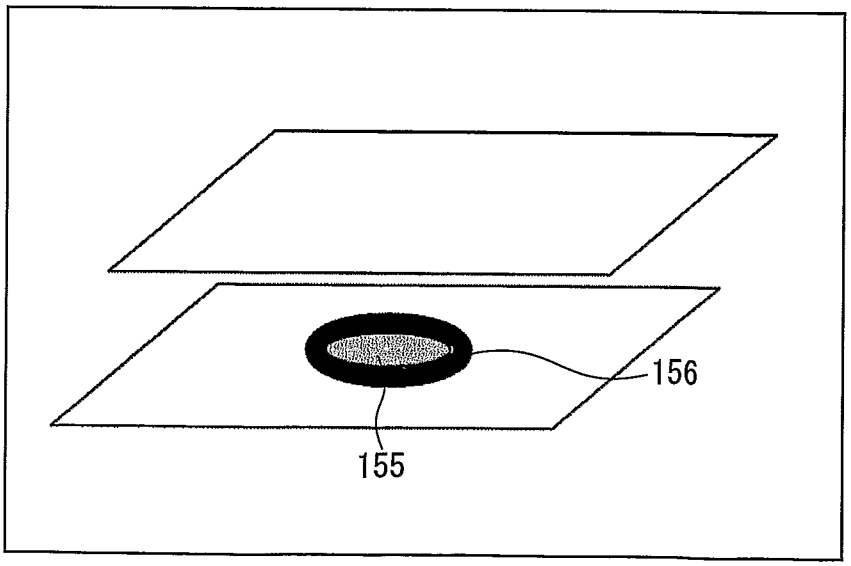

FIGS. 43(a) and 43(b) illustrate images in the upper and lower image planes for representing a control button and its operation. For example, a touch panel may be provided in front of the display so that the position on the display which a user has pressed may be detected. FIG. 43(a) represents a control button which has not been depressed. The "top" of the button is shown at 155 and is displayed in the upper image plane whereas the button surround or bezel is displayed at 156 in the lower image plane. FIG. 43b illustrates the images when the control button has been depressed. In this case, the top of the control button 155 and the bezel 156 are both displayed in the lower image plane. Such an arrangement may be used to provide a more realistic "feeling" of a physical control button which reacts when being pressed. An example of an application for such an arrangement is in an automotive centre consol for controlling an in car entertainment system or satellite navigation system.

In the embodiments described hereinbefore, an optical system has been used with a display device in order to provide a display, which is capable of changing the depth of the image plane or displaying images at two or more different depth planes. However, the optical system may be used for other purposes. For example, the optical system may be used in order to reduce the length of optical instruments by providing an optical or light path which is longer than the physical length of the optical system.

Figure 44:
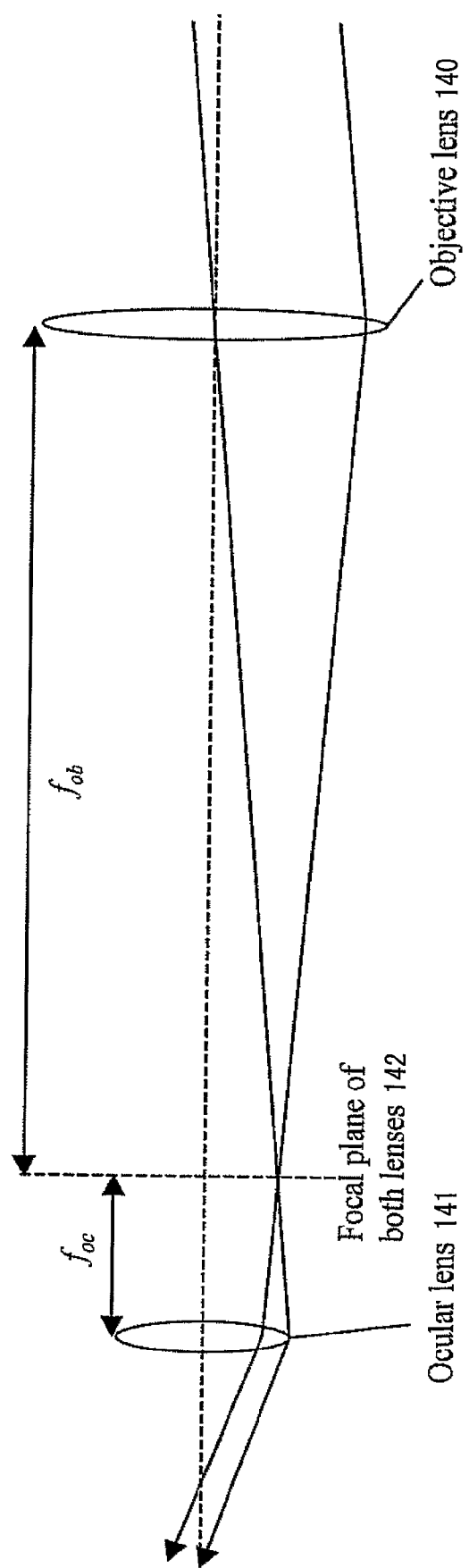
FIG. 44 is a diagram illustrating a known type of astronomical telescope.

For example, such a optical system may be used in a telescope or other similar instrument. FIG. 44 of the accompanying drawings illustrates a known type of astronomical or Keplerian telescope. Such a telescope comprises an objective lens 140 having a focal length of $f_{ob}$ and an ocular lens 141 having a focal length $f_{oc}$. The lenses 140 and 141 have coincident focal planes 142 and provide an angular magnification equal to $f_{ob}/f_{oc}$.

In order to provide an high magnification, the focal length $f_{ob}$ of the objective lens 140 should be made relatively large and/or the focal length $f_{oc}$ of the ocular lens 141 should be made relatively small. Optical aberrations produced by the ocular lens 141 limit the minimum focal length $f_{oc}$ to a few lens diameters. Accordingly, in order to obtain relatively high magnifications, the objective lens 140 is required to have a long focal length $f_{ob}$. The total length of the telescope between the lenses is equal to the sum of the focal lengths so that a high magnification requires a long physical length of the telescope.

Figure 45:
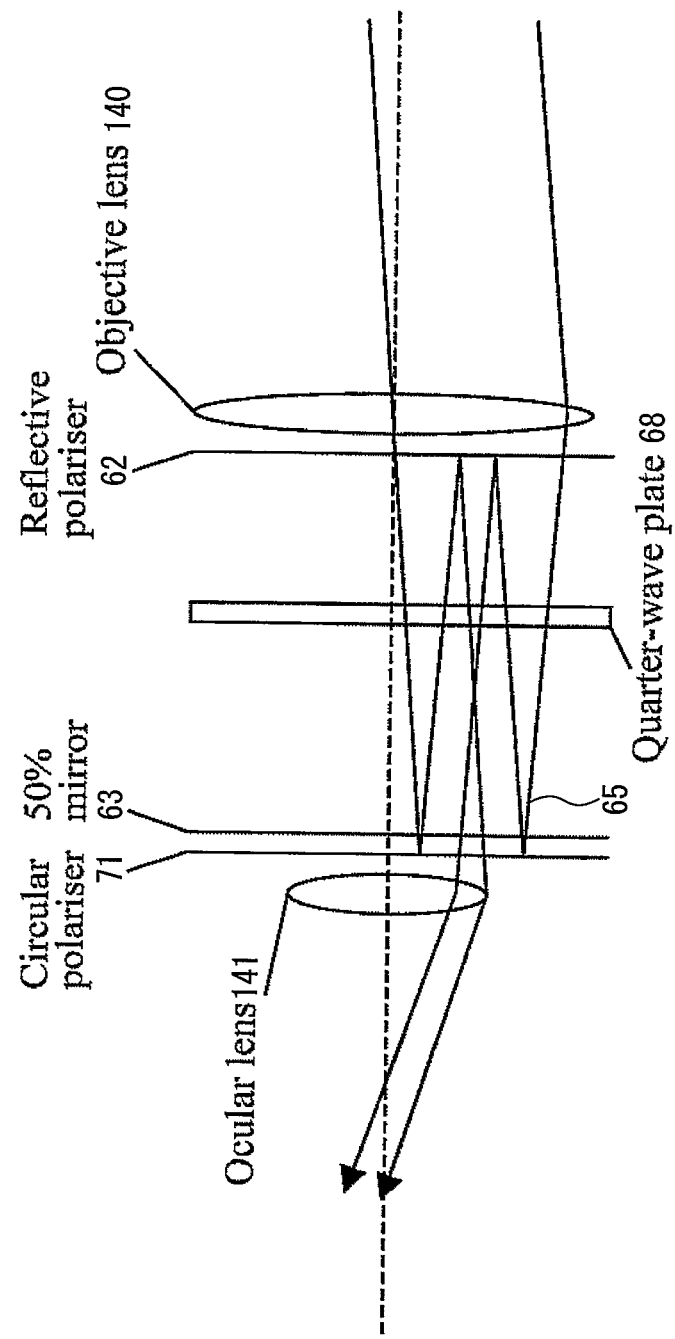
FIG. 45 is a diagram illustrating an astronomical telescope constituting a tenth embodiment of the invention.

FIG. 45 illustrates an astronomical telescope including an optical system of the type illustrated in FIG. 9(a) and comprising a reflective polariser 62, a quarter wave plate 68, a 50% mirror 63 and a circular polariser 71. This optical system is disposed between the lenses 140 and 141 and operates in a single mode so that the optical system provides the elongate light path 65. By disposing the reflective polariser 62 adjacent the objective lens 140 and the circular polariser 71 and the mirror 63 adjacent the ocular lens 141, the physical length of the telescope may be reduced to nearly one third of the length of the known telescope illustrated in FIG. 44 for the same magnification. Thus, a much more compact instrument of the same magnification performance may be provided.

Figure 46:
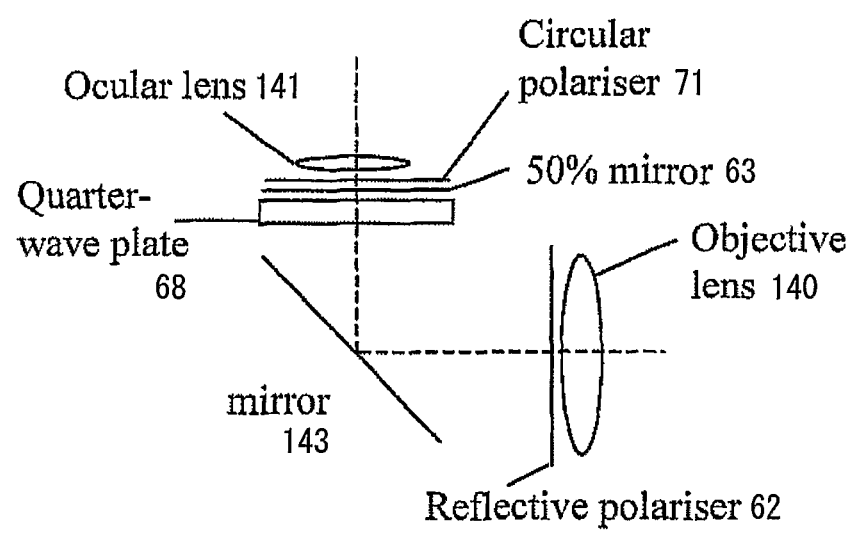
FIG. 46 is a diagram illustrating a terrestrial telescope constituting an eleventh embodiment of the invention.

Any of the optical systems described hereinbefore for producing the light path 65 may be used between the lenses 140 and 141. Also, the optical system shown in FIG. 45 and any of the optical systems of the other embodiments may be used in other applications to shorten the length of an instrument while maintaining the length of the optical light path. For example, in order to provide a terrestrial telescope or similar instrument, the inverter image produced by astronomical telescopes of the type shown in FIGS. 44 and 45 has to be inverted and this is typically achieved by means of a mirror, an additional lens, or a prism. In the terrestrial telescope illustrated in FIG. 46, a mirror 143 is used for image inversion. The mirror 143 is inserted into a telescopic system of the type illustrated in FIG. 45 and is disposed between the quarter wave plate 68 and the reflective polariser 62. This allows a terrestrial telescope of a given magnification to be made much more compact.

Figure 47:
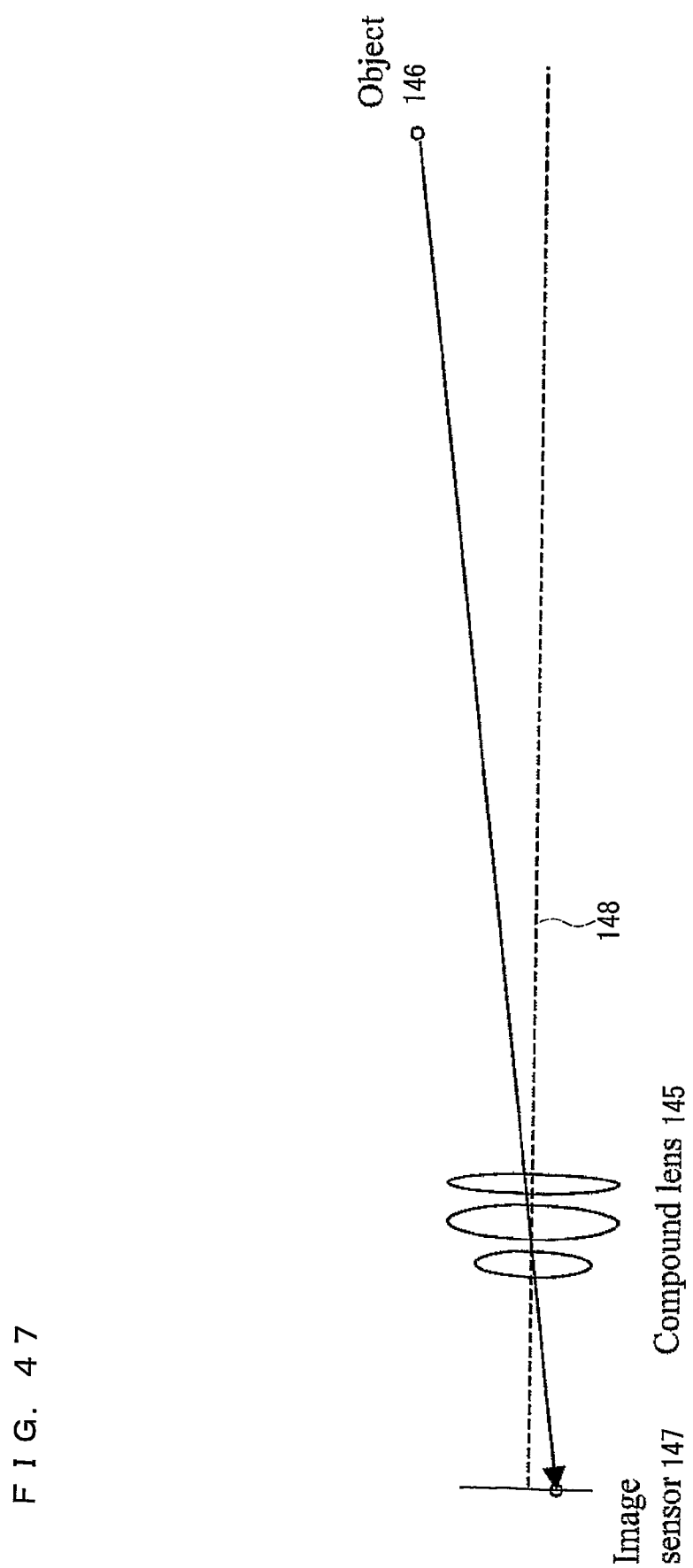
FIG. 47 is a diagram illustrating a known type of digital camera.

FIG. 47 illustrates diagrammatically a known type of digital camera. The camera comprises a compound lens 145, which forms an image of an object 146 at the sensing plane of an image sensor 147. The compound lens 145 may be moveable along a longitudinal axis 148 of the camera so as to allow correct focusing of images from objects at different distances from the camera. The distance from the compound lens 145 to the image sensor 147 is determined at least partly by the focal length of the lens 145.

As shown in FIG. 48, the physical length of the camera may be shortened by disposing an optical system of any of the types described hereinbefore between the image sensor and the compound lens. By way of example, FIG. 48 shows an optical system of the type shown in FIG. 45. The reflective polariser 62 is disposed adjacent the inner end of the compound lens 145. The mirror 63 and the circular polariser 71 are attached to the front surface of the image sensor 147. It is thus possible to produce a much "shorter" camera for a given focal length of the compound lens 145. Such an arrangement may therefore be used where compact dimensions are required, for example in mobile or "cellular" telephones incorporating camera features.

The invention claimed is:

1. A display comprising a display device for modulating a first light with a first image or sequence of images and an optical system arranged to increase the perceived depth of the location of the first image or sequence, the optical system comprising first and second spaced-apart partial reflectors and providing a first light path for the first light from the device to a viewing region, the first light path comprising at least partial transmission through the first partial reflector towards the second partial reflector, at least partial reflection from the second partial reflector towards the first partial reflector, at least partial reflection from the first partial reflector towards the second partial reflector, and at least partial transmission through the second partial reflector towards the viewing region, wherein the first and second partial reflectors comprise a partially transmissive mirror and a reflective linear polariser, respectively, and the optical system comprises a quarter wave plate disposed between the first and second partial reflectors and a patterned retarder or polarization rotator disposed between the first partial reflector and the device.

2. A display as claimed in claim 1, in which the optical system is arranged substantially to prevent transmission to the viewing region of the first light not reflected during reflection by the first and second partial reflectors.

3. A display as claimed in claim 1, in which the optical system is arranged to change the polarization of the first light during passage along the first light path.

4. A display as claimed in claim 3, in which the optical system is arranged to change the polarization of the first light during passage along the first light path between incidence on the second partial reflector and reflection from the first partial reflector.

5. A display as claimed in claim 1, in which the device is arranged to modulate a second image or sequence of images and the optical system is arranged to provide a second light path from the device to the viewing region of length different from that of the first light path to provide a perceived depth of location of the second image or sequence different from that of the first image or sequence.

6. A display as claimed in claim 5, in which the second light path comprises at least partial transmission through the first partial reflector towards the second partial reflector and at least partial transmission through the second partial reflector towards the viewing region.

7. A display as claimed in claim 6, in which the optical system is arranged substantially to prevent transmission to the viewing region of the second light not transmitted by the second reflector.

8. A display as claimed in claim 5, in which the display is switchable between a first mode displaying the first image or sequence and a second mode displaying the second image or sequence to change the perceived depth of image location.

9. A display as claimed in claim 5, in which the display is arranged to display the first and second images or sequences simultaneously or time-sequentially to give the appearance of one of the first and second images or sequences overlaid above the other of the first and second images or sequences.

10. A display as claimed in claim 1, in which the first and second partial reflectors are substantially plane.

11. A display as claimed in claim 1, in which the first and second partial reflectors are substantially parallel.

12. A display as claimed in claim 11, in which the first and second partial reflectors are substantially parallel to a display surface of the device.

13. A display as claimed in claim 1, in which the device comprises a liquid crystal device.

14. A display as claimed in claim 1, in which the first and second partial reflectors overlie substantially the whole of an image displaying region of the device.

15. A display as claimed in claim 1, in which the patterned retarder or rotator comprises a uniform quarter wave plate and a patterned half wave plate or patterned 90° polarisation rotator.

16. A display as claimed in claim 1, in which the patterned retarder or rotator comprises a liquid crystal cell.

17. A display as claimed in claim 16, in which the liquid crystal cell comprises a patterned electrode arrangement.

* * * * *